United States Patent
Morooka et al.

(10) Patent No.: US 7,372,635 B2
(45) Date of Patent: May 13, 2008

(54) OPTICAL PATH BENDING TYPE ZOOM LENS SYSTEM AND IMAGE TAKING APPARATUS INCLUDING THE SAME

(75) Inventors: Masaru Morooka, Akishima (JP); Eiji Shirota, Hino (JP); Hirohiko Kimata, Hino (JP)

(73) Assignee: Olympus Imaging Corp., Tokyo (JP)

( * ) Notice: Subject to any disclaimer, the term of this patent is extended or adjusted under 35 U.S.C. 154(b) by 0 days.

(21) Appl. No.: 11/449,699

(22) Filed: Jun. 9, 2006

(65) Prior Publication Data

US 2006/0279853 A1    Dec. 14, 2006

(30) Foreign Application Priority Data

Jun. 10, 2005    (JP)    ............................. 2005-170503
Jun. 21, 2005    (JP)    ............................. 2005-180641

(51) Int. Cl.
    G02B 15/14    (2006.01)
(52) U.S. Cl. .................. 359/687; 359/678; 359/726
(58) Field of Classification Search ................ 359/687, 359/676, 678, 726–736
    See application file for complete search history.

(56) References Cited

U.S. PATENT DOCUMENTS 6,754,446 B2    6/2004    Hagimori et al.
6,771,432 B2    8/2004    Mihara
2003/0214726 A1    11/2003    Mihara
2004/0105020 A1    6/2004    Iwasawa
2005/0002115 A1    1/2005    Mihara

FOREIGN PATENT DOCUMENTS

JP    2000-131610 A    5/2000

Primary Examiner—Scott J. Sugarman
Assistant Examiner—Darryl J. Collins
(74) Attorney, Agent, or Firm—Kenyon & Kenyon LLP

(57) ABSTRACT

A zoom lens system comprises, in order from an object side, a positive first lens unit including a reflective optical element, a negative second lens unit, a positive third lens unit and a positive fourth lens unit, or a positive first lens unit, a negative second lens unit, a positive third lens unit, a negative fourth lens unit and a positive fifth lens unit. During zooming from a wide-angle end toward a telephoto end, the first lens unit is fixed, at least the second and third lens units move, and a space between the lens units changes. The second lens unit is positioned closer to an image-surface side in the telephoto end than in the wide-angle end, and the third lens unit is positioned closer to the object side in the telephoto end than in the wide-angle end. An image taking apparatus including the zoom lens system is also disclosed.

31 Claims, 19 Drawing Sheets

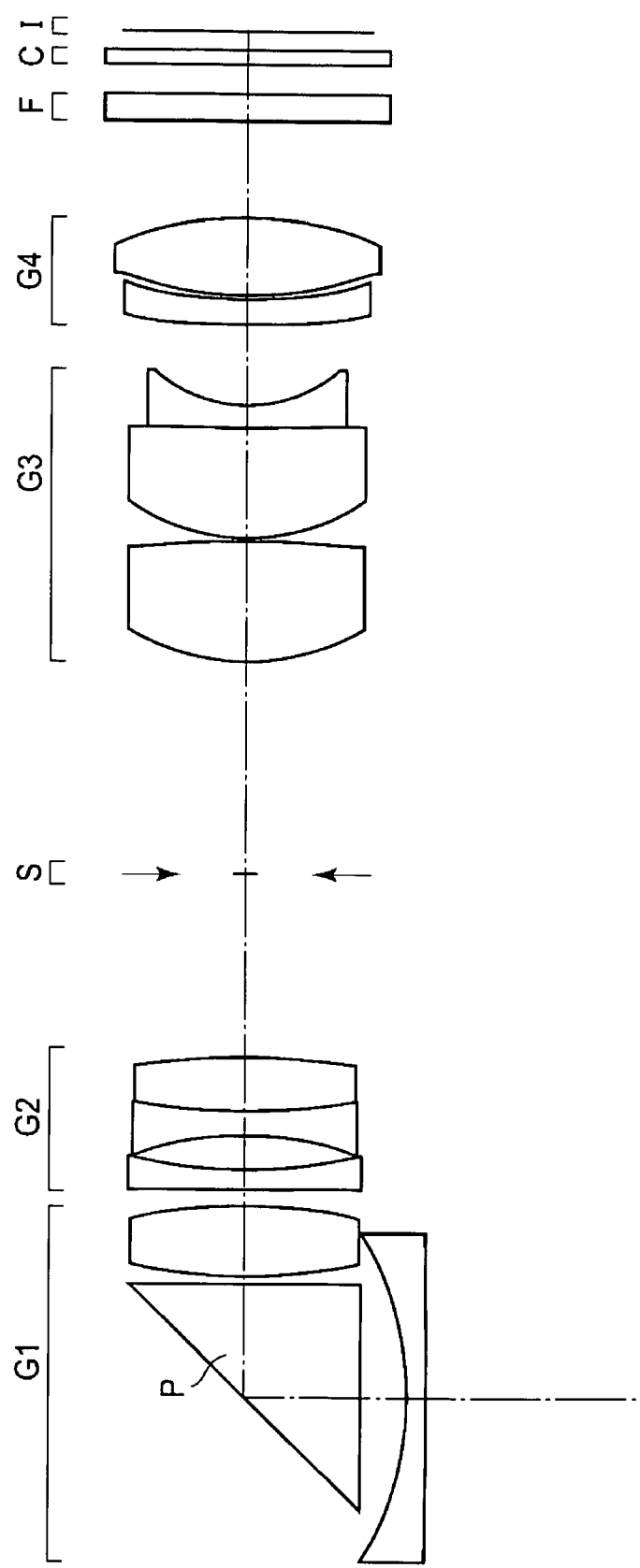

OPTICAL PATH BENDING TYPE ZOOM LENS SYSTEM AND IMAGE TAKING APPARATUS INCLUDING THE SAME

CROSS REFERENCE TO RELATED APPLICATION

This application claims benefit under 35 U.S.C. §119 of Japanese Patent Applications of No. 2005-170503, filed in Japan on June 10 and No. 2005-180641, filed in Japan on Jun. 21, 2005, the contents of which are incorporated herein by reference.

BACKGROUND OF THE INVENTION

1. Field of the Invention

The present invention relates to an optical path bending type zoom lens system and an image taking apparatus including the same.

2. Description of the Related Art

Heretofore, an optical path bending type zoom lens has been known in which an optical path is bent to thereby reduce a thickness of the lens system as much as possible in an incidence optical axis direction. In such zoom lens system, a first lens unit is provided with a reflective surface, and a movable lens unit which moves during zooming is disposed in an optical path after reflection. Therefore, when this zoom lens system is incorporated into a camera, a moving direction of the lens unit which moves during the zooming is a height direction or a lateral direction of the camera. Therefore, a zoom lens system having a high zooming ratio can be used while reducing a camera thickness (length in a direction from an object toward a photographer).

As such zoom lens system, there are known zoom lens systems described in Japanese Patent Application Laid-Open Nos. 2000-131,610, 2003-202,500, 2003-302,576, 2003-329,932 and 2004-184,627.

SUMMARY OF THE INVENTION

The present invention provides a zoom lens system which includes a reflective surface to bend an optical path and whose thickness in an incidence optical axis direction is reduced as much as possible, and an image taking apparatus including the same.

In the present invention, a first type of zoom lens system comprises, in order from an object side: a first lens unit having a positive refractive power; a second lens unit having a negative refractive power; a third lens unit having a positive refractive power; and a fourth lens unit having a positive refractive power, the zoom lens system having four lens units in total, during zooming from a wide-angle end toward a telephoto end, the first lens unit being fixed, at least the second lens unit and the third lens unit being moved, and a space between the third lens unit and the fourth lens unit being changed, the second lens unit being positioned closer to an image-surface side in the telephoto end than in the wide-angle end, the third lens unit being positioned closer to the object side in the telephoto end than in the wide-angle end, the first lens unit comprising a reflective optical element which reflects an optical path, the zoom lens system satisfying the following condition:

$$0.5 < f_{1G}/f_w < 3.5 \quad (1A),$$

wherein $f_{1G}$ denotes a focal length of the first lens unit, and $f_w$ denotes a focal length of the zoom lens system in the wide-angle end.

In the present invention, a first type of image taking apparatus comprises:

a zoom lens system; and an image sensor which is disposed on an image side of the zoom lens system, which has a light receiving surface and which converts an optical image formed by the zoom lens system into an electric signal, the zoom lens system comprising, in order from an object side:

a first lens unit having a positive refractive power; a second lens unit having a negative refractive power; a third lens unit having a positive refractive power; and a fourth lens unit having a positive refractive power, the zoom lens system having four lens units in total, during zooming from a wide-angle end toward a telephoto end, the first lens unit being fixed to an image surface on the light receiving surface, at least the second lens unit and the third lens unit being moved, and a space between the third lens unit and the fourth lens unit being changed, the second lens unit being positioned closer to an image-surface side in the telephoto end than in the wide-angle end, the third lens unit being positioned closer to the object side in the telephoto end than in the wide-angle end, the first lens unit comprising a reflective optical element which reflects an optical path, the apparatus satisfying the following conditions:

$$1.6 < f_w/ih < 1.9 \quad (6A); \text{ and}$$

$$0.85 < f_{1G}/ih < 6.0 \quad (7A),$$

wherein $f_{1G}$ denotes a focal length of the first lens unit, $f_w$ denotes a focal length of the zoom lens system in the wide-angle end, and ih denotes a maximum image height in an effective image taking region of the light receiving surface.

In the present invention, a second type of image taking apparatus comprises:

a zoom lens system; and an image sensor which is disposed on an image side of the zoom lens system, which has a light receiving surface and which converts an optical image formed by the zoom lens system into an electric signal, the zoom lens system comprising, in order from an object side:

a first lens unit having a positive refractive power; a second lens unit having a negative refractive power; a third lens unit having a positive refractive power; and a fourth lens unit having a positive refractive power, the zoom lens system having four lens units in total, during zooming from a wide-angle end toward a telephoto end, the first lens unit being fixed, at least the second lens unit and the third lens unit being moved, and a space between the third lens unit and the fourth lens unit being changed, the second lens unit being positioned closer to an image-surface side in the telephoto end than in the wide-angle end, the third lens unit being positioned closer to the object side in the telephoto end than in the wide-angle end, the first lens unit comprising a reflective optical element which reflects an optical path, the apparatus satisfying the following conditions:

$1.6 < f_w/ih < 1.9$ (6A);

$0.85 < |f_{2G}/ih| < 3.1$ (8A);

$1.0 < f_{3G}/ih < 3.7$ (15A); and $0.7 < m_{2GZ}/m_{3GZ} < 1.2$ (3A), wherein $f_w$, denotes a focal length of the zoom lens system in the wide-angle end, $f_{2G}$ denotes a focal length of the second lens unit, $f_{3G}$ denotes a focal length of the third lens unit, ih denotes a maximum image height in an effective image taking region of the light receiving surface, $m_{2GZ}$ denotes a ratio of a magnification of the second lens unit in the telephoto end to that in the wide-angle end when the zoom lens system if focused on an infinite object, and $m_{3GZ}$ denotes a ratio of a magnification of the third lens unit in the telephoto end to that in the wide-angle end when the zoom lens system is focused on the infinite object.

In the present invention, a second type of zoom lens system comprises, in order from an object side:

a first lens unit having a positive refractive power; a second lens unit having a negative refractive power; a third lens unit having a positive refractive power; a fourth lens unit having a negative refractive power; and a fifth lens unit having a positive refractive power, the zoom lens system having five lens units in total, during zooming from a wide-angle end toward a telephoto end, the first lens unit being fixed, at least the second lens unit and the third lens unit being moved, and a space between the lens units being changed, the second lens unit being positioned closer to an image-surface side in the telephoto end than in the wide-angle end, the third lens unit being positioned closer to the object side in the telephoto end than in the wide-angle end, the first lens unit comprising a reflective optical element which reflects an optical path, the zoom lens system satisfying the following condition:

$0.5 < f_{1G}/f_w < 3.5$ (1B), wherein $f_{1G}$ denotes a focal length of the first lens unit, and $f_w$, denotes a focal length of the zoom lens system in the wide-angle end.

In the present invention, a third type of image taking apparatus comprises:

a zoom lens system; and an image sensor which is disposed on an image side of the zoom lens system, which has a light receiving surface and which converts an optical image formed by the zoom lens system into an electric signal, the zoom lens system comprising, in order from an object side:

a first lens unit having a positive refractive power; a second lens unit having a negative refractive power; a third lens unit having a positive refractive power; a fourth lens unit having a negative refractive power; and a fifth lens unit having a positive refractive power, the zoom lens system having five lens units in total, during zooming from a wide-angle end toward a telephoto end, the first lens unit being fixed to an image surface on the light receiving surface, at least the second lens unit and the third lens unit being moved, and a space between the lens units being changed, the second lens unit being positioned closer to an image-surface side in the telephoto end than in the wide-angle end, the third lens unit being positioned closer to the object side in the telephoto end than in the wide-angle end, the first lens unit comprising a reflective optical element which reflects an optical path, the apparatus satisfying the following conditions:

$1.5 < f_w/ih < 1.9$ (6B); and $0.85 < f_{1G}/ih < 6.0$ (7B), wherein $f_{1G}$ denotes a focal length of the first lens unit, $f_w$ denotes a focal length of the zoom lens system in the wide-angle end, and ih denotes a maximum image height in an effective image taking region of the light receiving surface.

In the present invention, a fourth type of image taking apparatus comprises:

a zoom lens system; and an image sensor which is disposed on an image side of the zoom lens system, which has a light receiving surface and which converts an optical image formed by the zoom lens system into an electric signal, the zoom lens system comprising, in order from an object side:

a first lens unit having a positive refractive power; a second lens unit having a negative refractive power; a third lens unit having a positive refractive power; a fourth lens unit having a negative refractive power; and a fifth lens unit having a positive refractive power, the zoom lens system having five lens units in total, during zooming from a wide-angle end toward a telephoto end, the first lens unit being fixed, at least the second lens unit and the third lens unit being moved, and a space between the lens units being changed, the second lens unit being positioned closer to an image-surface side in the telephoto end than in the wide-angle end, the third lens unit being positioned closer to the object side in the telephoto end than in the wide-angle end, the first lens unit comprising a reflective optical element which reflects an optical path, the apparatus satisfying the following conditions:

$1.5 < f_w/ih < 1.9$ (6B);

$0.85 < |f_{2G}/ih| < 3.23$ (8B);

$1.0 < f_{3G}/ih < 3.7$ (17B); and $0.6 < m_{2GZ}/m_{3GZ} < 1.4$ (3B), wherein $f_w$, denotes a focal length of the zoom lens system in the wide-angle end, $f_{2G}$ denotes a focal length of the second lens unit, $f_{3G}$ denotes a focal length of the third lens unit, ih denotes a maximum image height in an effective image taking region of the light receiving surface, $m_{2GZ}$ denotes a ratio of a magnification of the second lens unit in the telephoto end to that in the wide-angle end when the zoom lens system is focused on an infinite object, and $m_{3GZ}$ denotes a ratio of a magnification of the third lens unit in the telephoto end to that in the wide-angle end when the zoom lens system is focused on the infinite object.

Other characteristics and advantages of the present invention will be apparent by embodiments described hereinafter with reference to the drawings and description of appended claims.

BRIEF DESCRIPTION OF THE DRAWINGS

FIG. 1A shows a wide-angle end, FIG. 1B shows an intermediate state, and FIG. 1C shows a telephoto end;

FIG. 2A shows a wide-angle end, FIG. 2B shows an intermediate state, and FIG. 2C shows a telephoto end;

FIG. 3A shows a wide-angle end, FIG. 3B shows an intermediate state, and FIG. 3C shows a telephoto end;

FIG. 4A shows a wide-angle end, FIG. 4B shows an intermediate state, and FIG. 4C shows a telephoto end;

FIG. 5 is a sectional view showing a lens arrangement in a state in which an optical path of Example 1 shown in FIG. 1A is bent;

FIG. 6A shows a wide-angle end, FIG. 6B shows an intermediate state, and FIG. 6C shows a telephoto end;

FIG. 7A shows a wide-angle end, FIG. 7B shows an intermediate state, and FIG. 7C shows a telephoto end;

FIG. 8A shows a wide-angle end, FIG. 8B shows an intermediate state, and FIG. 8C shows a telephoto end;

FIG. 9A shows a wide-angle end, FIG. 9B shows an intermediate state, and FIG. 9C shows a telephoto end;

FIG. 10A shows a wide-angle end, FIG. 10B shows an intermediate state, and FIG. 10C shows a telephoto end;

FIG. 11A shows a wide-angle end, FIG. 11B shows an intermediate state, and FIG. 11C shows a telephoto end;

FIG. 12A shows a wide-angle end, FIG. 12B shows an intermediate state, and FIG. 12C shows a telephoto end;

FIG. 14A shows a wide-angle end, FIG. 14B shows an intermediate state, and FIG. 14C shows a telephoto end;

FIG. 15A shows a wide-angle end, FIG. 15B shows an intermediate state, and FIG. 15C shows a telephoto end;

FIG. 16A shows a wide-angle end, FIG. 16B shows an intermediate state, and FIG. 16C shows a telephoto end;

DETAILED DESCRIPTION OF THE PREFERRED EMBODIMENT

Figure 1A:
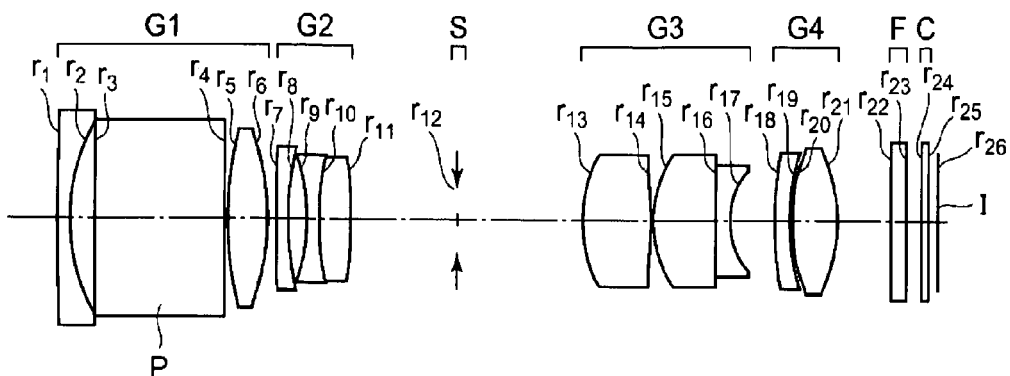
FIGS. 1A to 1C are sectional views showing a lens arrangement, along an extended line, in Example 1 of an optical path bending type zoom lens system in the present invention when focused on an infinite object.

As described above, in the present invention, a first type of zoom lens system comprises, in order from an object side: a first lens unit having a positive refractive power; a second lens unit having a negative refractive power; a third lens unit having a positive refractive power; and a fourth lens unit having a positive refractive power. The zoom lens system has four lens units in total.

During zooming from a wide-angle end toward a telephoto end, the first lens unit is fixed, at least the second lens unit and the third lens unit move, and a space between the third lens unit and the fourth lens unit changes. The second lens unit is positioned closer to an image-surface side in the telephoto end than in the wide-angle end. The third lens unit is positioned closer to the object side in the telephoto end than in the wide-angle end. The first lens unit comprises a reflective optical element which reflects an optical path.

The zoom lens system satisfies the following condition:

$$0.5 < f_{1G}/f_w < 3.5 \qquad (1A),$$

wherein $f_{1G}$ denotes a focal length of the first lens unit, and $f_w$ denotes a focal length of the zoom lens system in the wide-angle end.

The above zoom lens system includes, in order from an object, four positive, negative, positive, and positive lens units. Moreover, the positive first lens unit includes the reflective optical element, and a thin zoom lens system is constituted in which the optical path is bent by the reflection. The zooming is performed mainly by moving the second lens unit and the third lens unit.

At this time, when a zooming function is performed mainly by the second lens unit, a movement amount of the second lens unit increases. This easily increases the height of an off-axial ray incident upon the first lens unit. Therefore, it becomes difficult to reduce a lens diameter of the first lens unit.

To solve the problem, in this zoom lens system, the third lens unit is also provided with a zooming function, and a burden of the zooming function imposed on the second lens unit is reduced. Accordingly, the movement amount of the second lens unit is reduced. Therefore, a height of ray in the first lens unit can be reduced.

Moreover, in this zoom lens system, the positive power of the first lens unit is set so as to satisfy the condition (1A). In consequence, the lens of the first lens unit can be miniaturized to reduce a bent thickness of the zoom lens system.

Below the lower limit of 0.5 of the condition (1A), the power of the first lens unit is strengthened, and this is advantageous in miniaturizing the first lens unit. However, in the first lens unit, a large spherical aberration or astigmatism is generated, and it becomes difficult to correct aberrations of the whole lens system.

On the other hand, above the upper limit of 3.5 of the condition (1A), the power of the first lens unit weakens, the movement amount of the second lens unit increases, and the first lens unit is easily enlarged in size. Alternatively, the positive refractive power of the third lens unit is strengthened, and it becomes difficult to reduce, with fewer lenses, aberration fluctuations generated by the movement of the third lens unit.

When the following constitutions are introduced in addition to the above basic constitution, a more satisfactory zoom lens system can be obtained.

The above zoom lens system preferably satisfies the following condition:

$$0.5 < |f_{2G}/f_w| < 1.8 \qquad (2A),$$

wherein $f_{2G}$ is a focal length of the second lens unit.

The condition (2A) appropriately defines the power of the second lens unit. If the condition (2A) is below the lower limit of 0.5, and the power of the second lens unit is strengthened, the movement amount of the second lens unit decreases, and this is advantageous in reducing a total length. However, the astigmatism or a distortion is easily generated, and it becomes difficult to correct the aberrations of the whole lens system.

Above the upper limit of 1.8 in the condition (2A), the movement amount of the second lens unit excessively increases, and it becomes difficult to shorten the total length.

Moreover, the above zoom lens system preferably satisfies the following condition:

$$0.7 < m_{2GZ}/m_{3GZ} < 1.2 \qquad (3A),$$

wherein $m_{2GZ}$ denotes a ratio of a magnification of the second lens unit in the telephoto end to that in the wide-angle end when the zoom lens system is focused on an infinite object, and $m_{3GZ}$ denotes a ratio of a magnification of the third lens unit in the telephoto end to that in the wide-angle end when the zoom lens system is focused on the infinite object.

The condition (3A) appropriately defines the burden of the zooming function shared by the second lens unit and the third lens unit. Above the upper limit of 1.2 in the condition (3A), the burden of the zooming function share by the second lens unit increases, and the movement amount of the second lens unit increases. Therefore, the diameter of the first lens unit easily becomes large. Alternatively, the refractive power of the second lens unit increases, and the aberration fluctuations by the movement of the second lens unit are not easily reduced.

Below the lower limit of 0.7 in the condition (3A), the burden of the zooming function shared by the third lens unit increases, and the movement amount of the third lens unit easily increases. Therefore, the total length easily increases. Alternatively, the refractive power of the third lens unit increases, and the aberration fluctuations by the movement of the third lens unit are not easily reduced.

Furthermore, the above zoom lens system preferably satisfies the following condition:

$$-0.2 < f_w/R_1 < 0.2 \qquad (4A),$$

wherein $R_1$ denotes a paraxial radius of curvature of an object-side surface of the lens closest to the object side in the first lens units.

The condition (4A) defines the paraxial radius of curvature of the object-side surface of the lens closest to the object side in the first lens unit. Below the lower limit of −0.2, a large negative distortion is easily generated in the wide-angle end.

Above the upper limit of 0.2 in the condition (4A), an off-axial aberration is advantageously corrected. On the other hand, a vertex of a lens surface easily protrudes toward the object side, and it becomes difficult to constitute the system to be thin.

Moreover, in the above zoom lens system, the first lens unit is preferably constituted of, in order from the object side, a negative meniscus lens directing its convex surface on the object side, a reflective optical element for bending the optical path, and a positive sub-unit.

When the first lens unit is provided with the reflective optical element for bending the optical path, there inevitably arises a tendency to deepen an entrance pupil position. Therefore, a diameter or a size of each optical element constituting the first lens unit increases, and the optical path bending type system is not physically easily established. Therefore, the first lens unit is constituted of, in order from the object side, the negative meniscus lens directing its convex surface on the object side, the reflective optical element for bending the optical path, and the positive sub-unit. According to this constitution, a chief ray becomes nearly parallel with the optical axis in the space required for disposing the reflective optical element, and this can inhibit the increase of the diameter of the optical element.

To miniaturize the image taking apparatus in the height direction or the lateral direction, it is preferable that the positive sub-unit is constituted of one positive lens.

Furthermore, the first lens unit may be constituted of, in order from the object side, a negative sub-unit, a reflective optical element for bending the optical path, and a positive sub-unit so that the negative sub-unit satisfies the following condition:

$$0.5 < |f_{L1}/f_w| < 2.5 \qquad (5A),$$

wherein $f_{L1}$ denotes a focal length of the negative sub-unit of the first lens unit.

To constitute the entrance pupil to be shallow so that the optical path can physically be bent, the power of the negative sub-unit of the first lens unit may be set to be appropriately strong as in the condition (5A).

Above the upper limit of 2.5 in the condition (5A), the entrance pupil remains to be deep. Therefore, when an angle of field is secured to a certain degree, the diameter or the size of each optical element constituting the first lens unit increases, and the optical path is not physically easily bent.

Below the lower limit of 0.5 in the condition (5A), the magnification of the lens unit or lens units, which are disposed subsequently to the first lens unit and being constituted to move for the zooming, comes close to zero. This easily generates a problem such that the movement amount increases or the zooming ratio decreases. Moreover, it becomes difficult to correct an off-axial aberration such as distortion, or a chromatic aberration.

In the above zoom lens system, focusing on an object at a short distance may be performed only by moving the fourth lens unit toward the object side.

When the fourth lens unit is moved toward the object side to perform the focusing, there are preferably less fluctuations of the off-axial aberration at the short distance.

In a case where the zoom lens system is used as a photographing optical system of the image taking apparatus, it is preferable that an image sensor is disposed on the image side of the zoom lens system, the image sensor having a light receiving surface and converting an optical image formed by the zoom lens system into an electric signal. Furthermore, the following condition is preferably satisfied:

$$1.6 < f_w/ih < 1.9 \quad (6A),$$

wherein ih denotes a maximum image height in an effective image taking region of the light receiving surface.

The condition (6A) defines the focal length of the zoom lens system with respect to the maximum image height in the wide-angle end. Below the lower limit of 1.6 in the condition (6A), the angle of field in the wide-angle end is reduced, and this is contrary to a purpose of enlarging the angle of field.

On the other hand, above the upper limit of 1.9, the angle of field becomes excessively large. To secure the bent optical path, the thickness of the zoom lens system is increased.

This condition (6A) defines the range of the focal length $f_w$ in the wide-angle end in the condition (1A) or the like.

It is to be noted that the effective image taking region of the light receiving surface means a region for obtaining image information for use in printing or displaying an image. The region is disposed on the light receiving surface of the image sensor which receives the optical image formed by the zoom lens system.

Figure 20:
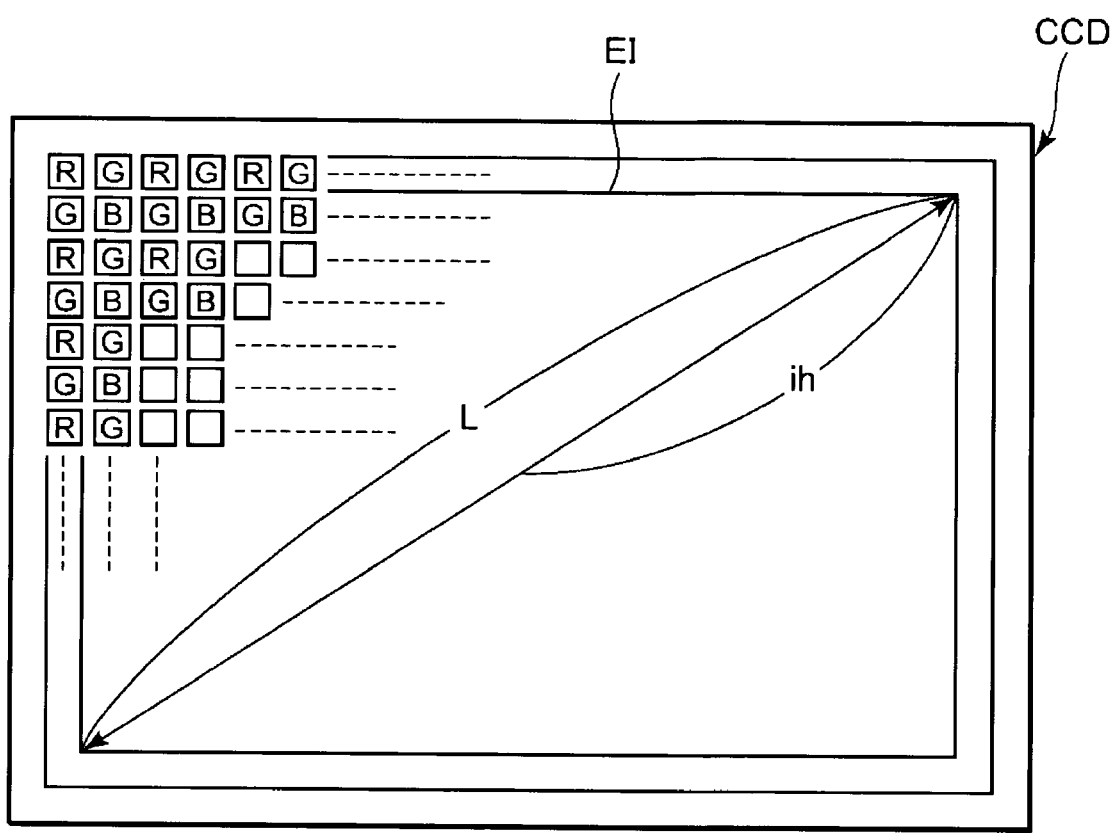
FIG. 20 is a diagram showing one example of a pixel arrangement of an image sensor.

In a case where the effective image taking region of the image sensor is rectangular, and the optical axis of the zoom lens system passes through the center of the effective image taking region, the maximum image height ih in the effective image taking region of the light receiving surface is ½ of a diagonal length L of the effective image taking region. The diagonal length L of the effective image taking region will be described. FIG. 20 is a diagram showing one example of a pixel arrangement on the light receiving surface of the image sensor. In this example, red (R), green (G) and blue (B) pixels are arranged at an equal pitch in a mosaic form. The effective image taking region means a region in the light receiving surface of the image sensor for use in reproducing photographed image (displaying the image in a personal computer, printing the image by a printer or the like).

As shown in, for example, FIG. 20, an effective image taking region EI is sometimes set to be smaller than the whole light receiving surface of the image sensor in accordance with a performance of the optical system. For example, in an image (image circle) obtained by the optical system, the image quality of the peripheral portion is inferior to that of the center in many cases. In such case, as an example in which the region is set to be small, a part of the peripheral portion of the image circle is not used in reproducing the image. The diagonal length L of the effective image taking region is a diagonal length of this effective image taking region. It is to be noted that an image taking region for use in reproducing the video can be variously changed, and the maximum image height ih in the effective image taking region changes, in a case where the above zoom lens system is used in the image taking apparatus having such function. In such case, it is assumed that the effective image taking region which defines the maximum image height ih is an effective image taking region where ih is maximized.

The above zoom lens system has a wide angle, and is advantageous in reducing the thickness or the total length.

The zoom lens system has been described above in detail, and the image taking apparatus has been briefly described in which the zoom lens system is combined with the image sensor. Next, there will be described in more detail the image taking apparatus including the optical path bending type zoom lens system and the image sensor.

In the present invention, a first type of image taking apparatus comprises:

a zoom lens system; and an image sensor which is disposed on an image side of the zoom lens system, which has a light receiving surface and which converts an optical image formed by the zoom lens system into an electric signal.

The zoom lens system comprises, in order from an object side: a first lens unit having a positive refractive power; a second lens unit having a negative refractive power; a third lens unit having a positive refractive power; and a fourth lens unit having a positive refractive power. The zoom lens system has four lens units in total.

During zooming from a wide-angle end toward a telephoto end, the first lens unit is fixed to an image surface on the light receiving surface, at least the second lens unit and the third lens unit move, and a space between the third lens unit and the fourth lens unit changes. The second lens unit is positioned closer to an image-surface side in the telephoto end than in the wide-angle end. The third lens unit is positioned closer to the object side in the telephoto end than in the wide-angle end. The first lens unit comprises a reflective optical element which reflects an optical path.

The apparatus satisfies the following conditions:

$$1.6 < f_w/ih < 1.9 \quad (6A); \text{ and}$$

$$0.85 < f_{1G}/ih < 6.0 \quad (7A),$$

wherein $f_{1G}$ denotes a focal length of the first lens unit, $f_w$ denotes a focal length of the zoom lens system in the wide-angle end, and ih denotes a maximum image height in an effective image taking region of the light receiving surface.

The condition (6A) defines a relation between the focal length and the maximum image height of the effective image taking region in the wide-angle end. Below the lower limit of 1.6 in the condition (6A), the angle of field in the wide-angle end is unfavorably reduced.

On the other hand, above the upper limit of 1.9 in the condition (6A), the angle of field becomes excessively large. To secure the bent optical path, the thickness of the zoom lens system is increased.

The condition (7A) defines a relation between the focal length of the first lens unit and the maximum image height. The purpose of setting the condition is similar to that of setting the condition (1A). If the condition (7A) is below the lower limit of 0.85, and the power of the first lens unit is strengthened, the first lens unit is advantageously miniaturized. However, a spherical aberration or astigmatism is largely generated in the first lens unit, and it becomes difficult to correct the aberration of the whole lens system.

On the other hand, above the upper limit of 6.0 in the condition (7A), the power of the first lens unit weakens, the movement amount of the second lens unit increases, and the first lens unit is easily enlarged in size. Alternatively, the positive refractive power of the third lens unit is strengthened, and it becomes difficult to reduce, with fewer lenses, aberration fluctuations generated by the movement of the third lens unit.

The image taking apparatus preferably satisfies the following condition:

$$0.85 < |f_{2G}/ih| < 3.1 \tag{8A}$$

wherein $f_{2G}$ denotes a focal length of the second lens unit.

The condition (8A) defines a relation between the power of the second lens unit and the maximum image height. The purpose of setting the condition is similar to that of setting the condition (2A). If the condition (8A) is below the lower limit of 0.85, and the power of the second lens unit is strengthened, the movement amount of the second lens unit decreases. This is advantageous in reducing the total length of the zoom lens system. However, astigmatism or a distortion is largely generated, and it becomes difficult to correct the aberration of the whole lens system.

Above the upper limit of 3.1 in the condition (8A), the movement amount of the second lens unit becomes excessively large, and it becomes difficult to shorten the total length.

Moreover, it is preferable that the above image taking apparatus satisfies the following condition:

$$0.7 < m_{2GZ}/m_{3GZ} < 1.2 \tag{3A}$$

wherein $m_{2GZ}$ denotes a ratio of the magnification of the second lens unit in the telephoto end to that in the wide-angle end when the zoom lens system is focused on an infinite object, and $m_{3GZ}$ denotes a ratio of the magnification of the third lens unit in the telephoto end to that in the wide-angle end when the zoom lens is focused on the infinite object.

The reason for the above constitution and the function and the effect of the constitution are as described above.

Moreover, it is preferable that the above image taking apparatus satisfies the following condition:

$$-0.118 < ih/R_1 < 0.118 \tag{9A}$$

wherein $R_1$ denotes a paraxial radius of curvature of the object-side surface of a lens closest to the object side in the first lens unit.

The condition (9A) defines a relation between the paraxial radius of curvature of the object-side surface of the lens closest to the object side in the first lens unit and the maximum image height. The purpose of setting the condition is similar to that of setting the condition (4A). Below the lower limit of −0.118 in the condition (9A), a large negative distortion is easily generated in the wide-angle end.

Above the upper limit value of 0.118 in the condition (9A), an off-axial aberration is advantageously corrected. However, the vertex of the lens surface easily protrudes toward the object side, and it becomes difficult to constitute the system to be thin.

Moreover, in the above image taking apparatus, the first lens unit of the zoom lens system includes, in order from the object side, a negative meniscus lens directing its convex surface on the object side, a reflective optical element for bending the optical path, and a positive sub-unit.

The reason for the above constitution and the function and the effect of the constitution are as described above.

Furthermore, the first lens unit may be constituted of, in order from the object side, a negative sub-unit, a reflective optical element for bending the optical path, and a positive sub-unit so that the negative sub-unit satisfies the following condition:

$$0.85 < |f_{L1}/ih| < 4.25 \tag{10A}$$

wherein $f_{L1}$ denotes a focal length of the negative sub-unit of the first lens unit.

The condition (10A) defines a relation between the focal length of the negative sub-unit constituting a front sub-unit of the first lens unit and the maximum image height. The purpose of setting the condition is similar to that of the condition (5A), and the power of the negative sub-unit of the first lens unit may be appropriately strengthened.

Above the upper limit of 4.25 in the condition (10A), the entrance pupil remains to be deep. Therefore, when the angle of field is secured to a certain degree, the diameter or the size of each optical element constituting the first lens unit increases, and the optical path is not physically easily bent.

Below the lower limit of 0.85 in the condition (10A), the magnification of the lens unit or lens units, which are disposed subsequently to the first lens unit and are constituted to move for the zooming, comes close to zero. This easily generates a problem such that the movement amount increases or the zooming ratio decreases. Moreover, it becomes difficult to correct an off-axial aberration such as the distortion, or a chromatic aberration.

To miniaturize the image taking apparatus in the thickness direction, the negative sub-unit is preferably constituted of a single lens.

To miniaturize the image taking apparatus in the height direction or the lateral direction, the positive sub-unit is preferably constituted of a single lens.

Moreover, in the above image taking apparatus, the fourth lens unit may be moved toward the object side to thereby focus on an object at a short distance.

The reason for the constitution and the function and the effect of the constitution are as described above.

Furthermore, in the above image taking apparatus, it is preferable that the positive sub-unit of the first lens unit of the zoom lens system satisfies the following condition:

$$1.5 < f_{L2}/ih < 4.0 \tag{11A}$$

wherein $f_{L2}$ denotes a focal length of the positive sub-unit of the first lens unit.

The condition (11A) defines a relation between the focal length of the positive sub-unit constituting a rear sub-unit of the first lens unit and the maximum image height. The power of the negative sub-unit of the first lens unit may appropriately be strengthened. In this case, an off-axial aberration such as the distortion is easily generated. Therefore, when an appropriately strong power is also imparted to the positive sub-unit disposed close to the negative sub-unit, the aberration is easily prevented from being generated. This is also advantageous in constituting the first lens unit to be compact.

Above the upper limit of 4.0 in the condition (11A), the power of the positive sub-unit is reduced. This is disadvantageous in sufficiently correcting the off-axial aberration.

Below the lower limit of 1.5 in the condition (11A), the power of the positive sub-unit becomes excessively strong, and it becomes difficult to correct the aberration of this lens unit.

In the above image taking apparatus, it is preferable to dispose an aperture stop between the second lens unit and the third lens unit.

This constitution is advantageous in substantially disposing the exit pupil at infinity while balancing the size of the whole lens system, that is, in constituting the whole lens system as an image-side telecentric optical system.

In a case where the aperture stop is disposed, the following constitution is especially preferable.

That is, it is preferable that the position of the aperture stop in the wide-angle end satisfies the following condition:

$$0.5 < D_{2GS}/D_{S3G} < 1.0 \quad (12A),$$

wherein $D_{2GS}$ denotes an axial length from the second lens unit to the aperture stop in the wide-angle end, and $D_{S3G}$ denotes an axial length from the aperture stop to the third lens unit in the wide-angle end.

When the aperture stop is disposed close to the first lens unit and the second lens unit in the wide-angle end, the light beam transmitted through the first lens unit can be lowered. If the condition (12A) is below the lower limit of 0.5, and the aperture stop is separated from the third lens unit, the outer diameter of the third lens unit easily increases, and it becomes difficult to correct the aberration of the third lens unit.

If the condition (12A) is above the upper limit of 1.0, and the aperture stop is separated from the second lens unit, it becomes difficult to minimize the first lens unit.

Moreover, in the above image taking apparatus, it is preferable that an aperture stop is disposed between the second lens unit and the third lens unit, the surface closest to the image side in the third lens unit is a concave surface, and the following condition is satisfied:

$$0.5 < D_{2GS}/D_{S3G} < 1.0 \quad (12A); \text{ and}$$

$$0.5 < R_{3GE}/ih < 2.5 \quad (13A),$$

wherein $D_{2GS}$ denotes an axial length from the second lens unit to the aperture stop in the wide-angle end, $D_{S3G}$ denotes an axial length from the aperture stop to the third lens unit in the wide-angle end, and $R_{3GE}$ denotes a paraxial radius of curvature of the concave surface closest to the image side in the third lens unit.

An absolute value of the radius of curvature of the surface closest to the object side in the first lens unit is reduced, or the power of the front sub-unit having a negative refractive power is strengthened. This is advantageous in reducing the thickness of the first lens unit. On the other hand, an off-axial aberration is easily generated in the wide-angle end.

The condition (12A) specifies the position of the aperture stop as described above. When this condition is satisfied, an incidence height of a ray upon the first lens unit is advantageously lowered. This also increases the incidence height of the ray upon the concave surface as the exit surface of the third lens unit having a positive refractive power. Therefore, the concave surface can be provided with an effect of correcting the off-axial aberration.

The condition (13A) defines the paraxial radius of curvature of this concave surface. If the condition (13A) is below the lower limit of 0.5, the power of the concave surface becomes excessively strong. This is disadvantageous in correcting the aberration of the third lens unit itself. Above the upper limit of 2.5, the power of the concave surface weakens, and the function of correcting the off-axial aberration is degraded.

Moreover, in the image taking apparatus, it is preferable that the fourth lens unit satisfies the following condition:

$$3.3 < f_{4G}/ih < 6.6 \quad (14A),$$

wherein $f_{4G}$ denotes a focal length of the fourth lens unit.

The condition (14A) defines a relation between the appropriate refractive power of the fourth lens unit and the maximum image height. The fourth lens unit is disposed close to the image surface. Therefore, if the condition (14A) is below the lower limit of 3.3, and the power is excessively strengthened, the aberration is easily generated, the lenses are increased in number, and the system is easily enlarged in size. On the other hand, if the condition is above the upper limit of 6.6, and the power is excessively weak, it becomes difficult to secure telecentricity, or the space between the third lens unit and the fourth lens unit lengthens. This is disadvantageous in miniaturizing the system.

In the present invention, a second type of image taking apparatus comprises:

a zoom lens system; and an image sensor which is disposed on an image side of the zoom lens system, which has a light receiving surface and which converts an optical image formed by the zoom lens system into an electric signal.

The zoom lens system comprises, in order from an object side: a first lens unit having a positive refractive power; a second lens unit having a negative refractive power; a third lens unit having a positive refractive power; and a fourth lens unit having a positive refractive power. The zoom lens system has four lens units in total.

During zooming from a wide-angle end toward a telephoto end, the first lens unit is fixed, at least the second lens unit and the third lens unit move, and a space between the third lens unit and the fourth lens unit changes. The second lens unit is positioned closer to an image-surface side in the telephoto end than in the wide-angle end. The third lens unit is positioned closer to the object side in the telephoto end than in the wide-angle end. The first lens unit comprises a reflective optical element which reflects an optical path.

The apparatus satisfies the following conditions:

$$1.6 < f_w/ih < 1.9 \quad (6A);$$

$$0.85 < |f_{2G}/ih| < 3.1 \quad (8A);$$

$$1.0 < f_{3G}/ih < 3.7 \quad (15A); \text{ and}$$

$$0.7 < m_{2GZ}/m_{3GZ} < 1.2 \quad (3A),$$

wherein $f_w$ denotes a focal length of the whole zoom lens system in the wide-angle end, $f_{2G}$ denotes a focal length of the second lens unit, $f_{3G}$ denotes a focal length of the third lens unit, ih denotes a maximum image height in an effective image taking region of the light receiving surface, $m_{2GZ}$ denotes a ratio of a magnification of the second lens unit in the telephoto end to that in the wide-angle end when the zoom lens system is focused on an infinite object, and $m_{3GZ}$ denotes a ratio of a magnification of the third lens unit in the telephoto end to that in the wide-angle end when the zoom lens system is focused on the infinite object.

This image taking apparatus is advantageous in achieving miniaturization and enhancement of the zooming ratio of the zoom lens system whose optical path is bent while securing an angle of field.

The zoom lens system for use herein is a thin zoom lens constituted of four lens units including, in order from the object side, positive, negative, positive, and positive lens units. In the positive first lens unit, the optical path is bent by reflection. Moreover, the second lens unit and the third lens unit are constituted to perform movement which contributes to the zooming.

At this time, when the second lens unit largely contributes to the zooming function, the movement amount of the second lens unit increases. An incidence height of an off-axial ray upon the first lens unit easily increases in the wide-angle end, and it becomes difficult to reduce the lens diameter of the first lens unit.

Therefore, the third lens unit is also provided with the zooming function in this zoom lens system, and the burden of the zooming function imposed on the second lens unit is reduced, thereby reducing the movement amount of the second lens unit.

Moreover, the focal lengths of the second and third lens units are appropriately set to miniaturize the optical system whose optical path is bent.

The condition (6A) defines a relation between the focal length and the maximum image height of the effective image taking region in the wide-angle end. Below the lower limit of 1.6 in the condition (6A), the angle of field in the wide-angle end is unfavorably reduced. On the other hand, above the upper limit of 1.9 in the condition (6A), the angle of field becomes excessively large. To secure the bent optical path, the thickness of the zoom lens system is increased.

The condition (8A) defines a relation between the power of the second lens unit and the maximum image height. The purpose of setting the condition is similar to that of setting the condition (2A). If the condition (8A) is below the lower limit of 0.85, and the power of the second lens unit is strengthened, the movement amount of the second lens unit decreases. This is advantageous in reducing the total length of the zoom lens system. However, astigmatism or a distortion is largely generated, and it becomes difficult to correct the aberration of the whole lens system.

Above the upper limit of 3.1 in the condition (8A), the movement amount of the second lens unit excessively increases, and it becomes difficult to shorten the total length.

The condition (15A) defines a relation between the power of the third lens unit and the maximum image height. If the condition (15A) is below the lower limit of 1.0, and the power of the third lens unit is strengthened, the astigmatism or the distortion is largely generated, and it becomes difficult to correct the aberration of the whole lens system. Above the upper limit of 3.7 of the condition (15A), the movement amount of the third lens unit becomes excessively large, and it becomes difficult to reduce the total length.

The condition (3A) appropriately defines the burden of the zooming function shared by the second lens unit and the third lens unit. Above the upper limit of 1.2 in the condition (3A), the burden of the zooming function shared by the second lens unit increases, and the movement amount of the second lens unit increases. Therefore, the diameter of the first lens unit easily becomes large. Alternatively, the refractive power of the second lens unit increases, and the aberration fluctuations by the movement of the second lens unit are not easily reduced.

Below the lower limit of 0.7 in the condition (3A), the burden of the zooming function shared by the third lens unit increases, and the movement amount of the third lens unit easily increases. Therefore, the total length easily increases. Alternatively, the refractive power of the third lens unit increases, and the aberration fluctuations by the movement of the third lens unit are not easily reduced.

Moreover, the following constitution is preferable in order to miniaturize the system and satisfactorily correct the aberration while imposing the zooming burdens on the second and third lens units.

That is, the second lens unit is constituted of, in order from the object side, a negative single lens having a smaller absolute value of the paraxial radius of curvature in an image-side surface than in an object-side surface, and a cemented lens of a double-concave negative lens and a double-convex positive lens. The third lens unit is constituted of, in order from the object side, a plurality of positive lenses, and one or two negative lenses. The positive lens and the negative lens disposed adjacent to each other are cemented to constitute a cemented lens. The fourth lens unit is constituted of two lenses or one lens.

When the second lens unit includes, in order from the object side, two negative lenses and the double-convex positive lens, the position of the principal point comes close to the object. This is advantageous in reducing diameters of the first and second lens units. When a main negative power of the second lens unit is shared by two negative lenses, the aberration can satisfactorily be corrected. Since the cemented lens of the negative lens and the double-convex positive lens is disposed, a chromatic aberration of the second lens unit itself is easily corrected.

Moreover, a main positive power of the third lens unit is shared by a plurality of positive lenses. Furthermore, since the third lens unit includes, in order from the object side, a plurality of positive lenses and one or two negative lenses, and the position of the principal point is brought close to the object, the third lens unit can have a function of increasing the focal length in the telephoto end.

Furthermore, when the third lens unit is provided with the cemented lens of the positive and negative lenses, the chromatic aberration is easily corrected.

The fourth lens unit is positioned closest to the image surface in the zoom lens system. Therefore, when the number of lenses constituting the lens unit is reduced, the system is advantageously miniaturized. Thus, from a viewpoint of the miniaturization, it is preferable that the fourth lens unit is constituted of two lenses or one lens.

The above-described constitutions can be appropriately combined and introduced into the image taking apparatus. Accordingly, effects produced by the constitutions can be obtained at the same time.

Furthermore, the image taking apparatus may be constituted to satisfy at least one of the following constitutions.

That is, the image taking apparatus may be constituted to satisfy the following condition:

$$0.85 < f_{1G}/ih < 6.0 \tag{7A}$$

wherein $f_{1G}$ denotes a focal length of the first lens unit.

Moreover, the image taking apparatus may be constituted to satisfy the following condition:

$$-0.118 < ih/R_1 < 0.118 \tag{9A}$$

wherein $R_1$ denotes a paraxial radius of curvature of an object-side surface of a lens closest to the object side in the first lens unit.

Furthermore, in the image taking apparatus, the first lens unit may be constituted of, in order from the object side, a negative meniscus lens directing its convex surface on the object side, a reflective optical element for bending the optical path, and a positive sub-unit.

Furthermore, in the image taking apparatus, the first lens unit may be constituted of, in order from the object side, a negative sub-unit, a reflective optical element for bending the optical path, and a positive sub-unit so that the negative sub-unit satisfies the following condition:

$$0.85 < |f_{L1}/ih| < 4.25 \tag{10A}$$

wherein $f_{L1}$ denotes a focal length of the negative sub-unit of the first lens unit.

From a viewpoint of miniaturization, it is preferable that one or both of the positive sub-unit and the negative sub-unit is constituted of a single lens.

Moreover, the positive sub-unit of the first lens unit may be constituted to satisfy the following condition:

$$1.5 < f_{L2}/ih < 4.0 \quad (11A),$$

wherein $f_{L2}$ denotes a focal length of the positive sub-unit of the first lens unit.

Furthermore, the image taking apparatus may be constituted so as to dispose an aperture stop between the second lens unit and the third lens unit.

In the wide-angle end, the aperture stop is preferably disposed in a position which satisfies the following condition:

$$0.5 < D_{2GS}/D_{S3G} < 1.0 \quad (12A),$$

wherein $D_{2GS}$ denotes an axial length from the second lens unit to the aperture stop in the wide-angle end, and $D_{S3G}$ denotes an axial length from the aperture stop to the third lens unit in the wide-angle end.

Moreover, in the image taking apparatus, an aperture stop is disposed between the second lens unit and the third lens unit, and the surface closest to the image side in the third lens unit is a concave surface which can be constituted to satisfy the following conditions:

$$0.5 < D_{2GS}/D_{S3G} < 1.0 \quad (12A); \text{ and}$$

$$0.5 < R_{3GE}/ih < 2.5 \quad (13A),$$

wherein $D_{2GS}$ denotes an axial length from the second lens unit to the aperture stop in the wide-angle end, $D_{S3G}$ denotes an axial length from the aperture stop to the third lens unit in the wide-angle end, and $R_{3GE}$ denotes a paraxial radius of curvature of the concave surface closest to the image side in the third lens unit.

Moreover, in the image taking apparatus, the fourth lens unit may be constituted to satisfy the following condition:

$$3.3 < f_{4G}/ih < 6.6 \quad (14A),$$

wherein $f_{4G}$ denotes a focal length of the fourth lens unit.

The upper and lower limit values of the above conditions (1A) to (15A) can be changed as follows.

As to the condition (1A), the lower limit value is more preferably set to 1.0, further 1.5, and the upper limit value is more preferably set to 3.0, further 2.5.

As to the condition (2A), the lower limit value is more preferably set to 0.8, further 1.3, and the upper limit value is more preferably set to 1.6, further 1.5.

As to the condition (3A), the lower limit value is more preferably set to 0.75, further 0.77, and the upper limit value is more preferably set to 1.1, further 1.05.

As to the condition (4A), the lower limit value is more preferably set to −0.1, further −0.05, and the upper limit value is more preferably set to 0.15, further 0.1.

As to the condition (5A), the lower limit value is more preferably set to 1.0, further 1.5, and the upper limit value is more preferably set to 2.2, further 2.0.

As to the condition (6A), the lower limit value is more preferably set to 1.63, further 1.66, and the upper limit value is more preferably set to 1.8, further 1.75.

As to the condition (7A), the lower limit value is more preferably set to 1.7, further 2.55, and the upper limit value is more preferably set to 5.1, further 4.25.

As to the condition (8A), the lower limit value is more preferably set to 1.36, further 2.21, and the upper limit value is more preferably set to 2.72, further 2.55.

As to the condition (9A), the lower limit value is more preferably set to −0.059, further −0.029, and the upper limit value is more preferably set to 0.088, further 0.059.

As to the condition (10A), the lower limit value is more preferably set to 1.7, further 2.55, and the upper limit value is more preferably set to 3.74, further 3.4.

As to the condition (11A), the lower limit value is more preferably set to 1.8, further 2.2, and the upper limit value is more preferably set to 3.5, further 3.0.

As to the condition (12A), the lower limit value is more preferably set to 0.6, further 0.65, and the upper limit value is more preferably set to 0.95, further 0.9.

As to the condition (13A), the lower limit value is more preferably set to 0.7, further 0.9, and the upper limit value is more preferably set to 2.0, further 1.5.

As to the condition (14A), the lower limit value is more preferably set to 3.5, further 3.7, and the upper limit value is more preferably set to 5.5, further 5.3.

As to the condition (15A), the lower limit value is more preferably set to 2.0, further 2.5, and the upper limit value is more preferably set to 3.4, further 3.1.

It is to be noted that the above constitutions or conditions are appropriately combined to produce effects. Therefore, they are more effective.

The above-described optical path bending type zoom lens system and the image taking apparatus are small in the thickness direction. Moreover, the angle of field can sufficiently be secured. The bent constitution is miniaturized while obtaining a large angle of field. In consequence, the size of the image taking apparatus can be reduced in the height direction or the lateral direction.

Next, there will be described numerical examples of the first type of optical path bending type zoom lens system.

FIGS. 1A to 4C show lens sectional views when the zoom lens system is focused on an infinite object in Examples 1 to 4. In these drawings, FIGS. 1A, 2A, 3A and 4A are lens sectional views in a wide-angle end. FIGS. 1B, 2B, 3B and 4B are lens sectional views in an intermediate state. FIGS. 1C, 2C, 3C and 4C are lens sectional views in a telephoto end. In these drawings: the first lens unit is denoted with G1; the second lens unit is denoted with G2; the aperture stop is denoted with S; the third lens unit is denoted with G3; the fourth lens unit is denoted with G4; F denotes an optical low pass filter having an IR cut coating surface; C denotes cover glass of the electronic image sensor such as a CCD image sensor or a CMOS image sensor; and the image surface (light receiving surface) of the CCD image sensor, the CMOS image sensor or the like is denoted with I. Moreover, P denotes an optical path bending prism in the first lens unit G1, which is shown as a parallel flat plate developed on a straight optical axis. It is to be noted that as shown, the surface of the optical low pass filter F may directly be coated with an IR cut coating, or an IR cutting absorbent filter may separately be disposed. Alternatively, a transparent flat plate whose incidence surface is coated with the IR cut coating may be used.

FIG. 5 is a diagram showing a state in which the optical path of FIG. 1A is bent. The optical path bending prism P is constituted of a reflective prism which bends the optical path by 90°. It is to be noted that in Examples 1 to 4, the reflection position is in the center between the incidence surface and the exit surface of the parallel flat plate P. Moreover, the reflecting direction of the optical path bending prism P is a longitudinal direction (the vertical direction when the incident optical path is in the horizontal direction) of the image taking apparatus, and a short-side direction of the light receiving surface of the electronic image sensor. It is to be noted that the reflecting direction may be a long-side direction of the light receiving surface.

Figure 1B:
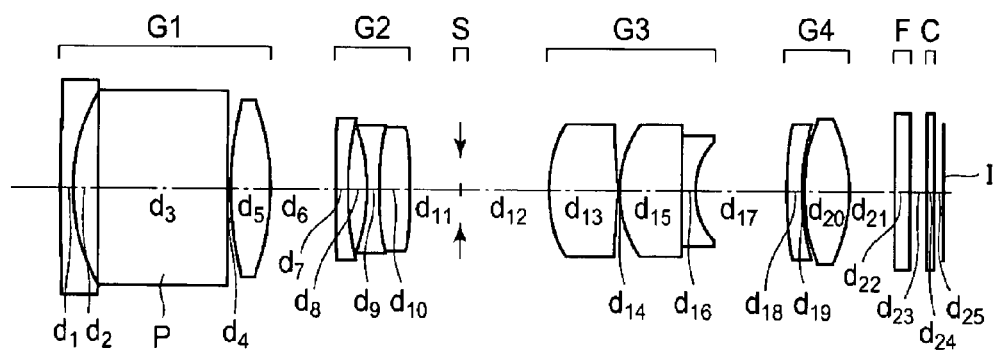
Figure 1C:
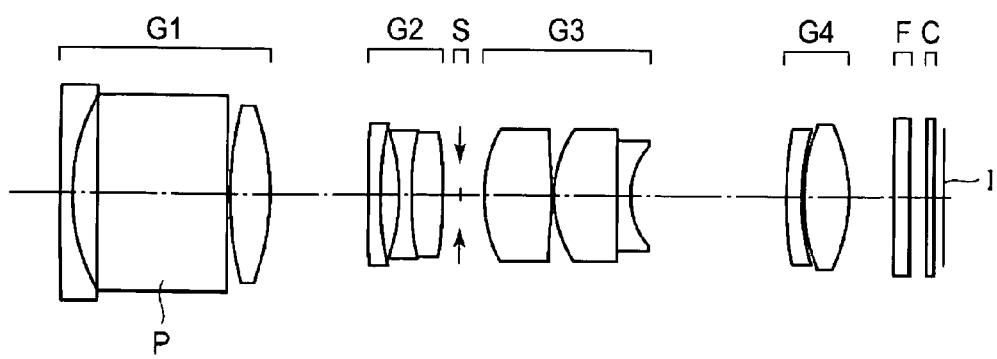

As shown in FIGS. 1A to 1C, the zoom lens system of Example 1 is constituted of, in order from an object side: a first lens unit G1 having a positive refractive power; a second lens unit G2 having a negative refractive power; an aperture stop S; a third lens unit G3 having a positive refractive power; and a fourth lens unit G4 having a positive refractive power. When zooming is performed from the wide-angle end toward the telephoto end, the first lens unit G1 is fixed, the second lens unit G2 moves toward an image surface, the aperture stop S is substantially fixed, the third lens unit G3 moves toward the object, the fourth lens unit G4 moves along a locus concave toward the object while broadening the space between the third lens unit G3 and the fourth lens unit, and the fourth lens unit is positioned closer to the image-surface side in the telephoto end than in the wide-angle end.

The first lens unit G1 includes, in order from the object side, a negative meniscus lens directing its convex surface on the object side, an optical path bending prism P, and a double-convex positive lens. The second lens unit G2 includes, in order from the object side, a negative meniscus lens directing its convex surface on the object side, and a cemented lens of a double-concave negative lens and a double-convex positive lens. The third lens unit G3 includes, in order from the object side, a double-convex positive lens and a cemented lens of a positive meniscus lens directing its convex surface on the object side and a negative meniscus lens directing its convex surface on the object side. The fourth lens unit G4 includes, in order from the object side, a negative meniscus lens directing its convex surface on the object side and a double-convex positive lens.

Aspherical surfaces are used on six surfaces: opposite surfaces of the double-convex positive lens of the first lens unit G1; opposite surfaces of the double-convex positive lens of the third lens unit G3; and opposite surfaces of the double-convex positive lens of the fourth lens unit G4.

Figure 2A:
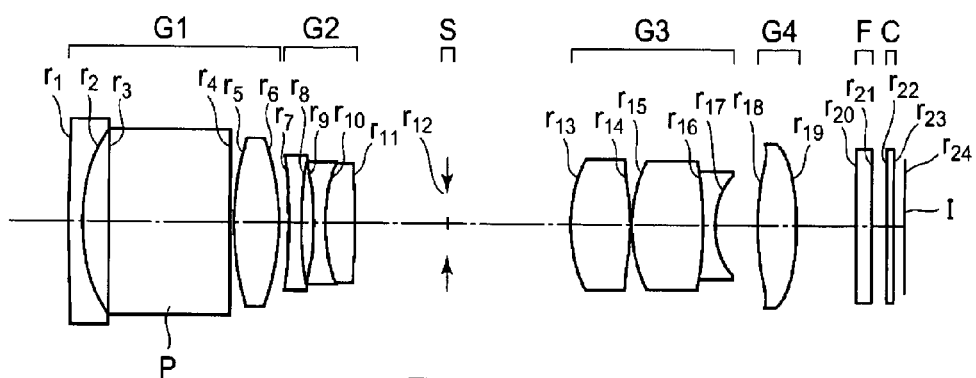
FIGS. 2A to 2C are sectional views showing a lens arrangement, along an extended line, in Example 2 of an optical path bending type zoom lens system in the present invention when focused on an infinite object.
Figure 2B:
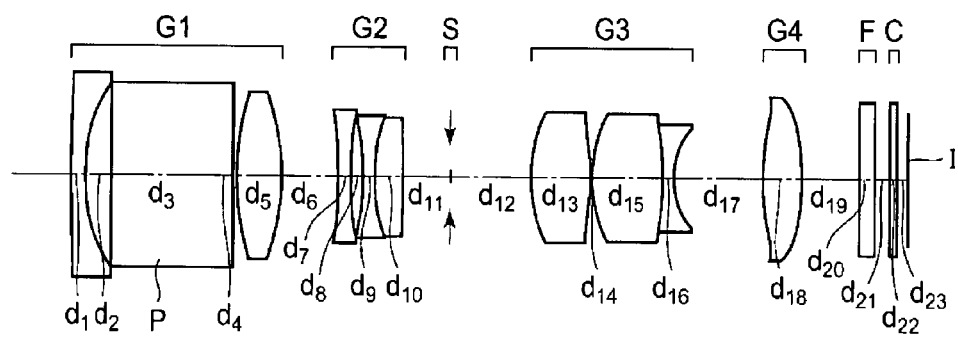
Figure 2C:
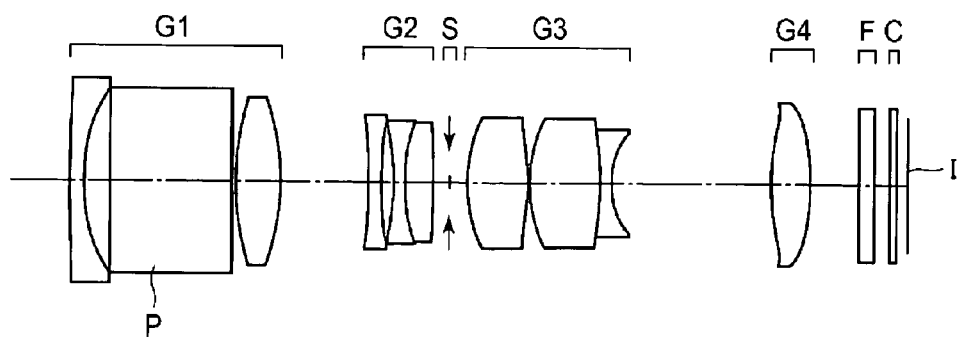

As shown in FIGS. 2A to 2C, the zoom lens system of Example 2 is constituted of, in order from an object side: a first lens unit G1 having a positive refractive power; a second lens unit G2 having a negative refractive power; an aperture stop S; a third lens unit G3 having a positive refractive power; and a fourth lens unit G4 having a positive refractive power. When zooming is performed from the wide-angle end toward the telephoto end, the first lens unit G1 is fixed, the second lens unit G2 moves toward the image surface, the aperture stop S is fixed, the third lens unit G3 moves toward the object, and the fourth lens unit G4 moves toward the image surface while broadening the space between the third lens unit G3 and the fourth lens unit.

The first lens unit G1 includes, in order from the object side, a negative meniscus lens directing its convex surface on the object side, an optical path bending prism P, and a double-convex positive lens. The second lens unit G2 includes, in order from the object side, a double-concave negative lens, and a cemented lens of a double-concave negative lens and a double-convex positive lens. The third lens unit G3 includes, in order from the object side, a double-convex positive lens, and a cemented lens of a double-convex positive lens and a double-concave negative lens. The fourth lens unit G4 includes one double-convex positive lens.

Aspherical surfaces are used on six surfaces: opposite surfaces of the double-convex positive lens of the first lens unit G1; opposite surfaces of the double-convex positive lens of the third lens unit G; and opposite surfaces of the double-convex positive lens of the fourth lens unit G4.

Figure 3A:
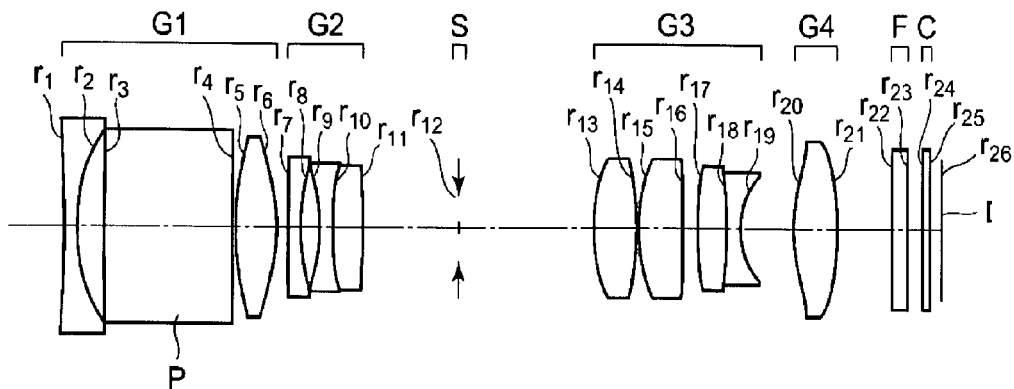
FIGS. 3A to 3C are sectional views showing a lens arrangement, along an extended line, in Example 3 of an optical path bending type zoom lens system in the present invention when focused on an infinite object.
Figure 3B:
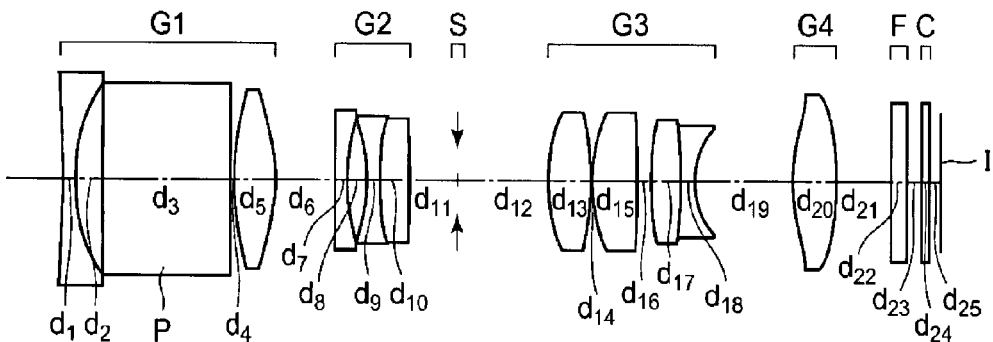
Figure 3C:
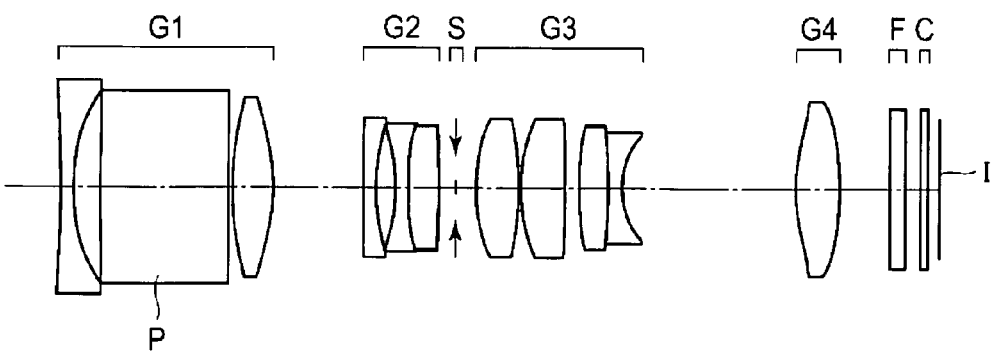

As shown in FIGS. 3A to 3C, the zoom lens system of Example 3 is constituted of, in order from an object side: a first lens unit G1 having a positive refractive power; a second lens unit G2 having a negative refractive power; an aperture stop S; a third lens unit G3 having a positive refractive power; and a fourth lens unit G4 having a positive refractive power. When zooming is performed from the wide-angle end toward the telephoto end, the first lens unit G1 is fixed, the second lens unit G2 moves toward the image surface, the aperture stop S is substantially fixed, the third lens unit G3 moves toward the object, and the fourth lens unit G4 moves toward the image surface while broadening the space between the third lens unit G3 and the fourth lens unit.

The first lens unit G1 includes, in order from the object side, a double-concave negative lens, an optical path bending prism P, and a double-convex positive lens. The second lens unit G2 includes, in order from the object side, a negative meniscus lens directing its convex surface on the object side, and a cemented lens of a double-concave negative lens and a double-convex positive lens. The third lens unit G3 includes, in order from the object side, two double-convex positive lenses, and a cemented lens of a double-convex positive lens and a double-concave negative lens. The fourth lens unit G4 includes one double-convex positive lens.

Aspherical surfaces are used on six surfaces: opposite surfaces of the double-convex positive lens of the first lens unit G1; opposite surfaces of the double-convex positive lens arranged closest to the object in the third lens unit G; and opposite surfaces of the double-convex positive lens of the fourth lens unit G4.

Figure 4A:
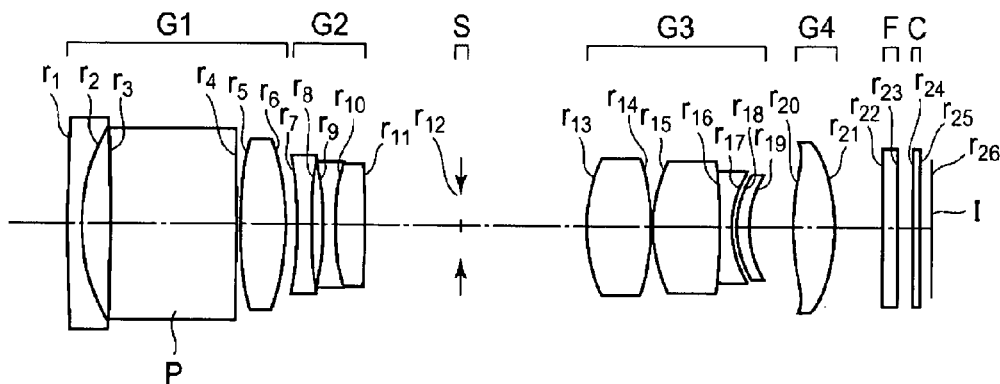
FIGS. 4A to 4C are sectional views showing a lens arrangement, along an extended line, in Example 4 of an optical path bending type zoom lens system in the present invention when focused on an infinite object.
Figure 4B:
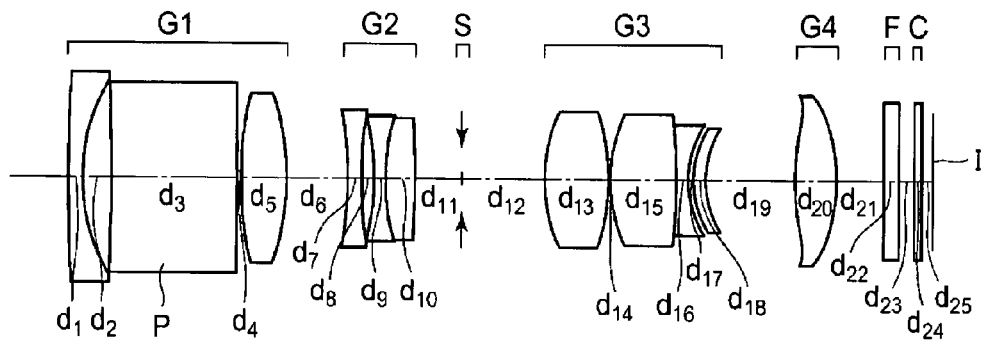
Figure 4C:
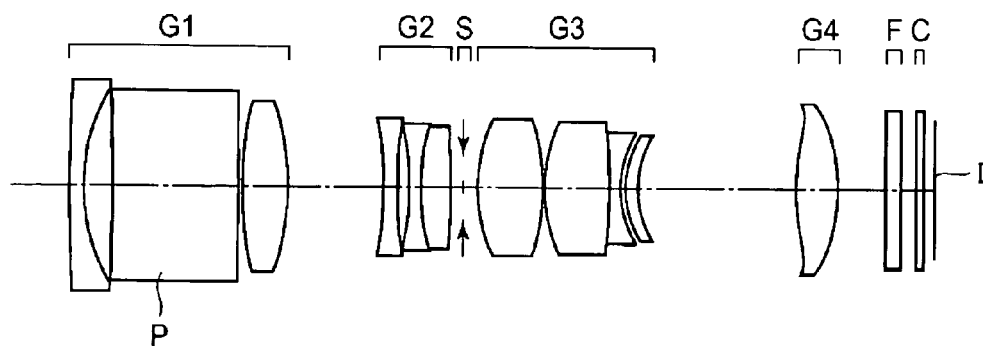
Figure 6A:
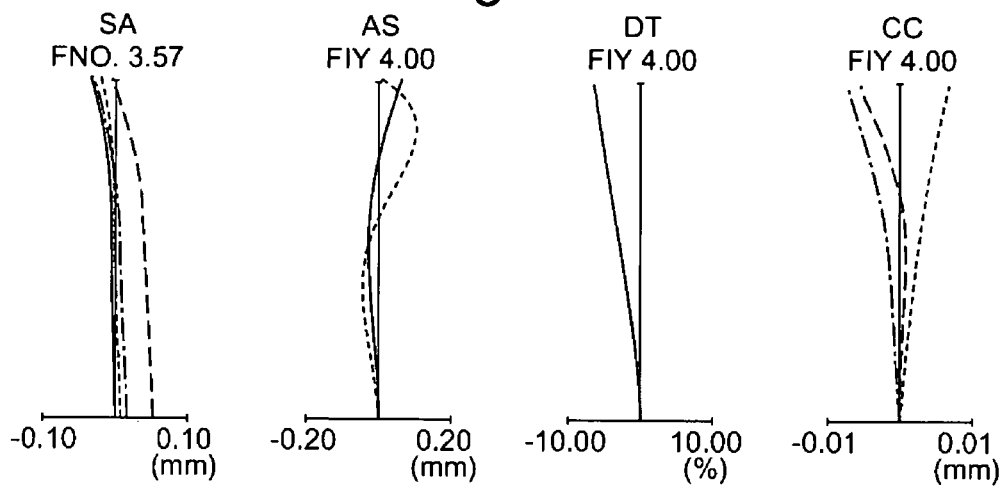
FIGS. 6A to 6C are aberration diagrams during the focusing on the infinitely far object point in Example 1.
Figure 6B:
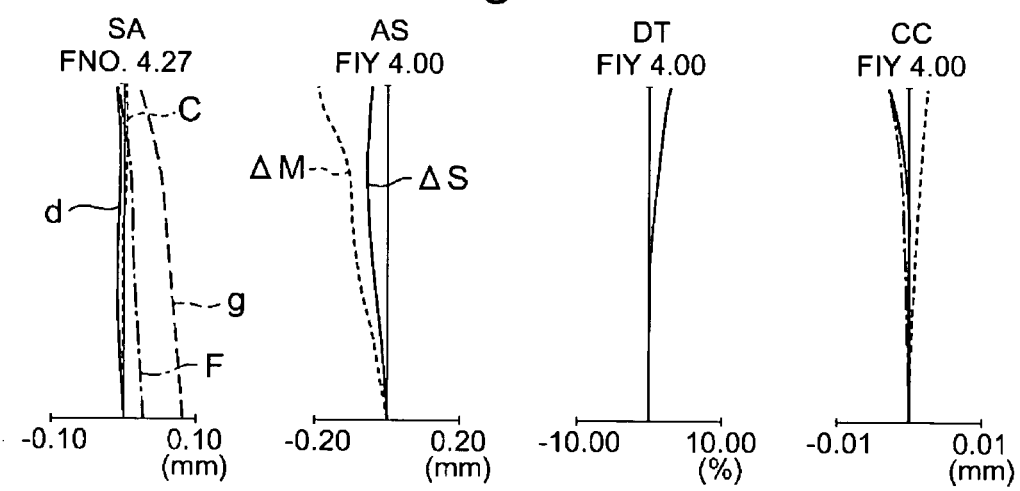
Figure 6C:
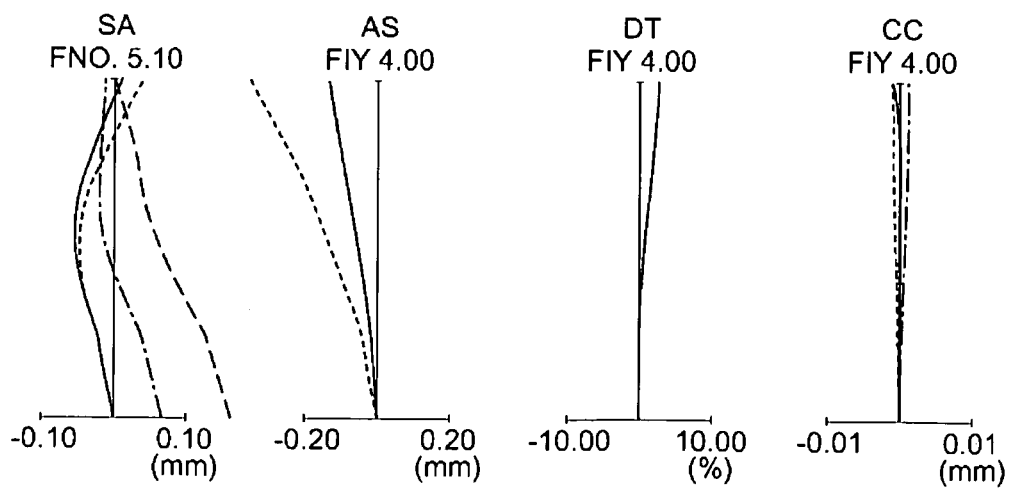
Figure 7A:
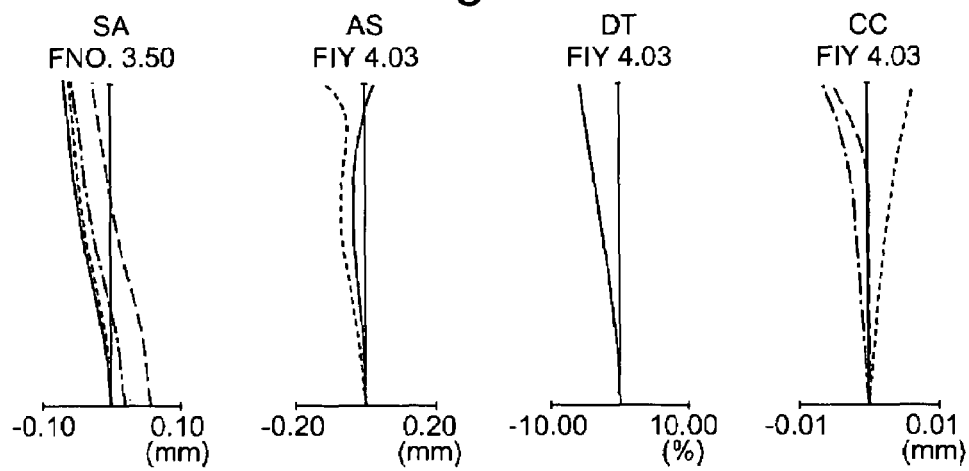
FIGS. 7A to 7C are aberration diagrams when focused on the infinite object in Example 2.
Figure 7B:
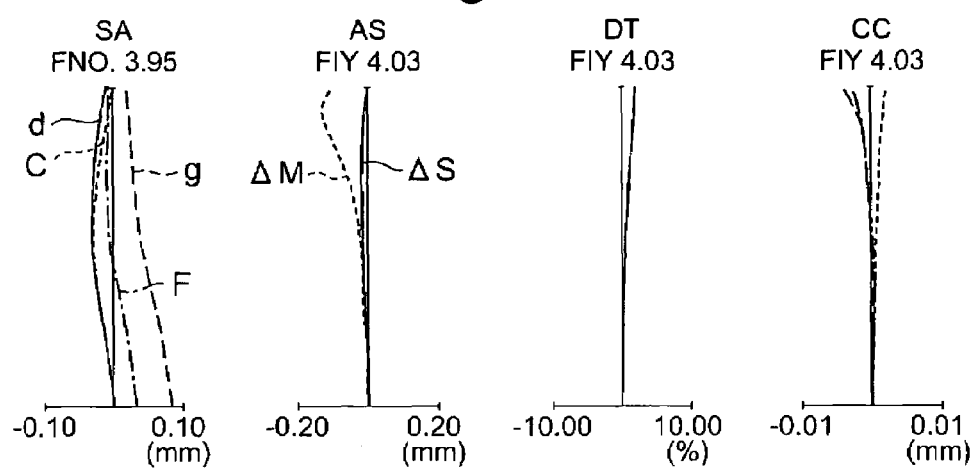
Figure 7C:
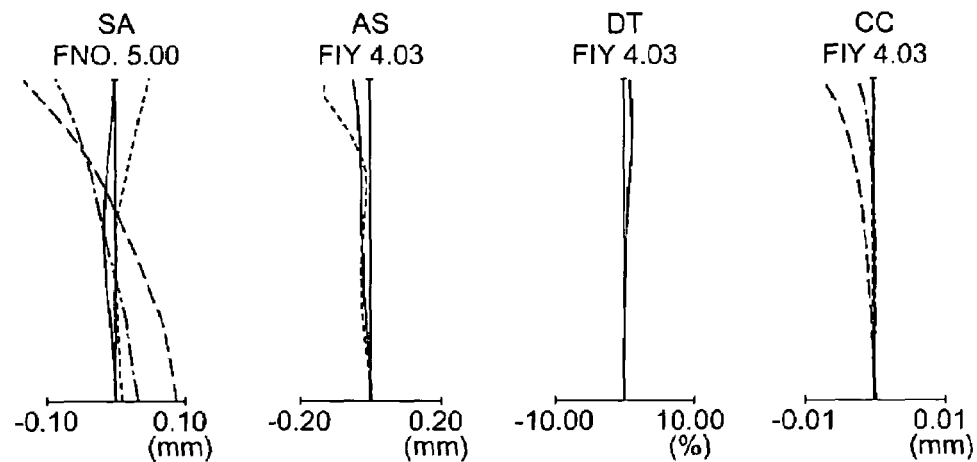
Figure 8A:
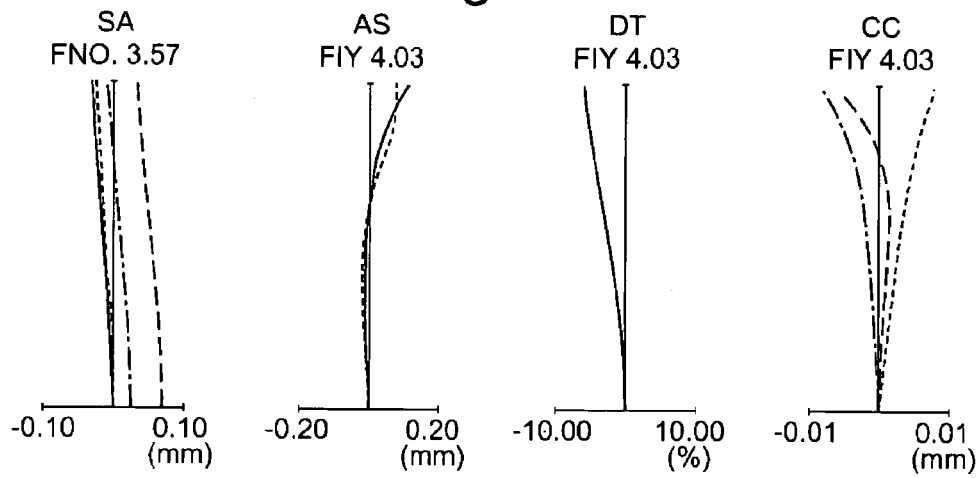
FIGS. 8A to 8C are aberration diagrams when focused on the infinite object in Example 3.
Figure 8B:
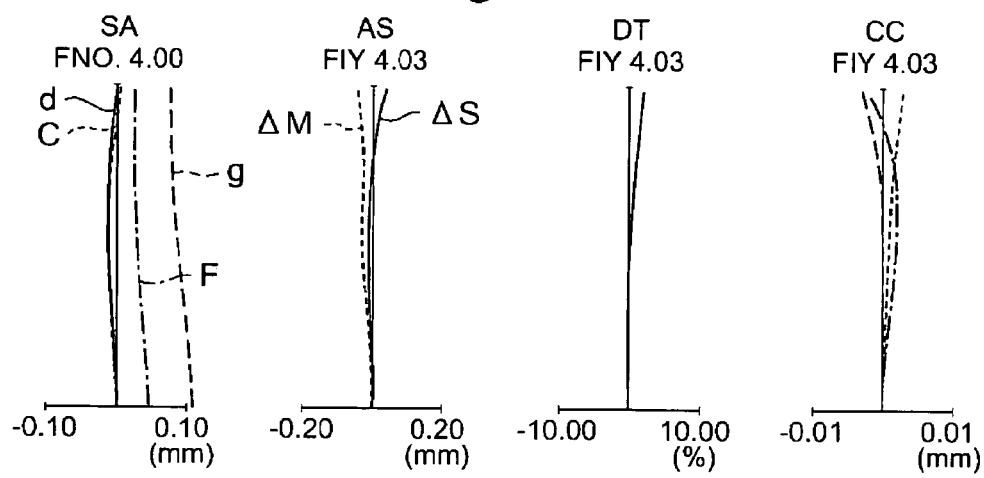
Figure 8C:
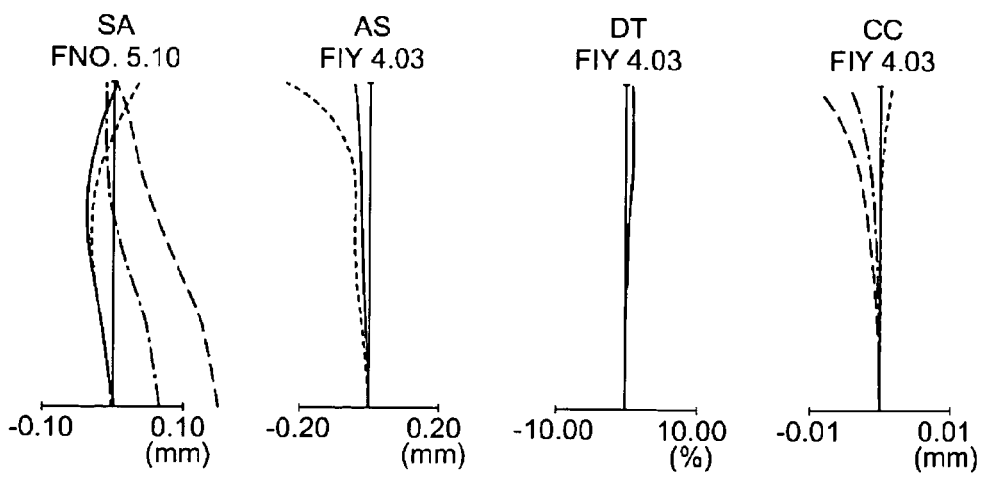
Figure 9A:
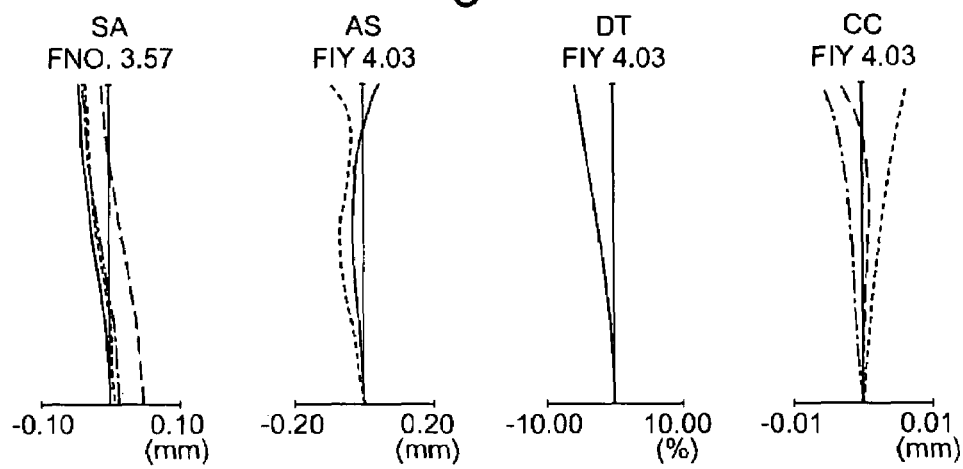
FIGS. 9A to 9C are aberration diagrams when focused on the infinite object in Example 4.
Figure 9B:
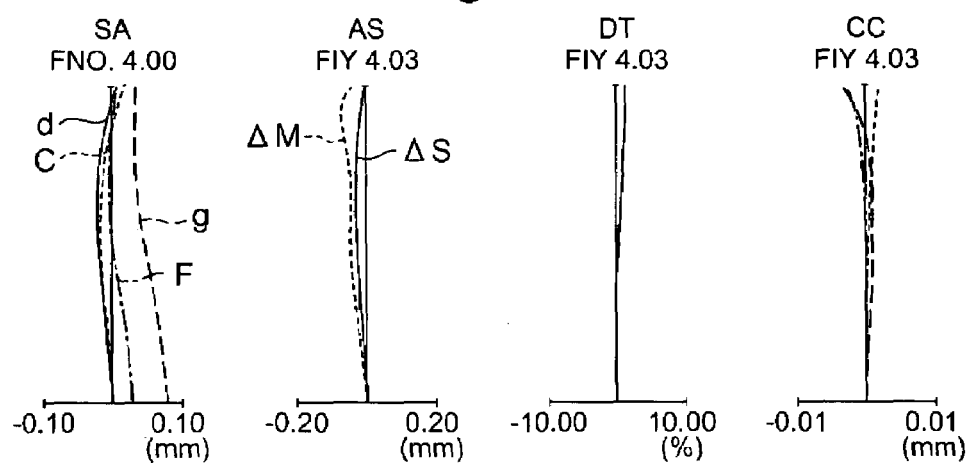
Figure 9C:
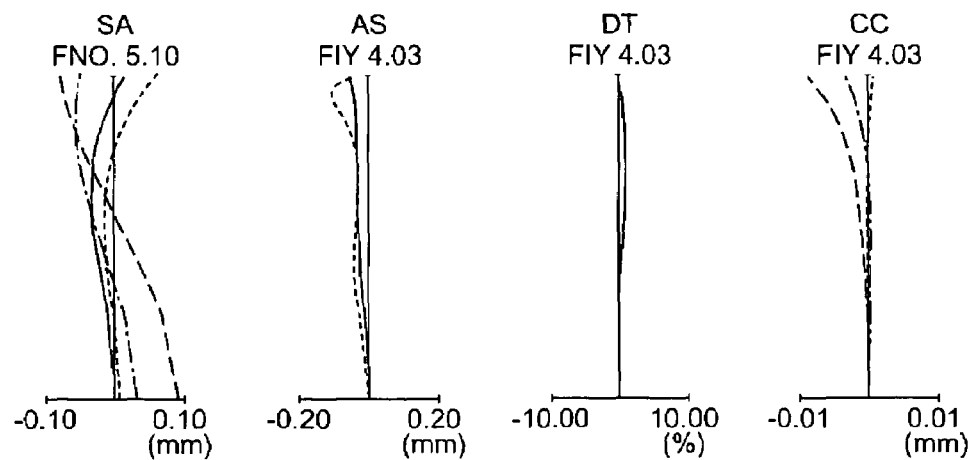

As shown in FIGS. 4A to 4C, the zoom lens system of Example 4 is constituted of, in order from an object side: a first lens unit G1 having a positive refractive power; a second lens unit G2 having a negative refractive power; an aperture stop S; a third lens unit G3 having a positive refractive power; and a fourth lens unit G4 having a positive refractive power. When zooming is performed from the wide-angle end toward the telephoto end, the first lens unit G1 is fixed, the second lens unit G2 moves toward the image surface, the aperture stop S is fixed, the third lens unit G3 moves toward the object, the fourth lens unit G4 moves along a locus concave toward the object while broadening the space between the third lens unit G3 and the fourth lens unit, and the fourth lens unit is positioned closer to the image-surface side in the telephoto end than in the wide-angle end.

The first lens unit G1 includes, in order from the object side, a negative meniscus lens directing its convex surface on the object side, an optical path bending prism P, and a double-convex positive lens. The second lens unit G2 includes, in order from the object side, a double-concave negative lens, and a cemented lens of a double-concave negative lens and a double-convex positive lens. The third lens unit G3 includes, in order from the object side, a double-convex positive lens, a cemented lens of a double-convex positive lens and a double-concave negative lens, and a negative meniscus lens directing its convex surface on the object side. The fourth lens unit G4 includes one double-convex positive lens.

Aspherical surfaces are used on six surfaces: opposite surfaces of the double-convex positive lens of the first lens unit G1; opposite surfaces of the double-convex positive lens of the third lens unit G3; and opposite surfaces of the double-convex positive lens of the fourth lens unit G4.

There will be described hereinafter numeric value data of the above examples. In addition to the above-described symbols: f denotes the focal length of the zoom lens system; $F_{NO}$ denotes the F number; ω denotes a half angle of field; WE denotes a wide-angle end; ST denotes an intermediate state; TE denotes a telephoto end; $r_1$, $r_2$ . . . denote a radius of curvature of each lens surface; $d_1$, $d_2$ . . . denote a space between the lens surfaces; $n_{d1}$, $n_{d2}$ . . . denote a refractive index of each lens for the wavelength of the d-line; and $V_{d1}$, $V_{d2}$ . . . denote the Abbe number of each lens. It is to be noted that an aspherical shape is represented by the following equation in which x is an optical axis whose positive direction is set to the light traveling direction, and y has a direction crossing the optical axis at right angles:

$$x=(y^2/r)/[1+\{1-(K+1)(y/r)^2\}^{1/2}]+A_4y^4+A_6y^6+A_8y^8+A_{10}y^{10},$$

wherein r denotes a paraxial radius of curvature, K denotes a conic coefficient, and $A_4$, $A_6$, $A_8$ and $A_{10}$ denote fourth-order, sixth-order, eighth-order and tenth-order aspherical coefficients, respectively. EXAMPLE 1

TABLE 1

| | | | |
|---|---|---|---|
| $r_1$ = 295.026 | $d_1$ = 0.80 | $n_{d1}$ = 1.92286 | $V_{d1}$ = 20.88 |
| $r_2$ = 11.061 | $d_2$ = 1.40 | | |
| $r_3$ = ∞ | $d_3$ = 7.40 | $n_{d2}$ = 1.83400 | $V_{d2}$ = 37.16 |
| $r_4$ = ∞ | $d_4$ = 0.15 | | |
| $r_5$ = 16.187* | $d_5$ = 2.40 | $n_{d3}$ = 1.77377 | $V_{d3}$ = 47.17 |
| $r_6$ = −15.754* | $d_6$ = variable | | |
| $r_7$ = 144.141 | $d_7$ = 0.70 | $n_{d4}$ = 1.88300 | $V_{d4}$ = 40.76 |
| $r_8$ = 14.573 | $d_8$ = 1.15 | | |
| $r_9$ = −10.681 | $d_9$ = 0.70 | $n_{d5}$ = 1.88300 | $V_{d5}$ = 40.76 |
| $r_{10}$ = 15.091 | $d_{10}$ = 1.90 | $n_{d6}$ = 1.92286 | $V_{d6}$ = 20.88 |
| $r_{11}$ = −29.145 | $d_{11}$ = (variable) | | |
| $r_{12}$ = ∞ (AS) | $d_{12}$ = (variable) | | |
| $r_{13}$ = 8.042* | $d_{13}$ = 4.01 | $n_{d7}$ = 1.58313 | $V_{d7}$ = 59.46 |
| $r_{14}$ = −22.780* | $d_{14}$ = 0.20 | | |
| $r_{15}$ = 6.659 | $d_{15}$ = 3.68 | $n_{d8}$ = 1.49700 | $V_{d8}$ = 81.54 |
| $r_{16}$ = 74.227 | $d_{16}$ = 0.80 | $n_{d9}$ = 1.84666 | $V_{d9}$ = 23.78 |
| $r_{17}$ = 4.449 | $d_{17}$ = (variable) | | |
| $r_{18}$ = 27.385 | $d_{18}$ = 0.80 | $n_{d10}$ = 1.84666 | $V_{d10}$ = 23.78 |
| $r_{19}$ = 12.421 | $d_{19}$ = 0.20 | | |
| $r_{20}$ = 10.830* | $d_{20}$ = 2.50 | $n_{d11}$ = 1.48749 | $V_{d11}$ = 70.23 |
| $r_{21}$ = −12.101* | $d_{21}$ = (variable) | | |
| $r_{22}$ = ∞ | $d_{22}$ = 0.88 | $n_{d12}$ = 1.54771 | $V_{d12}$ = 62.84 |
| $r_{23}$ = ∞ | $d_{23}$ = 0.89 | | |
| $r_{24}$ = ∞ | $d_{24}$ = 0.50 | $n_{d13}$ = 1.51633 | $V_{d13}$ = 64.14 |
| $r_{25}$ = ∞ | $d_{25}$ = 0.60 | | |
| $r_{26}$ = ∞ (IS) | | | |

*: Aspherical surface AS: Aperture stop IS: Image surface

Aspherical Coefficient

Fifth Surface
K = 0.000

$A_4$ = −8.31125 × 10$^{-5}$   $A_6$ = −1.49859 × 10$^{-7}$
$A_8$ = 1.31609 × 10$^{-7}$   $A_{10}$ = −6.10430 × 10$^{-9}$

Sixth Surface
K = 0.000

$A_4$ = −1.07939 × 10$^{-5}$   $A_6$ = 2.74948 × 10$^{-6}$
$A_8$ = −1.35732 × 10$^{-8}$   $A_{10}$ = −3.44642 × 10$^{-9}$

13th Surface
K = 0.000

$A_4$ = 7.10303 × 10$^{-6}$   $A_6$ = 5.21257 × 10$^{-6}$
$A_8$ = 8.01135 × 10$^{-7}$   $A_{10}$ = −4.07370 × 10$^{-8}$

-continued

Aspherical Coefficient

14th Surface
K = 0.000

$A_4$ = 4.85355 × 10$^{-4}$   $A_6$ = 1.71401 × 10$^{-5}$
$A_8$ = 2.37660 × 10$^{-8}$   $A_{10}$ = 0

20th Surface
K = 0.000

$A_4$ = −3.10795 × 10$^{-4}$   $A_6$ = 2.67988 × 10$^{-5}$
$A_8$ = 2.65967 × 10$^{-8}$   $A_{10}$ = −1.19394 × 10$^{-7}$

21st Surface
K = 0.000

$A_4$ = −4.20742 × 10$^{-4}$   $A_6$ = 3.97404 × 10$^{-5}$
$A_8$ = 1.06118 × 10$^{-9}$   $A_{10}$ = −1.23676 × 10$^{-7}$

TABLE 2

Zoom Data (∞)

| | WE | ST | TE |
|---|---|---|---|
| f (mm) | 6.898 | 11.557 | 19.670 |
| $F_{NO}$ | 3.57 | 4.27 | 5.10 |
| ω(°) | 30.3 | 17.8 | 10.7 |
| $d_6$ | 0.50 | 3.71 | 5.73 |
| $d_{11}$ | 6.24 | 2.99 | 1.00 |
| $d_{12}$ | 7.21 | 5.05 | 1.20 |
| $d_{17}$ | 2.61 | 5.29 | 9.07 |
| $d_{21}$ | 3.12 | 2.66 | 2.67 |

EXAMPLE 2

TABLE 3

| | | | |
|---|---|---|---|
| $r_1$ = 92.883 | $d_1$ = 0.80 | $n_{d1}$ = 1.92286 | $V_{d1}$ = 20.88 |
| $r_2$ = 9.863 | $d_2$ = 1.75 | | |
| $r_3$ = ∞ | $d_3$ = 7.40 | $n_{d2}$ = 1.80100 | $V_{d2}$ = 34.90 |
| $r_4$ = ∞ | $d_4$ = 0.16 | | |
| $r_5$ = 14.947* | $d_5$ = 2.67 | $n_{d3}$ = 1.77933 | $V_{d3}$ = 45.68 |
| $r_6$ = −14.846* | $d_6$ = variable | | |
| $r_7$ = −39.260 | $d_7$ = 0.80 | $n_{d4}$ = 1.88300 | $V_{d4}$ = 40.76 |
| $r_8$ = 17.909 | $d_8$ = 0.73 | | |
| $r_9$ = −18.959 | $d_9$ = 0.70 | $n_{d5}$ = 1.87765 | $V_{d5}$ = 40.94 |
| $r_{10}$ = 11.087 | $d_{10}$ = 1.70 | $n_{d6}$ = 1.92286 | $V_{d6}$ = 20.88 |
| $r_{11}$ = −122.735 | $d_{11}$ = (variable) | | |
| $r_{12}$ = ∞ (AS) | $d_{12}$ = (variable) | | |
| $r_{13}$ = 7.900* | $d_{13}$ = 3.68 | $n_{d7}$ = 1.58900 | $V_{d7}$ = 61.20 |
| $r_{14}$ = −18.676* | $d_{14}$ = 0.15 | | |
| $r_{15}$ = 8.530 | $d_{15}$ = 4.35 | $n_{d8}$ = 1.49700 | $V_{d8}$ = 81.60 |
| $r_{16}$ = −27.187 | $d_{16}$ = 0.73 | $n_{d9}$ = 1.84666 | $V_{d9}$ = 23.78 |
| $r_{17}$ = 4.740 | $d_{17}$ = (variable) | | |
| $r_{18}$ = 16.474* | $d_{18}$ = 2.30 | $n_{d10}$ = 1.49700 | $V_{d10}$ = 81.54 |
| $r_{19}$ = −13.740* | $d_{19}$ = (variable) | | |
| $r_{20}$ = ∞ | $d_{20}$ = 0.88 | $n_{d11}$ = 1.54771 | $V_{d11}$ = 62.84 |
| $r_{21}$ = ∞ | $d_{21}$ = 0.89 | | |
| $r_{22}$ = ∞ | $d_{22}$ = 0.50 | $n_{d12}$ = 1.51633 | $V_{d12}$ = 64.14 |
| $r_{23}$ = ∞ | $d_{23}$ = 0.60 | | |
| $r_{24}$ = ∞ (IS) | | | |

*: Aspherical surface AS: Aperture stop IS: Image surface

Aspherical Coefficient

Fifth Surface
K = 0.000

$A_4 = -9.52388 \times 10^{-5}$  $A_6 = 5.55144 \times 10^{-6}$
$A_8 = -3.08535 \times 10^{-7}$  $A_{10} = 5.48257 \times 10^{-9}$ Sixth Surface
K = 0.000

$A_4 = 3.22716 \times 10^{-5}$  $A_6 = 4.78631 \times 10^{-6}$
$A_8 = -2.53119 \times 10^{-7}$  $A_{10} = 4.52425 \times 10^{-9}$ 13th Surface
K = 0.000

$A_4 = -4.91485 \times 10^{-5}$  $A_6 = -7.61719 \times 10^{-6}$
$A_8 = 1.21791 \times 10^{-6}$  $A_{10} = -4.15023 \times 10^{-8}$ 14th Surface
K = 0.000

$A_4 = 4.05960 \times 10^{-4}$  $A_6 = 5.85350 \times 10^{-7}$
$A_8 = 8.56264 \times 10^{-7}$  $A_{10} = -3.18996 \times 10^{-8}$ 18th Surface
K = 0.000

$A_4 = 6.29854 \times 10^{-4}$  $A_6 = -3.03281 \times 10^{-5}$
$A_8 = 4.96221 \times 10^{-7}$  $A_{10} = -5.27261 \times 10^{-8}$ 19th Surface
K = 0.000

$A_4 = 5.31709 \times 10^{-4}$  $A_6 = -1.74744 \times 10^{-6}$
$A_8 = -1.63257 \times 10^{-6}$  $A_{10} = 0$

TABLE 4

Zoom Data (∞)

|  | WE | ST | TE |
|---|---|---|---|
| f (mm) | 6.810 | 11.526 | 19.654 |
| $F_{NO}$ | 3.50 | 3.95 | 5.00 |
| ω(°) | 30.5 | 18.0 | 10.8 |
| $d_6$ | 0.60 | 3.35 | 5.19 |
| $d_{11}$ | 5.62 | 2.87 | 1.03 |
| $d_{12}$ | 7.50 | 4.85 | 1.03 |
| $d_{17}$ | 2.50 | 5.24 | 9.60 |
| $d_{19}$ | 3.60 | 3.51 | 2.97 |

EXAMPLE 3

TABLE 5

| $r_1 = -205.452$ | $d_1 = 0.80$ | $n_{d1} = 1.84666$ | $V_{d1} = 23.78$ |
|---|---|---|---|
| $r_2 = 10.665$ | $d_2 = 1.52$ | | |
| $r_3 = \infty$ | $d_3 = 7.40$ | $n_{d2} = 1.80610$ | $V_{d2} = 40.92$ |
| $r_4 = \infty$ | $d_4 = 0.20$ | | |
| $r_5 = 15.074*$ | $d_5 = 2.49$ | $n_{d3} = 1.76802$ | $V_{d3} = 49.24$ |
| $r_6 = -14.697*$ | $d_6 = $ variable | | |
| $r_7 = 153.510$ | $d_7 = 0.70$ | $n_{d4} = 1.88300$ | $V_{d4} = 40.76$ |
| $r_8 = 13.647$ | $d_8 = 1.15$ | | |
| $r_9 = -11.094$ | $d_9 = 0.70$ | $n_{d5} = 1.88300$ | $V_{d5} = 40.76$ |
| $r_{10} = 16.398$ | $d_{10} = 1.80$ | $n_{d6} = 1.92286$ | $V_{d6} = 20.88$ |
| $r_{11} = -32.399$ | $d_{11} = $ (variable) | | |
| $r_{12} = \infty$ (AS) | $d_{12} = $ (variable) | | |
| $r_{13} = 9.297*$ | $d_{13} = 2.43$ | $n_{d7} = 1.58913$ | $V_{d7} = 61.25$ |
| $r_{14} = -24.419*$ | $d_{14} = 0.20$ | | |
| $r_{15} = 9.855$ | $d_{15} = 2.60$ | $n_{d8} = 1.49700$ | $V_{d8} = 81.54$ |
| $r_{16} = -150.333$ | $d_{16} = 0.80$ | | |
| $r_{17} = 19.700$ | $d_{17} = 1.77$ | $n_{d9} = 1.60172$ | $V_{d9} = 60.60$ |
| $r_{18} = -32.398$ | $d_{18} = 0.80$ | $n_{d10} = 1.84666$ | $V_{d10} = 23.78$ |
| $r_{19} = 4.457$ | $d_{19} = $ (variable) | | |
| $r_{20} = 15.828*$ | $d_{20} = 2.49$ | $n_{d11} = 1.52500$ | $V_{d11} = 55.80$ |

TABLE 5-continued

| $r_{21} = -15.755*$ | $d_{21} = $ (variable) | | |
|---|---|---|---|
| $r_{22} = \infty$ | $d_{22} = 0.88$ | $n_{d12} = 1.54771$ | $V_{d12} = 62.84$ |
| $r_{23} = \infty$ | $d_{23} = 0.89$ | | |
| $r_{24} = \infty$ | $d_{24} = 0.50$ | $n_{d13} = 1.51633$ | $V_{d13} = 64.14$ |
| $r_{25} = \infty$ | $d_{25} = 0.60$ | | |
| $r_{26} = \infty$ (IS) | | | |

*: Aspherical surface AS: Aperture stop IS: Image surface

Aspherical Coefficient

Fifth Surface
K = 0.000

$A_4 = -1.26135 \times 10^{-4}$  $A_6 = 2.52905 \times 10^{-6}$
$A_8 = -4.00946 \times 10^{-8}$  $A_{10} = -1.87589 \times 10^{-9}$ Sixth Surface
K = 0.000

$A_4 = -4.93971 \times 10^{-6}$  $A_6 = 3.84372 \times 10^{-6}$
$A_8 = -1.00573 \times 10^{-7}$  $A_{10} = -6.58744 \times 10^{-10}$ 13th Surface
K = 0.000

$A_4 = -2.02391 \times 10^{-4}$  $A_6 = -4.63863 \times 10^{-7}$
$A_8 = -2.67686 \times 10^{-8}$  $A_{10} = -1.07522 \times 10^{-8}$ 14th Surface
K = 0.000

$A_4 = 1.06475 \times 10^{-4}$  $A_6 = 2.61409 \times 10^{-6}$
$A_8 = -3.62177 \times 10^{-7}$  $A_{10} = 0$ 20th Surface
K = 0.000

$A_4 = 4.10682 \times 10^{-4}$  $A_6 = -2.65177 \times 10^{-5}$
$A_8 = 1.17779 \times 10^{-6}$  $A_{10} = -3.98281 \times 10^{-8}$ 21st Surface
K = 0.000

$A_4 = 3.52819 \times 10^{-4}$  $A_6 = -1.96304 \times 10^{-5}$
$A_8 = 7.23922 \times 10^{-7}$  $A_{10} = -3.11244 \times 10^{-8}$

TABLE 6

Zoom Data (∞)

|  | WE | ST | TE |
|---|---|---|---|
| f (mm) | 6.813 | 11.525 | 19.653 |
| $F_{NO}$ | 3.57 | 4.00 | 5.10 |
| ω(°) | 30.6 | 17.9 | 10.9 |
| $d_6$ | 0.60 | 3.50 | 5.27 |
| $d_{11}$ | 5.56 | 2.66 | 0.90 |
| $d_{12}$ | 7.85 | 5.28 | 1.10 |
| $d_{19}$ | 3.00 | 5.69 | 9.96 |
| $d_{21}$ | 3.21 | 3.09 | 3.00 |

EXAMPLE 4

TABLE 7

| $r_1 = 131.601$ | $d_1 = 0.80$ | $n_{d1} = 1.92286$ | $V_{d1} = 20.88$ |
|---|---|---|---|
| $r_2 = 10.274$ | $d_2 = 1.71$ | | |
| $r_3 = \infty$ | $d_3 = 7.40$ | $n_{d2} = 1.80100$ | $V_{d2} = 34.90$ |
| $r_4 = \infty$ | $d_4 = 0.16$ | | |
| $r_5 = 16.442*$ | $d_5 = 2.74$ | $n_{d3} = 1.78680$ | $V_{d3} = 44.13$ |
| $r_6 = -15.303*$ | $d_6 = $ (variable) | | |
| $r_7 = -32.168$ | $d_7 = 0.80$ | $n_{d4} = 1.88300$ | $V_{d4} = 40.76$ |
| $r_8 = 20.848$ | $d_8 = 0.70$ | | |

TABLE 7-continued

| | | | |
|---|---|---|---|
| $r_9 = -22.286$ | $d_9 = 0.70$ | $n_{d5} = 1.88300$ | $V_{d5} = 40.76$ |
| $r_{10} = 11.716$ | $d_{10} = 1.72$ | $n_{d6} = 1.92286$ | $V_{d6} = 20.88$ |
| $r_{11} = -119.952$ | $d_{11} =$ (variable) | | |
| $r_{12} = \infty$ (AS) | $d_{12} =$ (variable) | | |
| $r_{13} = 8.583*$ | $d_{13} = 3.84$ | $n_{d7} = 1.59635$ | $V_{d7} = 59.32$ |
| $r_{14} = -14.212*$ | $d_{14} = 0.15$ | | |
| $r_{15} = 8.450$ | $d_{15} = 3.92$ | $n_{d8} = 1.49700$ | $V_{d8} = 81.54$ |
| $r_{16} = -33.510$ | $d_{16} = 0.70$ | $n_{d9} = 1.84666$ | $V_{d9} = 23.78$ |
| $r_{17} = 5.517$ | $d_{17} = 0.30$ | | |
| $r_{18} = 6.321$ | $d_{18} = 0.70$ | $n_{d10} = 1.84666$ | $V_{d10} = 23.78$ |
| $r_{19} = 4.809$ | $d_{19} =$ (variable) | | |
| $r_{20} = 17.254*$ | $d_{20} = 2.41$ | $n_{d11} = 1.49700$ | $V_{d11} = 81.54$ |
| $r_{21} = -12.397*$ | $d_{21} =$ (variable) | | |
| $r_{22} = \infty$ | $d_{22} = 0.88$ | $n_{d12} = 1.54771$ | $V_{d12} = 62.84$ |
| $r_{23} = \infty$ | $d_{23} = 0.89$ | | |
| $r_{24} = \infty$ | $d_{24} = 0.50$ | $n_{d13} = 1.51633$ | $V_{d13} = 64.14$ |
| $r_{25} = \infty$ | $d_{25} = 0.60$ | | |
| $r_{26} = \infty$ (IS) | | | |

*: Aspherical surface AS: Aperture stop IS: Image surface

Aspherical Coefficient

Fifth Surface
K = 0.000

$A_4 = -8.88876 \times 10^{-5}$    $A_6 = -2.05062 \times 10^{-8}$
$A_8 = -4.57479 \times 10^{-8}$    $A_{10} = -3.03644 \times 10^{-10}$ Sixth Surface
K = 0.000

$A_4 = 2.05704 \times 10^{-6}$    $A_6 = 7.72185 \times 10^{-9}$
$A_8 = -1.95829 \times 10^{-8}$    $A_{10} = -8.08470 \times 10^{-10}$ 13th Surface
K = 0.000

$A_4 = -2.57739 \times 10^{-4}$    $A_6 = -3.58372 \times 10^{-6}$
$A_8 = 2.27081 \times 10^{-7}$    $A_{10} = -1.65528 \times 10^{-8}$ 14th Surface
K = 0.000

$A_4 = 1.53919 \times 10^{-4}$    $A_6 = 3.18624 \times 10^{-6}$
$A_8 = -2.93908 \times 10^{-7}$    $A_{10} = -3.53209 \times 10^{-9}$ 20th Surface
K = 0.000

$A_4 = 5.82785 \times 10^{-4}$    $A_6 = -2.69526 \times 10^{-5}$
$A_8 = 3.96147 \times 10^{-7}$    $A_{10} = -5.07160 \times 10^{-8}$ 21st Surface
K = 0.000

$A_4 = 4.65781 \times 10^{-4}$    $A_6 = -1.31534 \times 10^{-6}$
$A_8 = -1.58552 \times 10^{-6}$    $A_{10} = 0$

TABLE 8

Zoom Data ($\infty$)

| | WE | ST | TE |
|---|---|---|---|
| f (mm) | 6.818 | 11.526 | 19.653 |
| $F_{NO}$ | 3.57 | 4.00 | 5.10 |
| $\omega(°)$ | 30.5 | 18.0 | 10.9 |
| $d_6$ | 0.60 | 3.47 | 5.48 |
| $d_{11}$ | 5.66 | 2.80 | 0.80 |
| $d_{12}$ | 7.47 | 4.74 | 0.80 |
| $d_{19}$ | 2.50 | 5.29 | 9.19 |
| $d_{21}$ | 2.75 | 2.69 | 2.71 |

FIGS. 6A to 6C, 7A to 7C, 8A to 8C and 9A to 9C show aberration diagrams of Examples 1 to 4 when focused on an infinite object. In these aberration diagrams, FIGS. 6A, 7A, 8A and 9A show a spherical aberration SA, astigmatism AS, a distortion DT and a chromatic aberration of magnification (CC) in the wide-angle end. FIGS. 6B, 7B, 8B and 9B show the above aberrations in the intermediate state. FIGS. 6C, 7C, 8C and 9C show the above aberrations in the telephoto end. It is to be noted that in drawings, "FIY" denotes the image height.

Next, values of the conditions (1A) to (15A) of the above examples are shown in Table 9, and values of parameters concerning the conditions are shown in Table 10, respectively.

EXAMPLE 1

TABLE 9

| Condition | Example 1 | Example 2 | Example 3 | Example 4 |
|---|---|---|---|---|
| (1A) | 2.387 | 1.991 | 2.080 | 2.213 |
| (2A) | 1.458 | 1.362 | 1.394 | 1.476 |
| (3A) | 0.997 | 0.797 | 0.885 | 0.974 |
| (4A) | 0.023 | 0.073 | −0.033 | 0.052 |
| (5A) | 1.808 | 1.764 | 1.755 | 1.777 |
| (6A) | 1.725 | 1.690 | 1.691 | 1.692 |
| (7A) | 4.116 | 3.365 | 3.516 | 3.743 |
| (8A) | 2.514 | 2.301 | 2.357 | 2.497 |
| (9A) | 0.014 | 0.043 | −0.020 | 0.031 |
| (10A) | 3.117 | 2.981 | 2.966 | 3.006 |
| (11A) | 2.667 | 2.468 | 2.495 | 2.599 |
| (12A) | 0.865 | 0.749 | 0.708 | 0.758 |
| (13A) | 1.112 | 1.176 | 1.106 | 1.193 |
| (14A) | 5.222 | 3.837 | 3.836 | 3.702 |
| (15A) | 2.858 | 2.927 | 2.956 | 2.827 |

TABLE 10

| Parameter | Example 1 | Example 2 | Example 3 | Example 4 |
|---|---|---|---|---|
| $f_w$ | 6.898 | 6.810 | 6.813 | 6.818 |
| $f_{1G}$ | 16.465 | 13.560 | 14.171 | 15.086 |
| $f_{2G}$ | −10.056 | −9.274 | −9.500 | −10.065 |
| $f_{3G}$ | 11.432 | 11.796 | 11.912 | 11.395 |
| $f_{4G}$ | 20.890 | 15.465 | 15.459 | 14.918 |
| $f_{L1}$ | −12.469 | −12.013 | −11.955 | −12.114 |
| $f_{L2}$ | 10.668 | 9.948 | 10.054 | 10.472 |
| $D_{2GS}$ | 6.240 | 5.620 | 5.560 | 5.660 |
| $D_{S3G}$ | 7.210 | 7.500 | 7.850 | 7.470 |
| $R_1$ | 295.026 | 92.883 | −205.452 | 131.601 |
| $R_{3GE}$ | 4.449 | 4.740 | 4.457 | 4.809 |
| ih | 4.000 | 4.030 | 4.030 | 4.030 |
| $m_{2GZ}$ | 1.670 | 1.839 | 1.784 | 1.716 |
| $m_{3GZ}$ | 1.665 | 1.464 | 1.579 | 1.672 |

Next, there will be described a second type of zoom lens system in the present invention. As described above, the second type of zoom lens system comprises, in order from an object side: a first lens unit having a positive refractive power; a second lens unit having a negative refractive power; a third lens unit having a positive refractive power; a fourth lens unit having a negative refractive power; and a fifth lens unit having a positive refractive power.

The zoom lens system has five lens units in total.

During zooming from a wide-angle end toward a telephoto end, the first lens unit is fixed, at least the second lens unit and the third lens unit move, and a space between the lens units changes. The second lens unit is positioned closer to an image-surface side in the telephoto end than in the wide-angle end. The third lens unit is positioned closer to the object side in the telephoto end than in the wide-angle end. The first lens unit comprises a reflective optical element which reflects an optical path.

The zoom lens system satisfies the following condition:

$$0.5 < f_{1G}/f_w < 3.5 \tag{1B}$$

wherein $f_{1G}$ denotes a focal length of the first lens unit, and $f_w$ denotes a focal length of the zoom lens system in the wide-angle end.

The above zoom lens system includes, in order from an object, five positive, negative, positive, negative and positive lens units. Moreover, the second lens unit and the third lens unit are moved as described above during the zooming, and the zooming function is mainly imposed on these two lens units.

That is, when the zooming function is performed mainly by the second lens unit, the movement amount of the second lens unit increases. This easily increases the height of an off-axial ray incident upon the first lens unit in the wide-angle end. Therefore, it becomes difficult to reduce the lens diameter of the first lens unit.

To solve the problem, in this zoom lens system, the third lens unit is also provided with a zooming function, and the burden of the zooming function imposed on the second lens unit is reduced. Accordingly, the movement amount of the second lens unit is reduced. As a result, the ray height in the first lens unit can be reduced.

Moreover, since the negative fourth lens unit is disposed on the image side of the positive third lens unit, the negative power of the whole lens system is divided, and an arrangement of the negative power in the zoom lens system is nearly symmetric. Therefore, even when the power of each lens unit is strengthened to enlarge the angle of field, to enhance the zooming ratio and to miniaturize the lens system, the power balance does not easily bread down. Therefore, the lens system is advantageous in inhibiting generation of an aberration.

Moreover, the positive power of the first lens unit is set so as to satisfy the condition (1B). In consequence, an outer diameter of the lens of the first lens unit can be reduced to reduce a bent thickness.

Below the lower limit of 0.5 of the condition (1B), the power of the first lens unit is strengthened, and this is advantageous in miniaturizing the first lens unit. However, in the first lens unit, a large spherical aberration or astigmatism is generated, and it becomes difficult to correct aberrations of the whole lens system.

On the other hand, above the upper limit of 3.5 in the condition (1B), the power of the first lens unit weakens, the movement amount of the second lens unit increases, and the first lens unit is easily enlarged in size. Alternatively, the positive refractive power of the third lens unit is strengthened, and it becomes difficult to reduce, with fewer lenses, aberration fluctuations generated by the movement of the third lens unit.

Furthermore, the fourth lens unit is effective for correcting the aberration attributable to the second lens unit. Especially when the fourth lens unit is constituted of one negative lens, the miniaturization is preferably well balanced with the aberration correcting effect.

When the following constitutions are introduced in addition to the above basic constitution, a more satisfactory zoom lens system can be obtained.

The above zoom lens system preferably satisfies the following condition:

$$0.5 < |f_{2G}/f_w| < 2.0 \tag{2B}$$

wherein $f_{2G}$ is a focal length of the second lens unit.

The condition (2B) appropriately defines the power of the second lens unit. If the condition (2B) is below the lower limit of 0.5, and the power of the second lens unit is strengthened, the movement amount of the second lens unit decreases, and this is advantageous in reducing the size in the thickness direction. However, astigmatism or a distortion is easily generated, and it becomes difficult to correct the aberrations of the whole lens system.

Above the upper limit of 2.0 in the condition (2B), the movement amount of the second lens unit excessively increases, and it becomes difficult to shorten the lens system in the thickness direction.

It is preferable that the above zoom lens satisfies the following condition:

$$0.6 < m_{2GZ}/m_{3GZ} < 1.4 \tag{3B}$$

wherein $m_{2GZ}$ denotes a ratio of the magnification of the second lens unit in the telephoto end to that in the wide-angle end when the zoom lens system is focused on an infinite object, and $m_{3GZ}$ denotes a ratio of a magnification of the third lens unit in the telephoto end to that in the wide-angle end when focused on the infinite object The condition (3B) appropriately defines the burden of the zooming function shared by the second lens unit and the third lens unit. Above the upper limit of 1.4 in the condition (3B), the burden of the zooming function shared by the second lens unit increases, and the movement amount of the second lens unit increases. Therefore, the diameter of the first lens unit easily increases. Alternatively, the refractive power of the second lens unit increases, and the aberration fluctuations by the movement of the second lens unit are not easily reduced.

Below the lower limit of 0.6 in the condition (3B), the burden of the zooming function shared by the third lens unit increases, and the movement amount of the third lens unit easily increases. Therefore, the total length easily increases. Alternatively, the refractive power of the third lens unit increases, and the aberration fluctuations by the movement of the third lens unit are not easily reduced.

Furthermore, the above zoom lens system preferably satisfies the following condition:

$$-0.3 < f_w/R_1 < 0.3 \tag{4B}$$

wherein $R_1$ denotes a paraxial radius of curvature of an object-side surface of the lens closest to the object side in the first lens units.

The condition (4B) defines the paraxial radius of curvature of the object-side surface of the lens closest to the object side in the first lens unit. Below the lower limit of −0.3, a large negative distortion is easily generated in the wide-angle end.

Above the upper limit value of 0.3 in the condition (4B), an off-axial aberration is advantageously corrected. On the other hand, the vertex of the lens surface easily protrudes toward the object side, and it becomes difficult to constitute the lens system to be thin.

Moreover, in the above zoom lens system, the first lens unit is preferably constituted of, in order from the object side, a negative meniscus lens directing its convex surface on the object side, a reflective optical element for bending the optical path, and a positive sub-unit.

When the first lens unit is provided with the reflective optical element for bending the optical path, there inevitably arises a tendency to deepen the entrance pupil position. Therefore, the diameter or the size of each optical element constituting the first lens unit increases, and the optical path bending type system is not physically easily established. Therefore, the first lens unit is constituted of, in order from the object side, the negative meniscus lens directing its convex surface on the object side, the reflective optical element for bending the optical path, and the positive sub-unit. According to this constitution, a chief ray becomes nearly parallel with the optical axis in the space required for disposing the reflective optical element, and this can inhibit the increase of the diameter of the optical element.

To miniaturize the image taking apparatus in the height direction or the lateral direction, it is preferable that the positive sub-unit is constituted of one positive lens.

Furthermore, the first lens unit may be constituted of, in order from the object side, a negative sub-unit, a reflective optical element for bending the optical path, and a positive sub-unit so that the negative sub-unit satisfies the following condition:

$$0.5 < |f_{L1}|/f_w| < 2.5 \tag{5B},$$

wherein $f_{L1}$ denotes a focal length of the negative sub-unit of the first lens unit.

To constitute the entrance pupil to be shallow so that the optical path can physically be bent, the power of the negative sub-unit of the first lens unit may be set to be appropriately strong as in the condition (5B).

Above the upper limit of 2.5 in the condition (5B), the entrance pupil remains to be deep. Therefore, when an angle of field is secured to a certain degree, the diameter or the size of each optical element constituting the first lens unit increases, and the optical path is not physically easily bent.

Below the lower limit of 0.5 in the condition (5B), the magnification of a lens unit or lens units, which are disposed subsequently to the first lens unit and being constituted to move for the zooming, comes close to zero. This easily generates a problem that the movement amount increases or the zooming ratio decreases. Moreover, it becomes difficult to correct an off-axial aberration such as distortion, or a chromatic aberration.

In the above zoom lens system, focusing on an object at a short distance may be performed only by moving the fourth lens unit or the fifth lens unit toward the object side.

When the only fourth or fifth lens unit is moved to perform the focusing, there are preferably less fluctuations of the off-axial aberration at the short distance.

In a case where the above zoom lens system is used as a photographing optical system of the image taking apparatus, it is preferable that an image sensor is disposed on the image side of the zoom lens system, the image sensor having a light receiving surface and converting an optical image formed by the zoom lens system into an electric signal. Furthermore, the following condition is preferably satisfied:

$$1.5 < f_w/ih < 1.9 \tag{6B},$$

wherein ih denotes a maximum image height in an effective image taking region of the light receiving surface.

The effective image taking region is a region for obtaining image information for use in printing or displaying an image. The region is disposed on the light receiving surface of the image sensor which receives the optical image.

The condition (6B) defines the focal length of the whole zoom lens system with respect to the maximum image height in the wide-angle end. Below the lower limit of 1.5 in the condition (6B), the angle of field in the wide-angle end unfavorably decreases.

On the other hand, above the upper limit of 1.9, the angle of field becomes excessively large. To secure the bent optical path, the thickness of the zoom lens system is increased.

This condition (6B) defines the range of the focal length $f_w$ in the wide-angle end in the condition (1B) or the like.

It is to be noted that the effective image taking region of the light receiving surface means a region for obtaining the image information for use in printing or displaying the image. The region is disposed on the light receiving surface of the image sensor which receives the optical image formed by the zoom lens system.

The above zoom lens system has a wide angle, and is advantageous in reducing the thickness or the total length.

The zoom lens system has been described above in detail, and the image taking apparatus has been briefly described in which the zoom lens system is combined with the image sensor. Next, there will be described in more detail the image taking apparatus including the optical path bending type zoom lens system and the image sensor.

In the present invention, a third type of image taking apparatus comprises:

a zoom lens system; and an image sensor which is disposed on an image side of the zoom lens system, which has a light receiving surface and which converts an optical image formed by the zoom lens system into an electric signal.

The zoom lens system comprises, in order from an object side: a first lens unit having a positive refractive power; a second lens unit having a negative refractive power; a third lens unit having a positive refractive power; a fourth lens unit having a negative refractive power; and a fifth lens unit having a positive refractive power. The zoom lens system has five lens units in total.

During zooming from a wide-angle end toward a telephoto end, the first lens unit is fixed to an image surface on the light receiving surface, at least the second lens unit and the third lens unit move, and a space between the lens units changes. The second lens unit is positioned closer to an image-surface side in the telephoto end than in the wide-angle end. The third lens unit is positioned closer to the object side in the telephoto end than in the wide-angle end. The first lens unit comprises a reflective optical element which reflects an optical path.

The apparatus satisfies the following conditions:

$$1.5 < f_w/ih < 1.9 \tag{6B); and}$$

$$0.85 < f_{1G}/ih < 6.0 \tag{7B},$$

wherein $f_{1G}$ denotes a focal length of the first lens unit, $f_w$ denotes a focal length of the zoom lens system in the wide-angle end, and ih denotes a maximum image height in an effective image taking region of the light receiving surface.

The effective image taking region is a region for obtaining image information for use in printing or displaying an image. The region is disposed on the light receiving surface of the image sensor which receives the optical image.

The condition (6B) defines a relation between the focal length in the wide-angle end and the maximum image height of the effective image taking region. Below the lower limit of 1.5 in the condition (6B), the angle of field in the wide-angle end is unfavorably reduced.

On the other hand, above the upper limit of 1.9, the angle of field becomes excessively large. To secure the bent optical path, the thickness of the zoom lens system is increased.

The condition (7B) defines a relation between the focal length of the first lens unit and the maximum image height. The purpose of setting the condition is similar to that of setting the condition (1B). If the condition (7B) is below the lower limit of 0.85, and the power of the first lens unit is strengthened, the first lens unit is advantageously miniaturized. However, a spherical aberration or astigmatism is largely generated in the first lens unit, and it becomes difficult to correct the aberration of the whole lens system.

On the other hand, above the upper limit of 6.0 in the condition (7B), the power of the first lens unit weakens, the movement amount of the second lens unit increases, and the first lens unit is easily enlarged in size. Alternatively, the positive refractive power of the third lens unit is strengthened, and it becomes difficult to reduce, with fewer lenses, aberration fluctuations generated by the movement of the third lens unit.

The fourth lens unit effectively corrects the aberration attributable to the second lens unit. When the fourth lens unit is constituted of one negative lens, both of the miniaturization and the aberration correcting effect are preferably achieved with a good balance.

The above image taking apparatus preferably satisfies the following condition:

$$0.85 < |f_{2G}/ih| < 3.23 \qquad (8B),$$

wherein $f_{2G}$ denotes a focal length of the second lens unit.

The condition (8B) defines a relation between the power of the second lens unit and the maximum image height. The purpose of setting the condition is similar to that of setting the condition (2B). If the condition (8B) is below the lower limit of 0.85, and the power of the second lens unit is strengthened, the movement amount of the second lens unit decreases. This is advantageous in reducing the total length of the zoom lens system. However, astigmatism or a distortion is largely generated, and it becomes difficult to correct the aberration of the whole lens system.

Above the upper limit of 3.23 in the condition (8B), the movement amount of the second lens unit becomes excessively large, and it becomes difficult to shorten the total length.

Moreover, it is preferable that the above image taking apparatus satisfies the following condition:

$$0.6 < m_{2GZ}/m_{3GZ} < 1.4 \qquad (3B),$$

wherein $m_{2GZ}$ denotes a ratio of the magnification of the second lens unit in the telephoto end to that in the wide-angle end when the zoom lens system is focused on an infinite object, and $m_{3GZ}$ denotes a ratio of the magnification of the third lens unit in the telephoto end to that in the wide-angle end when the zoom lens system is focused on the infinite object.

The reason for the above constitution and the function and the effect of the constitution are as described above.

Moreover, it is preferable that the above image taking apparatus satisfies the following condition:

$$-0.118 < ih/R_1 < 0.118 \qquad (9B),$$

wherein $R_1$ denotes a paraxial radius of curvature of the object-side surface of a lens closest to the object side in the first lens unit.

The condition (9B) defines a relation between the paraxial radius of curvature of the object-side surface of the lens closest to the object side in the first lens unit and the maximum image height. The purpose of setting the condition is similar to that of setting the condition (4B). Below the lower limit of −0.118, a large negative distortion is easily generated in the wide-angle end.

Above the upper limit value of 0.118 in the condition (9B), an off-axial aberration is advantageously corrected. However, the vertex of the lens surface easily protrudes toward the object side, and it becomes difficult to constitute the system to be thin.

Moreover, in the above image taking apparatus, the first lens unit of the zoom lens system includes, in order from the object side, a negative meniscus lens directing its convex surface on the object side, a reflective optical element for bending the optical path, and a positive sub-unit.

The reason for the above constitution and the function and the effect of the constitution are as described above.

Furthermore, the first lens unit may be constituted of, in order from the object side, a negative sub-unit, a reflective optical element for bending the optical path and a positive sub-unit so that the negative sub-unit satisfies the following condition:

$$0.85 < |f_{L1}/ih| < 4.25 \qquad (10B),$$

wherein $f_{L1}$ denotes a focal length of the negative sub-unit of the first lens unit.

The condition (10B) defines a relation between the focal length of the negative sub-unit constituting a front sub-unit of the first lens unit and the maximum image height. The purpose of setting the condition is similar to that of the condition (5B), and the power of the negative sub-unit of the first lens unit may be appropriately strengthened.

Above the upper limit of 4.25 in the condition (10B), the entrance pupil remains to be deep. Therefore, when the angle of field is secured to a certain degree, the diameter or the size of each optical element constituting the first lens unit increases, and the optical path is not physically easily bent.

Below the lower limit of 0.85 in the condition (10B), the magnification of the lens unit or lens units, which are disposed subsequently to the first lens unit and are constituted to move for the zooming, comes close to zero. This easily generates a problem that the movement amount increases or the zooming ratio decreases. Moreover, it becomes difficult to correct an off-axial aberration such as the distortion, or a chromatic aberration.

To miniaturize the image taking apparatus in the thickness direction, the negative sub-unit is preferably constituted of a single lens.

To miniaturize the image taking apparatus in the height direction or the lateral direction, the positive sub-unit is preferably constituted of a single lens.

Moreover, in the above image taking apparatus, the only fourth or fifth lens unit can be moved to thereby focus on an object at a short distance.

The reason for the above constitution and the function and the effect of the constitution are as described above.

Furthermore, in the above image taking apparatus, it is preferable that the positive sub-unit of the first lens unit of the zoom lens system satisfies the following condition:

$$1.5 < f_{L2}/ih < 4.0 \qquad (11B),$$

wherein $f_{L2}$ denotes a focal length of the positive sub-unit of the first lens unit.

The condition (11B) defines a relation between the focal length of the positive sub-unit constituting a rear sub-unit of the first lens unit and the maximum image height. The power of the negative sub-unit of the first lens unit may appropriately be strengthened. However, in this case, an off-axial aberration such as the distortion is easily generated. Therefore, when an appropriately strong power is also imparted to the positive sub-unit disposed close to the negative sub-unit, the aberration is easily prevented from being generated. This is also advantageous in constituting the first lens unit to be compact.

Above the upper limit of 4.0 in the condition (11B), the power of the positive sub-unit is reduced. This is disadvantageous in sufficiently correcting the off-axial aberration.

Below the lower limit of 1.5 in the condition (11B), the power of the positive sub-unit becomes excessively strong, and it becomes difficult to correct the aberration of this lens unit.

In the above image taking apparatus, it is preferable to dispose an aperture stop between the second lens unit and the third lens unit.

This constitution is advantageous in substantially disposing the exit pupil in infinity while balancing the size of the whole lens system, that is, in constituting the whole lens system as an image-side telecentric optical system.

In a case where the aperture stop is disposed, the following constitution is especially preferable.

That is, it is preferable that the position of the aperture stop in the wide-angle end satisfies the following condition:

$$0.3 < D_{S3G}/D_{2GS} < 1.6 \quad (12B),$$

wherein $D_{S3G}$ denotes an axial length from the aperture stop to the third lens unit in the wide-angle end, and $D_{2GS}$ denotes an axial length from the second lens unit to the aperture stop in the wide-angle end.

When the aperture stop is disposed close to the first lens unit and the second lens unit in the wide-angle end, the light beam transmitted through the first lens unit can be lowered. If the condition (12B) is below the lower limit of 0.3, and the aperture stop is separated from the second lens unit, it becomes difficult to constitute the first lens unit to be small.

If the condition (12B) is above the upper limit of 1.6, and the aperture stop is separated from the third lens unit, the outer diameter of the third lens unit easily increases, and it becomes difficult to correct the aberration in the third lens unit.

Moreover, in the above image taking apparatus, it is preferable that an aperture stop is disposed between the second lens unit and the third lens unit, the surface closest to the image side in the third lens unit is a concave surface, and the following conditions are satisfied:

$$0.3 < D_{S3G}/D_{2GS} < 1.6 \quad (12B);$$

$$0.1 < D_{D3G4G}/D_{2GS} < 1.0 \quad (13B); \text{ and}$$

$$0.5 < R_{3GE}/ih < 2.5 \quad (14B),$$

wherein $D_{S3G}$ denotes an axial length from the aperture stop to the third lens unit in the wide-angle end, $D_{2GS}$ denotes an axial length from the second lens unit to the aperture stop in the wide-angle end, $D_{3G4G}$ denotes an axial length from the third lens unit to the fourth lens unit in the wide-angle end, and $R_{3GE}$ denotes a paraxial radius of curvature of the concave surface closest to the image side in the third lens unit.

An absolute value of the curvature radius of the surface closest to the object side in the first lens unit is reduced, or the power of the front sub-unit having a negative refractive power is strengthened. This is advantageous in reducing the thickness of the first lens unit. On the other hand, an off-axial aberration is easily generated in the wide-angle end.

The condition (12B) specifies the position of the aperture stop as described above. Moreover, the condition (13B) defines the space between the third lens unit and the fourth lens unit in the wide-angle end.

When the condition (12B) is satisfied, an incidence height of a ray upon the first lens unit is advantageously lowered. Further, when the exit surface of the third lens unit is constituted as a concave surface, and the incidence height of the fourth lens unit is increased, this concave surface and the fourth lens unit can be provided with effect of correcting the off-axial aberration.

If the condition (13B) is below the lower limit of 0.1, and the space decreases, the incidence height of an off-axial beam upon the fourth lens unit is lowered. This is disadvantageous in correcting the off-axial aberration in the wide-angle end. If the condition is above the upper limit of 1.0, and the space increases, the incidence height of a ray excessively increases. The diameter or the total length of the lens increases. The incidence height of the off-axial beam upon the fifth lens unit also easily increases, and this is disadvantage in correcting the aberration in this lens unit.

The condition (14B) defines a paraxial radius of curvature of the concave surface of the third lens unit on the exit side. Below the lower limit of 0.5, the power of the concave surface becomes excessively strong, and this is disadvantageous in correcting the aberration of the third lens unit itself. Above the upper limit of 2.5, the power of the concave surface weakens, and the function of correcting the off-axial aberration is degraded.

Moreover, in the above image taking apparatus, it is preferable that the fourth and fifth lens units satisfy the following conditions:

$$4.9 < |f_{4G}/ih| < 20.0 \quad (15B); \text{ and}$$

$$2.0 < f_{5G}/ih < 5.0 \quad (16B),$$

wherein $f_{4G}$ denotes a focal length of the fourth lens unit, and $f_{5G}$ denotes a focal length of the fifth lens unit.

The conditions (15B) and (16B) define a relation between refractive powers of the lens units and the maximum image height in order to balance the function of correcting the aberration by the fourth lens unit with the function of adjusting the exit pupil position of the fifth lens unit. The fourth and fifth lens units are disposed close to the image surface. Therefore, if the conditions (15B) and (16B) are below lower limits of 4.9 and 2.0, respectively, and the powers are excessively strengthened, the aberration is easily generated, the lenses are increased in number, and the system is easily enlarged in size.

On the other hand, if the conditions are above upper limits of 20.0 and 5.0, respectively, and the power is excessively weak, the effect of correcting the off-axial aberration by the fourth lens unit is degraded. In the fifth lens unit, it becomes difficult to secure telecentricity. Alternatively, the space between the third lens unit and the fourth lens unit, or a subsequent space lengthens. This is disadvantageous in miniaturizing the apparatus.

Next, there will be described a fourth type of image taking apparatus in the present invention.

The fourth type of image taking apparatus comprises:

a zoom lens system; and an image sensor which is disposed on an image side of the zoom lens system, which has a light receiving surface and which converts an optical image formed by the zoom lens system into an electric signal.

The zoom lens system comprises, in order from an object side: a first lens unit having a positive refractive power; a second lens unit having a negative refractive power; a third lens unit having a positive refractive power; a fourth lens unit having a negative refractive power; and a fifth lens unit having a positive refractive power. The zoom lens system has five lens units in total.

During zooming from a wide-angle end toward a telephoto end, the first lens unit is fixed, at least the second lens unit and the third lens unit moves, and a space between the lens units changes. The second lens unit is positioned closer to an image-surface side in the telephoto end than in the wide-angle end. The third lens unit is positioned closer to the object side in the telephoto end than in the wide-angle end. The first lens unit comprises a reflective optical element which reflects an optical path.

The apparatus satisfies the following conditions:

$1.5 < f_w/ih < 1.9$ (6B);

$0.85 < |f_{2G}/ih| < 3.23$ (8B);

$1.0 < f_{3G}/ih < 3.7$ (17B); and $0.6 < m_{2GZ}/m_{3GZ} < 1.4$ (3B), wherein $f_w$ denotes a focal length of the zoom lens system in the wide-angle end, $f_{2G}$ denotes a focal length of the second lens unit, $f_{3G}$ denotes a focal length of the third lens unit, ih denotes a maximum image height in an effective image taking region of the light receiving surface, $m_{2GZ}$ denotes a ratio of a magnification of the second lens unit in the telephoto end to that in the wide-angle end when the zoom lens system is focused on an infinite object, and $m_{3GZ}$ denotes a ratio of a magnification of the third lens unit in the telephoto end to that in the wide-angle end when the zoom lens system is focused on the infinite object.

It is to be noted that the effective image taking region of the light receiving surface means a region for obtaining image information for use in printing or displaying an image. The region is disposed on the light receiving surface of the image sensor which receives the optical image formed by the zoom lens system.

This image taking apparatus is advantageous in improving a performance by devising the zoom lens system whose optical path is bent while securing an angle of field.

The zoom lens system for use herein is a thin zoom lens constituted of five lens units including, in order from the object side, positive, negative, positive, negative and positive lens units. In the positive first lens unit, the optical path is bent by reflection. Moreover, the second lens unit and the third lens unit are constituted to perform movement which contributes to the zooming.

At this time, when the second lens unit largely contributes to the zooming function, the movement amount of the second lens unit increases. An incidence height of an off-axial ray upon the first lens unit easily increases in the wide-angle end, and it becomes difficult to reduce the lens diameter of the first lens unit.

Therefore, the third lens unit is also provided with the zooming function in this zoom lens system, and the burden of the zooming function imposed on the second lens unit is reduced, thereby reducing the movement amount of the second lens unit.

Moreover, the aberration attributable to the second lens unit having the negative refractive power is easily corrected by the negative fourth lens unit disposed on the image side of the third lens unit.

In this case, since the refractive powers of the second and third lens units can be strengthened, the zooming ratio can be advantageously increased while avoiding enlargement of the total length after the optical path is bent.

The condition (6B) defines a relation between the focal length and the maximum image height of the effective image taking region in the wide-angle end. Below the lower limit of 1.5 in the condition (6B), the angle of field in the wide-angle end is unfavorably reduced.

On the other hand, above the upper limit of 1.9, the angle of field becomes excessively large. To secure the bent optical path, the thickness of the zoom lens system is increased.

The condition (8B) defines a relation between the power of the second lens unit and the maximum image height. If the condition (8B) is below the lower limit of 0.85, and the power of the second lens unit is strengthened, the astigmatism or the distortion is largely generated, and it becomes difficult to correct the aberration of the whole lens system.

Above the upper limit of 3.23 in the condition (8B), the movement amount of the second lens unit becomes excessively large, and it becomes difficult to reduce the total length.

The condition (17B) defines a relation between the power of the third lens unit and the maximum image height. If the condition (17B) is below the lower limit of 1.0, and the power of the third lens unit is strengthened, the astigmatism or the distortion is largely generated, and it becomes difficult to correct the aberration of the whole lens system.

Above the upper limit of 3.7 in the condition (17B), the movement amount of the third lens unit becomes excessively large, and it becomes difficult to reduce the total length.

The condition (3B) appropriately defines the burden of the zooming function shared by the second lens unit and the third lens unit. Above the upper limit of 1.4 in the condition (3B), the burden of the zooming function shared by the second lens unit increases, and the movement amount of the second lens unit increases. Therefore, the diameter of the first lens unit easily becomes large. Alternatively, the refractive power of the second lens unit increases, and the aberration fluctuations by the movement of the second lens unit are not easily reduced.

Below the lower limit of 0.6 in the condition (3B), the burden of the zooming function shared by the third lens unit increases, and the movement amount of the third lens unit easily increases. Therefore, the total length easily increases. Alternatively, the refractive power of the third lens unit increases, and the aberration fluctuations by the movement of the third lens unit are not easily reduced.

The fourth lens unit is advantageous in correcting the aberration attributable to the second lens unit. When the fourth lens unit is constituted of one negative lens, the miniaturization and the aberration correcting effect are preferably achieved with a good balance.

When the fifth lens unit is constituted of one positive lens, the miniaturization and the telecentricity are preferably secured with a good balance.

Moreover, the following constitution is preferable in order to miniaturize the system and satisfactorily correct the aberration while imposing the zooming burdens on the second and third lens units.

That is, the second lens unit is constituted of, in order from the object side, a negative single lens having a smaller absolute value of the paraxial radius of curvature in an image-side surface than in an object-side surface, and a cemented lens of a double-concave negative lens and a double-convex positive lens. The third lens unit is constituted of, in order from the object side, a plurality of positive lenses, and one or two negative lenses. The positive lens and the negative lens disposed adjacent to each other are cemented to constitute a cemented lens. Each of the fourth lens unit and the fifth lens unit is constituted of two lenses or one lens.

When the second lens unit includes, in order from the object side, two negative lenses and the double-convex positive lens, the position of the principal point comes close to an object. This is advantageous in reducing diameters of the first and second lens units. When a main negative power of the second lens unit is shared by two negative lenses, the aberration can satisfactorily be corrected. Since the cemented lens of the negative lens and the double-convex positive lens is disposed, a chromatic aberration of the second lens unit itself is easily corrected.

Moreover, a main positive power of the third lens unit is shared by a plurality of positive lenses. Furthermore, since the third lens unit includes, in order from the object side, a plurality of positive lenses and at least one negative lens, and the position of the principal point is brought close to the object, the third lens unit can have a function of increasing the focal length in the telephoto end.

Furthermore, when the third lens unit is provided with the cemented lens of the positive and negative lenses, the chromatic aberration is easily corrected.

The fourth and fifth lens units are positioned closest to the image surface in the zoom lens system. Therefore, when the number of lenses constituting the unit is reduced, the system is advantageously miniaturized. Thus, from a viewpoint of the miniaturization, it is preferable that each of the fourth and fifth lens units is constituted of two lenses or one lens.

The above-described constitutions can arbitrarily be satisfied, respectively. Accordingly, effects produced by the constitutions can more preferably be obtained at the same time.

Furthermore, the image taking apparatus may be constituted to satisfy at least one of the following constitutions.

That is, the image taking apparatus may be constituted to satisfy the following condition:

$$0.85 < f_{1G}/ih < 6.0 \quad (7B),$$

wherein $f_{1G}$ denotes a focal length of the first lens unit.

Moreover, the image taking apparatus may be constituted to satisfy the following condition:

$$-0.118 < ih/R_1 < 0.118 \quad (9B),$$

wherein $R_1$ denotes a paraxial radius of curvature of an object-side surface of a lens closest to the object side in the first lens unit.

Furthermore, in the image taking apparatus, the first lens unit may be constituted of, in order from the object side, a negative meniscus lens directing its convex surface on the object side, a reflective optical element for bending the optical path, and a positive sub-unit.

Furthermore, in the image taking apparatus, the first lens unit may be constituted of, in order from the object side, a negative sub-unit, a reflective optical element for bending the optical path and a positive sub-unit so that the negative sub-unit satisfies the following condition:

$$0.85 < |f_{L1}|/ih < 4.25 \quad (10B),$$

wherein $f_{L1}$ denotes a focal length of the negative sub-unit of the first lens unit.

From a viewpoint of miniaturization, it is preferable that one or both of the positive sub-unit and the negative sub-unit is constituted of a single lens.

Moreover, the positive sub-unit of the first lens unit may be constituted to satisfy the following condition:

$$1.5 < f_{L2}/ih < 4.0 \quad (11B),$$

wherein $f_{L2}$ denotes a focal length of the positive sub-unit of the first lens unit.

Furthermore, the image taking apparatus may be constituted so as to dispose an aperture stop between the second lens unit and the third lens unit.

This aperture stop is preferably disposed in the position which satisfies the following condition in the wide-angle end:

$$0.3 < D_{S3G}/D_{2GS} < 1.6 \quad (12B),$$

wherein $D_{S3G}$ denotes an axial length from the aperture stop to the third lens unit in the wide-angle end, and $D_{2GS}$ denotes an axial length from the second lens unit to the aperture stop in the wide-angle end.

Moreover, the above image taking apparatus may be constituted so that an aperture stop is disposed between the second lens unit and the third lens unit, the surface closest to the image side in the third lens unit is a concave surface, and the following conditions are satisfied:

$$0.3 < D_{S3G}/D_{2GS} < 1.6 \quad (12B);$$

$$0.1 < D_{3G4G}/D_{2GS} < 1.0 \quad (13B); \text{ and}$$

$$0.5 < R_{3GE}/ih < 2.5 \quad (14B),$$

wherein $D_{S3G}$ denotes an axial length from the aperture stop to the third lens unit in the wide-angle end, $D_{2GS}$ denotes an axial length from the second lens unit to the aperture stop in the wide-angle end, $D_{3G4G}$ denotes an axial length from the third lens unit to the fourth lens unit in the wide-angle end, and $R_{3GE}$ denotes a paraxial radius of curvature of a concave surface closest to the image side in the third lens unit.

Moreover, the above image taking apparatus may be constituted so that the fourth and fifth lens units satisfy the following condition:

$$4.9 < |f_{4G}/ih| < 20.0 \quad (15B); \text{ and}$$

$$2.0 < f_{5G}/ih < 5.0 \quad (16B),$$

wherein $f_{4G}$ denotes a focal length of the fourth lens unit, and $f_{5G}$ denotes a focal length of the fifth lens unit.

The upper and lower limit values of the above conditions (1B) to (17B) can be changed as follows.

As to the condition (1B), the lower limit value is more preferably set to 1.0, further 1.5, and the upper limit value is more preferably set to 3.3, further 3.0.

As to the condition (2B), the lower limit value is more preferably set to 0.8, further 1.3, and the upper limit value is more preferably set to 1.9, further 1.8.

As to the condition (3B), the lower limit value is more preferably set to 0.7, further 0.75, and the upper limit value is more preferably set to 1.2, further 1.15.

As to the condition (4B), the lower limit value is more preferably set to −0.2, further −0.15, and the upper limit value is more preferably set to 0.2, further 0.1.

As to the condition (5B), the lower limit value is more preferably set to 1.0, further 1.5, and the upper limit value is more preferably set to 2.2, further 2.0.

As to the condition (6B), the lower limit value is more preferably set to 1.6, further 1.63, and the upper limit value is more preferably set to 1.8, further 1.75.

As to the condition (7B), the lower limit value is more preferably set to 1.7, further 2.55, and the upper limit value is more preferably set to 5.61, further 5.1.

As to the condition (8B), the lower limit value is more preferably set to 1.36, further 2.21, and the upper limit value is more preferably set to 3.23, further 3.06.

As to the condition (9B), the lower limit value is more preferably set to −0.118, further −0.088, and the upper limit value is more preferably set to 0.118, further 0.059.

As to the condition (10B), the lower limit value is more preferably set to 1.7, further 2.55, and the upper limit value is more preferably set to 3.74, further 3.4.

As to the condition (11B), the lower limit value is more preferably set to 1.8, further 2.2, and the upper limit value is more preferably set to 3.5, further 3.0.

As to the condition (12B), the lower limit value is more preferably set to 0.4, further 0.5, and the upper limit value is more preferably set to 1.4, further 1.3.

As to the condition (13B), the lower limit value is more preferably set to 0.2, further 0.3, and the upper limit value is more preferably set to 0.7, further 0.5.

As to the condition (14B), the lower limit value is more preferably set to 0.7, further 0.9, and the upper limit value is more preferably set to 2.0, further 1.5.

As to the condition (15B), the lower limit value is more preferably set to 5.5, further 6.3, and the upper limit value is more preferably set to 20.0, further 15.0.

As to the condition (16B), the lower limit value is more preferably set to 2.3, further 2.5, and the upper limit value is more preferably set to 4.5, further 4.0.

As to the condition (17B), the lower limit value is more preferably set to 1.7, further 2.4, and the upper limit value is more preferably set to 3.4, further 3.2.

It is to be noted that the above constitutions or conditions are appropriately combined to produce effects. Therefore, they are more effective.

The above-described optical path bending type zoom lens system and the image taking apparatus are small in the thickness direction. Moreover, the angle of field can sufficiently be secured. The bent constitution is miniaturized while securing an optical performance and obtaining a large angle of field. In consequence, the size of the image taking apparatus can be reduced in the height direction or the lateral direction.

Next, there will be described numerical examples of the second type of optical path bending type zoom lens system.

Figure 10A:
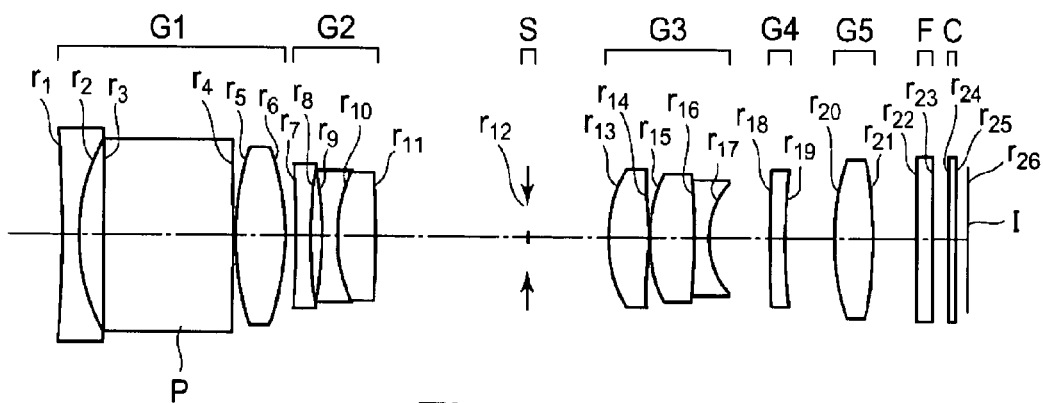
FIGS. 10A to 10C are sectional views showing a lens arrangement, along an extended line, in Example 5 of an optical path bending type zoom lens system in the present invention when focused on an infinite object.
Figure 10B:
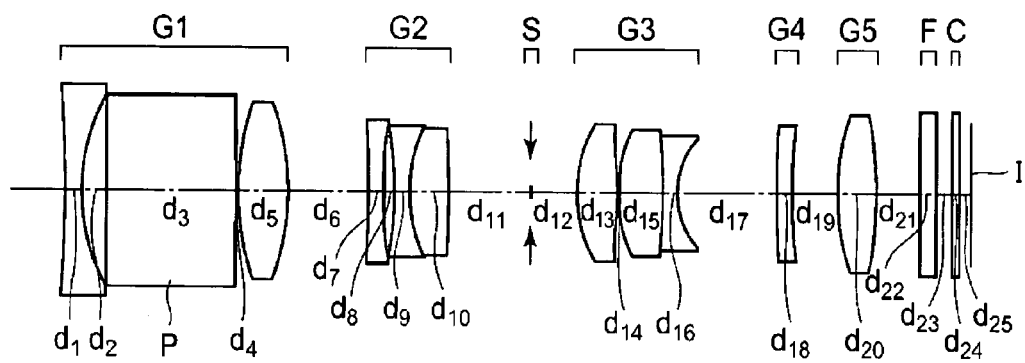
Figure 10C:
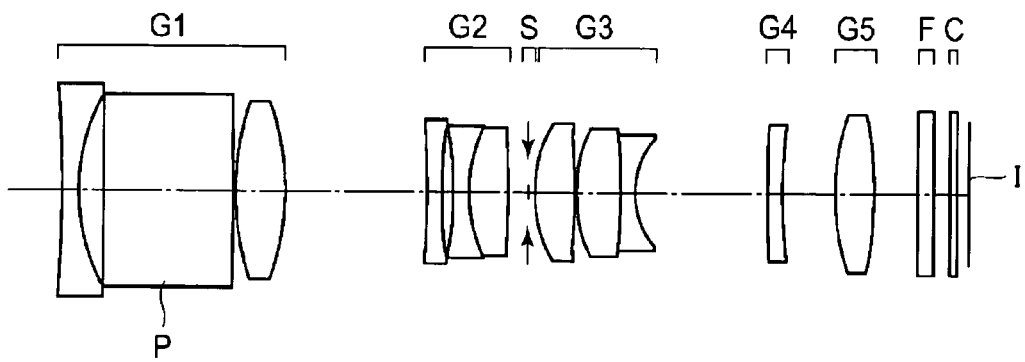
Figure 11A:
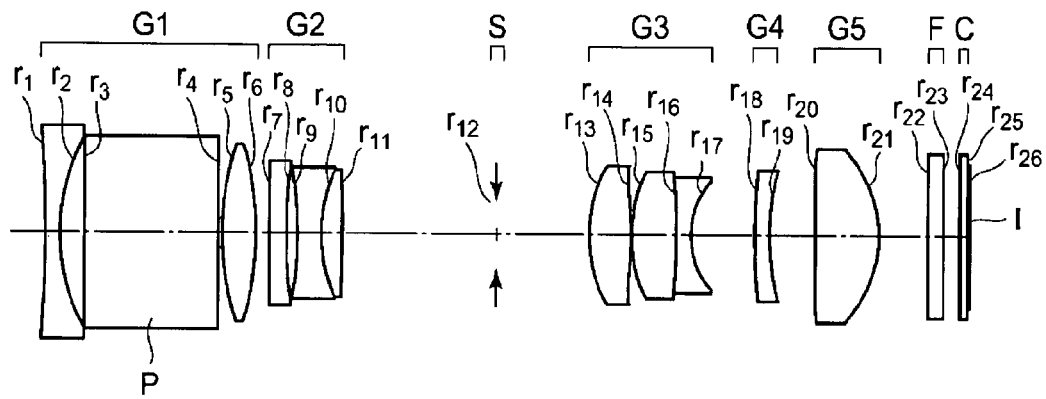
FIGS. 11A to 11C are sectional views showing a lens arrangement, along an extended line, in Example 6 of an optical path bending type zoom lens system in the present invention when focused on an infinite object.
Figure 11B:
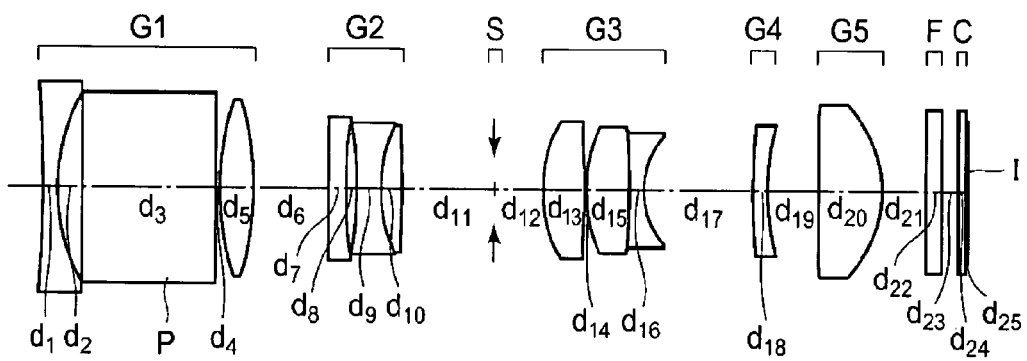
Figure 11C:
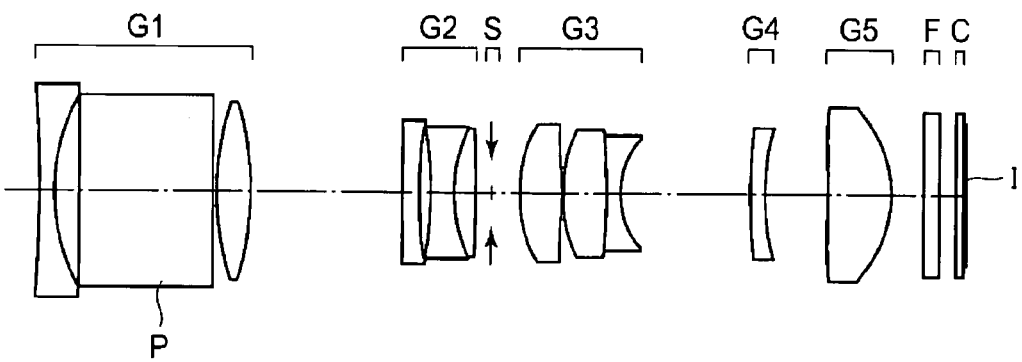
Figure 12A:
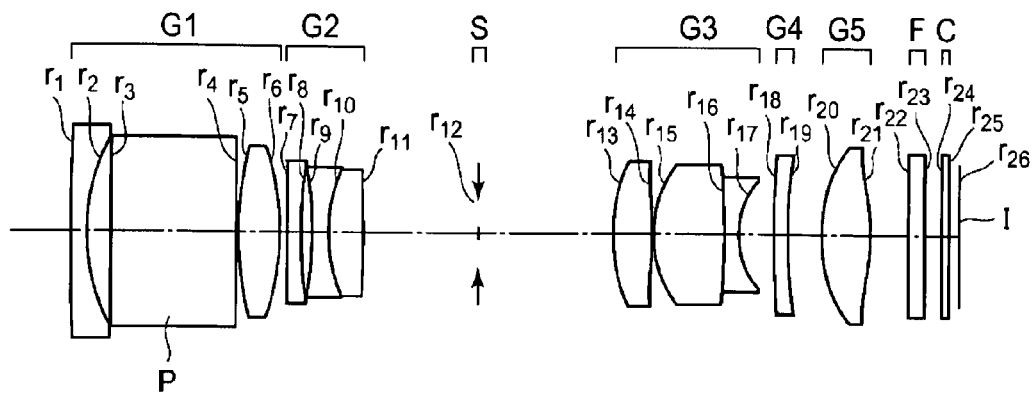
FIGS. 12A to 12C are sectional views showing a lens arrangement, along an extended line, in Example 7 of an optical path bending type zoom lens system in the present invention when focused on an infinite object.
Figure 12B:
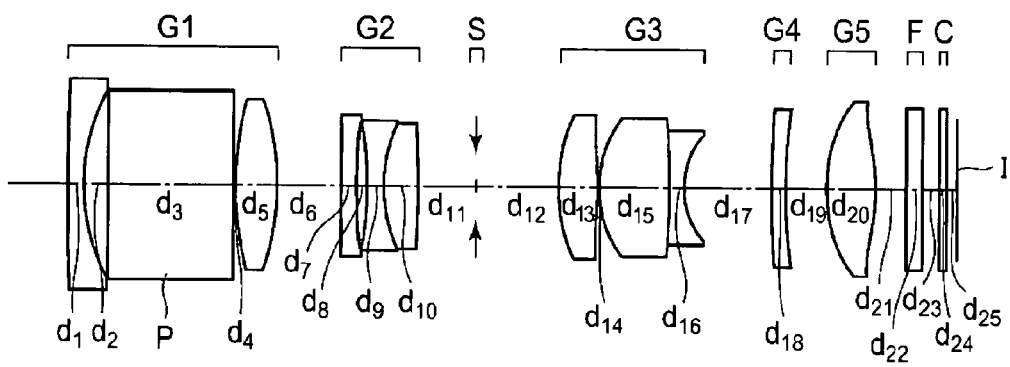
Figure 12C:
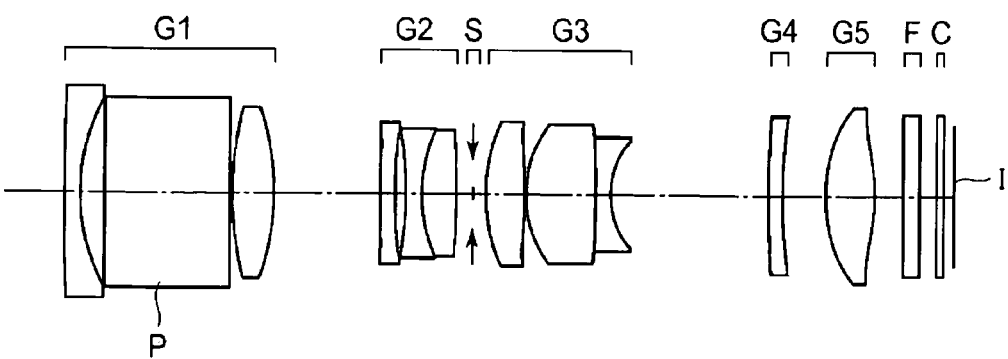

FIGS. 10A to 12C show lens sectional views when the zoom lens system is focused on an infinite object in Examples 5 to 7. In these drawings, FIGS. 10A, 11A and 12A are lens sectional views in a wide-angle end. FIGS. 10B, 11B and 12B are lens sectional views in an intermediate state. FIGS. 10C, 11C and 12C are lens sectional views in a telephoto end. In these drawings: the first lens unit is denoted with G1; the second lens unit is denoted with G2; the aperture stop is denoted with S; the third lens unit is denoted with G3; the fourth lens unit is denoted with G4; the fifth lens unit is denoted with G5; F denotes an optical low pass filter having an IR cut coating surface; C denotes cover glass of the electronic image sensor such as a CCD image sensor or a CMOS image sensor; and the image surface (light receiving surface) of the CCD image sensor, the CMOS image sensor or the like is denoted with I. Moreover, P denotes an optical path bending prism in the first lens unit G1, which is shown as a parallel flat plate developed on a straight optical axis. It is to be noted that as shown, the surface of the optical low pass filter F may directly be coated with an IR cut coating, or an IR cutting absorbent filter may separately be disposed. Alternatively, a transparent flat plate whose incidence surface is coated with the IR cut coating may be used.

Figure 13:
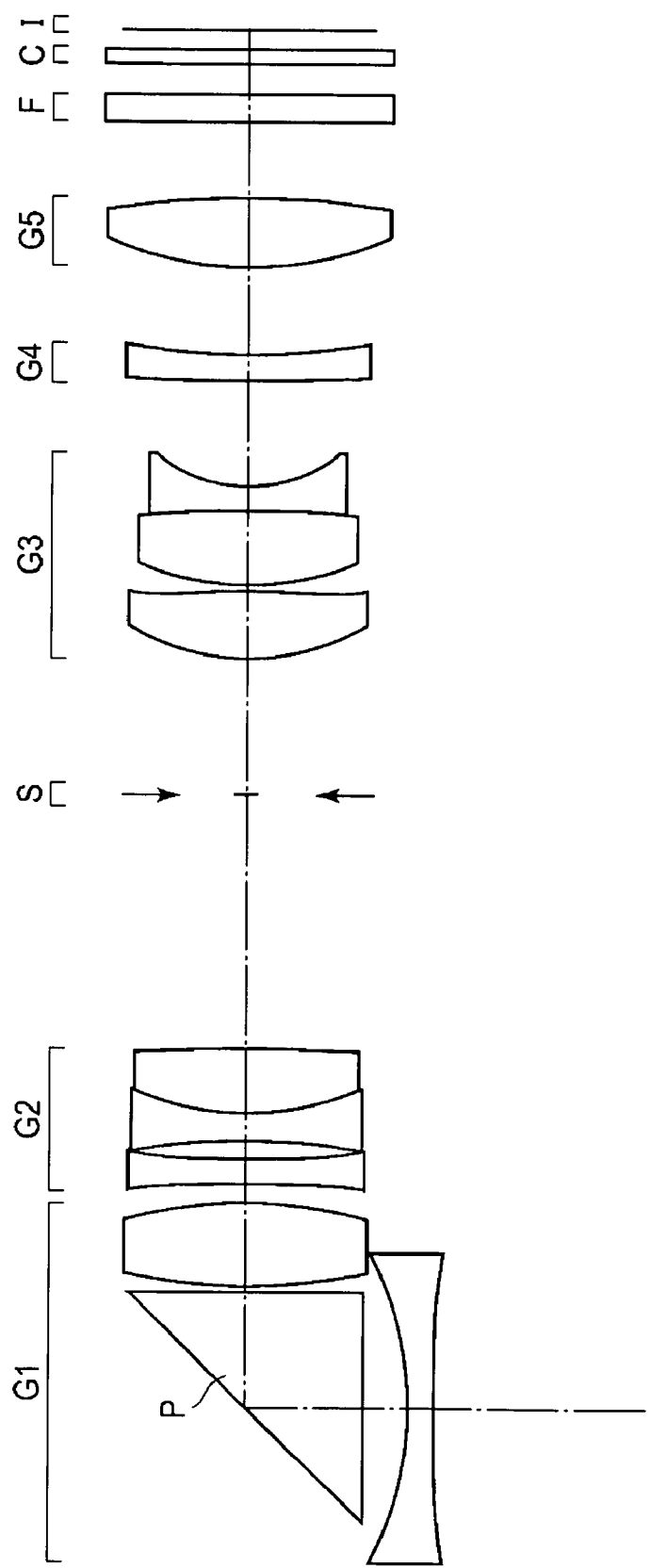
FIG. 13 is a sectional view showing a lens arrangement in a state in which an optical path of Example 5 shown in FIG. 10A is bent.

FIG. 13 is a diagram showing a state in which the optical path of FIG. 10A is bent. The optical path bending prism P is constituted of a reflective prism which bends the optical path by 90°. It is to be noted that in Examples 5 to 7, the reflection position is in the center between the incidence surface and the exit surface of the parallel flat plate P. Moreover, the reflecting direction of the optical path bending prism P is a longitudinal direction (the vertical direction when the incident optical path is in the horizontal direction) of the image taking apparatus, and a short-side direction of the light receiving surface. It is to be noted that the reflecting direction may be a long-side direction of the light receiving surface.

As shown in FIGS. 10A to 10C, the zoom lens system of Example 5 is constituted of, in order from an object side: a first lens unit G1 having a positive refractive power; a second lens unit G2 having a negative refractive power; an aperture stop S; a third lens unit G3 having a positive refractive power; a fourth lens unit G4 having a negative refractive power; and a fifth lens unit G5 having a positive refractive power. When zooming is performed from a wide-angle end toward a telephoto end, the first lens unit G1 is fixed, the second lens unit G2 moves toward an image surface, the aperture stop S is substantially fixed, the third lens unit G3 moves toward an object, the fourth lens unit G4 moves along a locus concave toward the object while broadening the space between the third lens unit G3 and the fourth lens unit, the fourth lens unit is positioned closer to the object side in the telephoto end than in the wide-angle end, and the fifth lens unit G5 is fixed.

The first lens unit G1 includes, in order from the object side, a double-concave negative lens, an optical path bending prism P, and a double-convex positive lens. The second lens unit G2 includes, in order from the object side, a double-concave negative lens, and a cemented lens of a double-concave negative lens and a double-convex positive lens. The third lens unit G3 includes, in order from the object side, a double-convex positive lens, and a cemented lens of a double-convex positive lens and a double-concave negative lens. The fourth lens unit G4 includes one negative meniscus lens directing its convex surface on the object side, and the fifth lens unit G5 includes one double-convex positive lens.

Aspherical surfaces are used on five surfaces: opposite surfaces of the double-convex positive lens of the first lens unit G1; opposite surfaces of the double-convex positive lens of the third lens unit G; and an object-side surface of the double-convex positive lens of the fifth lens unit G5.

As shown in FIGS. 11A to 11C, the zoom lens system of Example 6 is constituted of, in order from an object side: a first lens unit G1 having a positive refractive power; a second lens unit G2 having a negative refractive power; an aperture stop S; a third lens unit G3 having a positive refractive power; a fourth lens unit G4 having a negative refractive power; and a fifth lens unit. G5 having a positive refractive power. When zooming is performed from the wide-angle end toward the telephoto end, the first lens unit G1 is fixed, the second lens unit G2 moves toward the image surface, the aperture stop S is substantially fixed, the third lens unit G3 moves toward the object, the fourth lens unit G4 is fixed, and the fifth lens unit G5 moves toward the image surface.

The first lens unit G1 includes, in order from the object side, a double-concave negative lens, an optical path bending prism P, and a double-convex positive lens. The second lens unit G2 includes, in order from the object side, a double-concave negative lens, and a cemented lens of a double-concave negative lens and a double-convex positive lens. The third lens unit G3 includes, in order from the object side, a double-convex positive lens, and a cemented lens of a double-convex positive lens and a double-concave negative lens. The fourth lens unit G4 includes one negative meniscus lens directing its convex surface on the object side, and the fifth lens unit G5 includes one double-convex positive lens.

Aspherical surfaces are used on six surfaces: opposite surfaces of the double-convex positive lens of the first lens unit G1; opposite surfaces of the double-convex positive lens of the third lens unit G; and opposite surfaces of the double-convex positive lens of the fifth lens unit G5.

As shown in FIGS. 12A to 12C, the zoom lens system of Example 7 is constituted of, in order from an object side: a first lens unit G1 having a positive refractive power; a second lens unit G2 having a negative refractive power; an aperture stop S; a third lens unit G3 having a positive refractive power; a fourth lens unit G4 having a negative refractive power; and a fifth lens unit G5 having a positive refractive power. When zooming is performed from the wide-angle end toward the telephoto end, the first lens unit G1 is fixed, the second lens unit G2 moves toward the image surface, the aperture stop S is substantially fixed, the third lens unit G3 moves toward the object, the fourth lens unit G4 moves along a locus concave toward the object while broadening the space between the third lens unit G3 and the fourth lens unit, the fourth lens unit is arranged in substantially same position in the telephoto end as that in the wide-angle end, and the fifth lens unit G5 moves toward the image surface.

The first lens unit G1 includes, in order from the object side, a negative meniscus lens directing its convex surface on the object side, an optical path bending prism P, and a double-convex positive lens. The second lens unit G2 includes, in order from the object side, a plano-concave negative lens, and a cemented lens of a double-concave negative lens and a double-convex positive lens. The third lens unit G3 includes, in order from the object side, a double-convex positive lens, and a cemented lens of a double-convex positive lens and a double-concave negative lens. The fourth lens unit G4 includes one negative meniscus lens directing its convex surface on the object side, and the fifth lens unit G5 includes one double-convex positive lens.

Aspherical surfaces are used on six surfaces: opposite surfaces of the double-convex positive lens of the first lens unit G1; opposite surfaces of the double-convex positive lens of the third lens unit G; and opposite surfaces of the double-convex positive lens of the fifth lens unit G5.

There will be described hereinafter numeric value data of the above examples. In addition to the above-described symbols: f denotes the focal length of the whole zoom lens system; $F_{NO}$ denotes the F number; ω denotes a half angle of field; WE denotes a wide-angle end; ST denotes an intermediate state; TE denotes a telephoto end; $r_1, r_2 \ldots$ denote a radius of curvature of each lens surface; $d_1, d_2 \ldots$ denote a space between the lens surfaces; $n_{d1}, nd_2 \ldots$ denote a refractive index of each lens for the wavelength of the d-line; and $V_{d1}, Vd_2 \ldots$ denote the Abbe number of each lens. It is to be noted that an aspherical shape is represented by the following equation in which x is an optical axis whose positive direction is set to the light traveling direction, and y has a direction crossing the optical axis at right angles:

$$x=(y^2/r)/[1+\{1-(K+1)(y/r)^2\}^{1/2}]+A_4y^4+A_6y^6+A_8y^8+A_{10}y^{10},$$

wherein r denotes a paraxial radius of curvature, K denotes a conic coefficient, and $A_4$, $A_6$, $A_8$ and $A_{10}$ denote fourth-order, sixth-order, eighth-order and tenth-order aspherical coefficients, respectively.

EXAMPLE 5

TABLE 11

| | | | |
|---|---|---|---|
| $r_1 = -52.394$ | $d_1 = 0.84$ | $n_{d1} = 1.81186$ | $V_{d1} = 25.72$ |
| $r_2 = 10.594$ | $d_2 = 1.37$ | | |
| $r_3 = \infty$ | $d_3 = 7.39$ | $n_{d2} = 1.84666$ | $V_{d2} = 23.78$ |
| $r_4 = \infty$ | $d_4 = 0.16$ | | |
| $r_5 = 16.429^*$ | $d_5 = 2.74$ | $n_{d3} = 1.74320$ | $V_{d3} = 49.34$ |
| $r_6 = -14.973^*$ | $d_6 = $ variable | | |
| $r_7 = -52.984$ | $d_7 = 0.84$ | $n_{d4} = 1.88300$ | $V_{d4} = 40.76$ |
| $r_8 = 32.475$ | $d_8 = 0.63$ | | |
| $r_9 = -17.460$ | $d_9 = 0.84$ | $n_{d5} = 1.88300$ | $V_{d5} = 40.76$ |
| $r_{10} = 8.037$ | $d_{10} = 2.14$ | $n_{d6} = 1.84666$ | $V_{d6} = 23.78$ |
| $r_{11} = -106.964$ | $d_{11} = $ (variable) | | |
| $r_{12} = \infty$ (AS) | $d_{12} = $ (variable) | | |
| $r_{13} = 7.537^*$ | $d_{13} = 2.20$ | $n_{d7} = 1.74320$ | $V_{d7} = 49.34$ |
| $r_{14} = -32.874^*$ | $d_{14} = 0.21$ | | |
| $r_{15} = 8.885$ | $d_{15} = 2.44$ | $n_{d8} = 1.69584$ | $V_{d8} = 42.98$ |
| $r_{16} = -46.504$ | $d_{16} = 0.84$ | $n_{d9} = 1.84666$ | $V_{d9} = 23.78$ |
| $r_{17} = 4.558$ | $d_{17} = $ (variable) | | |
| $r_{18} = 190.674$ | $d_{18} = 0.84$ | $n_{d10} = 1.84666$ | $V_{d10} = 23.78$ |
| $r_{19} = 24.176$ | $d_{19} = $ (variable) | | |
| $r_{20} = 11.544^*$ | $d_{20} = 2.20$ | $n_{d11} = 1.49700$ | $V_{d11} = 81.54$ |
| $r_{21} = -26.422$ | $d_{21} = 2.33$ | | |
| $r_{22} = \infty$ | $d_{22} = 0.93$ | $n_{d12} = 1.54771$ | $V_{d12} = 62.84$ |
| $r_{23} = \infty$ | $d_{23} = 0.94$ | | |
| $r_{24} = \infty$ | $d_{24} = 0.53$ | $n_{d13} = 1.51633$ | $V_{d13} = 64.14$ |
| $r_{25} = \infty$ | $d_{25} = 0.60$ | | |
| $r_{26} = \infty$ (IS) | | | |

*: Aspherical surface AS: Aperture stop IS: Image surface

| Aspherical Coefficient |
|---|
| Fifth Surface<br>K = 0.000 |
| $A_4 = -6.27251 \times 10^{-5}$   $A_6 = 4.81767 \times 10^{-6}$<br>$A_8 = -2.76647 \times 10^{-7}$   $A_{10} = 8.86129 \times 10^{-9}$ |
| Sixth Surface<br>K = 0.000 |
| $A_4 = 2.76467 \times 10^{-5}$   $A_6 = 4.35667 \times 10^{-6}$<br>$A_8 = -2.30756 \times 10^{-7}$   $A_{10} = 7.75216 \times 10^{-9}$ |
| 13th Surface<br>K = 0.000 |
| $A_4 = -1.48421 \times 10^{-5}$   $A_6 = 3.02417 \times 10^{-5}$<br>$A_8 = -1.65090 \times 10^{-6}$   $A_{10} = 1.59641 \times 10^{-7}$ |
| 14th Surface<br>K = 0.000 |
| $A_4 = 4.53970 \times 10^{-4}$   $A_6 = 4.70445 \times 10^{-5}$<br>$A_8 = -3.48547 \times 10^{-6}$   $A_{10} = 3.17476 \times 10^{-7}$ |
| 20th Surface<br>K = 0.000 |
| $A_4 = 4.00006 \times 10^{-5}$   $A_6 = -1.95270 \times 10^{-5}$<br>$A_8 = 1.78900 \times 10^{-6}$   $A_{10} = -6.11181 \times 10^{-8}$ |

TABLE 12

Zoom Data (∞)

|  | WE | ST | TE |
|---|---|---|---|
| f (mm) | 6.903 | 11.534 | 19.493 |
| $F_{NO}$ | 3.50 | 4.19 | 5.13 |
| ω(°) | 32.45 | 18.44 | 10.84 |
| $d_6$ | 0.63 | 4.64 | 8.15 |
| $d_{11}$ | 8.49 | 4.54 | 0.95 |
| $d_{12}$ | 4.55 | 2.57 | 0.42 |
| $d_{17}$ | 3.43 | 5.62 | 7.44 |
| $d_{19}$ | 2.74 | 2.47 | 2.97 |

EXAMPLE 6

TABLE 13

| | | | |
|---|---|---|---|
| $r_1 = -277.717$ | $d_1 = 0.80$ | $n_{d1} = 1.81333$ | $V_{d1} = 24.93$ |
| $r_2 = 9.198$ | $d_2 = 1.40$ | | |
| $r_3 = \infty$ | $d_3 = 7.42$ | $n_{d2} = 1.84700$ | $V_{d2} = 24.00$ |
| $r_4 = \infty$ | $d_4 = 0.16$ | | |
| $r_5 = 14.077*$ | $d_5 = 1.90$ | $n_{d3} = 1.74320$ | $V_{d3} = 49.34$ |
| $r_6 = -17.667*$ | $d_6 =$ variable | | |
| $r_7 = -601.518$ | $d_7 = 0.91$ | $n_{d4} = 1.88300$ | $V_{d4} = 40.76$ |
| $r_8 = 17.121$ | $d_8 = 0.77$ | | |
| $r_9 = -19.040$ | $d_9 = 1.16$ | $n_{d5} = 1.88300$ | $V_{d5} = 40.76$ |
| $r_{10} = 8.500$ | $d_{10} = 1.25$ | $n_{d6} = 1.84666$ | $V_{d6} = 23.78$ |
| $r_{11} = -65.492$ | $d_{11} =$ (variable) | | |
| $r_{12} = \infty$ (AS) | $d_{12} =$ (variable) | | |
| $r_{13} = 7.730*$ | $d_{13} = 2.29$ | $n_{d7} = 1.74320$ | $V_{d7} = 49.34$ |
| $r_{14} = -28.247*$ | $d_{14} = 0.21$ | | |
| $r_{15} = 9.103$ | $d_{15} = 2.42$ | $n_{d8} = 1.69727$ | $V_{d8} = 44.72$ |
| $r_{16} = -48.965$ | $d_{16} = 0.83$ | $n_{d9} = 1.84666$ | $V_{d9} = 23.78$ |
| $r_{17} = 4.574$ | $d_{17} =$ (variable) | | |
| $r_{18} = 30.747$ | $d_{18} = 0.80$ | $n_{d10} = 1.84666$ | $V_{d10} = 23.78$ |
| $r_{19} = 12.728$ | $d_{19} =$ (variable) | | |
| $r_{20} = 143.857*$ | $d_{20} = 3.51$ | $n_{d11} = 1.49700$ | $V_{d11} = 81.54$ |
| $r_{21} = -5.718*$ | $d_{21} =$ (variable) | | |
| $r_{22} = \infty$ | $d_{22} = 0.93$ | $n_{d12} = 1.54771$ | $V_{d12} = 62.84$ |
| $r_{23} = \infty$ | $d_{23} = 0.94$ | | |
| $r_{24} = \infty$ | $d_{24} = 0.53$ | $n_{d13} = 1.51633$ | $V_{d13} = 64.14$ |
| $r_{25} = \infty$ | $d_{25} = 0.10$ | | |
| $r_{26} = \infty$ (IS) | | | |

*: Aspherical surface  AS: Aperture stop  IS: Image surface

Aspherical Coefficient

Fifth Surface
K = 0.000

$A_4 = -8.19158 \times 10^{-5}$  $A_6 = 3.34002 \times 10^{-6}$
$A_8 = -1.08892 \times 10^{-7}$  $A_{10} = -5.75188 \times 10^{-11}$ Sixth Surface
K = 0.000

$A_4 = 1.31042 \times 10^{-6}$  $A_6 = 4.30663 \times 10^{-6}$
$A_8 = -1.72904 \times 10^{-7}$  $A_{10} = 1.47340 \times 10^{-9}$ 13th Surface
K = 0.000

$A_4 = 2.53436 \times 10^{-4}$  $A_6 = 1.89906 \times 10^{-5}$
$A_8 = 2.19136 \times 10^{-7}$  $A_{10} = 1.07325 \times 10^{-7}$ 14th Surface
K = 0.000

$A_4 = 8.05926 \times 10^{-4}$  $A_6 = 4.00283 \times 10^{-5}$
$A_8 = -1.91638 \times 10^{-6}$  $A_{10} = 3.18754 \times 10^{-7}$ 20th Surface
K = 0.000

$A_4 = -1.84316 \times 10^{-4}$  $A_6 = 3.22031 \times 10^{-5}$
$A_8 = -4.64601 \times 10^{-7}$  $A_{10} = -1.47014 \times 10^{-8}$ 21st Surface
K = 0.000

$A_4 = 9.95128 \times 10^{-4}$  $A_6 = 1.57768 \times 10^{-5}$
$A_8 = 1.24900 \times 10^{-7}$  $A_{10} = 0$

TABLE 14

Zoom Data (∞)

|  | WE | ST | TE |
|---|---|---|---|
| f (mm) | 6.810 | 11.560 | 19.619 |
| $F_{NO}$ | 3.39 | 4.31 | 4.99 |
| ω(°) | 30.43 | 17.89 | 10.66 |
| $d_6$ | 0.74 | 4.20 | 8.46 |
| $d_{11}$ | 8.45 | 4.99 | 0.73 |
| $d_{12}$ | 5.11 | 2.70 | 1.50 |
| $d_{17}$ | 3.46 | 5.87 | 7.07 |
| $d_{19}$ | 2.48 | 2.88 | 3.43 |
| $d_{21}$ | 2.64 | 2.23 | 1.69 |

EXAMPLE 7

TABLE 15

| | | | |
|---|---|---|---|
| $r_1 = 122.393$ | $d_1 = 0.80$ | $n_{d1} = 1.92286$ | $V_{d1} = 20.88$ |
| $r_2 = 9.887$ | $d_2 = 1.50$ | | |
| $r_3 = \infty$ | $d_3 = 7.20$ | $n_{d2} = 1.68714$ | $V_{d2} = 50.50$ |
| $r_4 = \infty$ | $d_4 = 0.15$ | | |
| $r_5 = 16.860*$ | $d_5 = 2.30$ | $n_{d3} = 1.77377$ | $V_{d3} = 47.17$ |
| $r_6 = -16.768*$ | $d_6 =$ variable | | |
| $r_7 = \infty$ | $d_7 = 0.80$ | $n_{d4} = 1.88300$ | $V_{d4} = 40.76$ |
| $r_8 = 22.130$ | $d_8 = 0.70$ | | |
| $r_9 = -15.823$ | $d_9 = 0.80$ | $n_{d5} = 1.88300$ | $V_{d5} = 40.76$ |
| $r_{10} = 9.150$ | $d_{10} = 2.00$ | $n_{d6} = 1.80810$ | $V_{d6} = 22.76$ |
| $r_{11} = -42.960$ | $d_{11} =$ (variable) | | |
| $r_{12} = \infty$ (AS) | $d_{12} =$ (variable) | | |
| $r_{13} = 9.862*$ | $d_{13} = 2.20$ | $n_{d7} = 1.74330$ | $V_{d7} = 49.33$ |
| $r_{14} = -34.207*$ | $d_{14} = 0.20$ | | |
| $r_{15} = 6.561$ | $d_{15} = 4.01$ | $n_{d8} = 1.51742$ | $V_{d8} = 57.97$ |
| $r_{16} = -124.699$ | $d_{16} = 0.80$ | $n_{d9} = 1.92286$ | $V_{d9} = 20.88$ |
| $r_{17} = 4.400$ | $d_{17} =$ (variable) | | |
| $r_{18} = 55.334$ | $d_{18} = 0.80$ | $n_{d10} = 1.84666$ | $V_{d10} = 23.78$ |
| $r_{19} = 23.823$ | $d_{19} =$ (variable) | | |
| $r_{20} = 10.738*$ | $d_{20} = 2.80$ | $n_{d11} = 1.49700$ | $V_{d11} = 81.54$ |
| $r_{21} = -11.748*$ | $d_{21} =$ (variable) | | |
| $r_{22} = \infty$ | $d_{22} = 0.88$ | $n_{d12} = 1.54771$ | $V_{d12} = 62.84$ |
| $r_{23} = \infty$ | $d_{23} = 0.89$ | | |
| $r_{24} = \infty$ | $d_{24} = 0.50$ | $n_{d13} = 1.51633$ | $V_{d13} = 64.14$ |
| $r_{25} = \infty$ | $d_{25} = 0.60$ | | |
| $r_{26} = \infty$ (IS) | | | |

*: Aspherical surface  AS: Aperture stop  IS: Image surface

Aspherical Coefficient

Fifth Surface
K = 0.000

$A_4 = -1.93192 \times 10^{-4}$  $A_6 = 4.10684 \times 10^{-6}$
$A_8 = 1.77491 \times 10^{-10}$  $A_{10} = -1.05706 \times 10^{-8}$ -continued Aspherical Coefficient Sixth Surface
K = 0.000

$A_4 = -1.42170 \times 10^{-4}$   $A_6 = 4.60665 \times 10^{-6}$
$A_8 = 7.02385 \times 10^{-10}$   $A_{10} = -1.05899 \times 10^{-8}$ 13th Surface
K = 0.000

$A_4 = -1.95103 \times 10^{-7}$   $A_6 = 2.19405 \times 10^{-5}$
$A_8 = 2.23919 \times 10^{-7}$   $A_{10} = -8.90974 \times 10^{-9}$ 14th Surface
K = 0.000

$A_4 = 1.85441 \times 10^{-4}$   $A_6 = 3.01532 \times 10^{-5}$
$A_8 = 1.73945 \times 10^{-10}$   $A_{10} = -5.97660 \times 10^{-11}$ 20th Surface
K = 0.000

$A_4 = 8.16616 \times 10^{-4}$   $A_6 = -4.47035 \times 10^{-5}$
$A_8 = 2.00898 \times 10^{-6}$   $A_{10} = -1.52665 \times 10^{-8}$ 21st Surface
K = 0.000

$A_4 = 1.52688 \times 10^{-3}$   $A_6 = -6.57459 \times 10^{-5}$
$A_8 = 2.10197 \times 10^{-6}$   $A_{10} = 1.60992 \times 10^{-12}$

TABLE 16

Zoom Data (∞)

|  | WE | ST | TE |
|---|---|---|---|
| f (mm) | 6.843 | 11.610 | 19.573 |
| $F_{NO}$ | 3.57 | 4.27 | 5.10 |
| ω(°) | 30.62 | 17.88 | 10.74 |
| $D_6$ | 0.50 | 3.73 | 6.08 |
| $D_{11}$ | 6.55 | 3.28 | 1.00 |
| $d_{12}$ | 7.56 | 4.67 | 0.70 |
| $d_{17}$ | 2.02 | 4.98 | 8.88 |
| $d_{19}$ | 1.92 | 2.33 | 2.39 |
| $d_{21}$ | 2.21 | 1.77 | 1.75 |

Figure 14A:
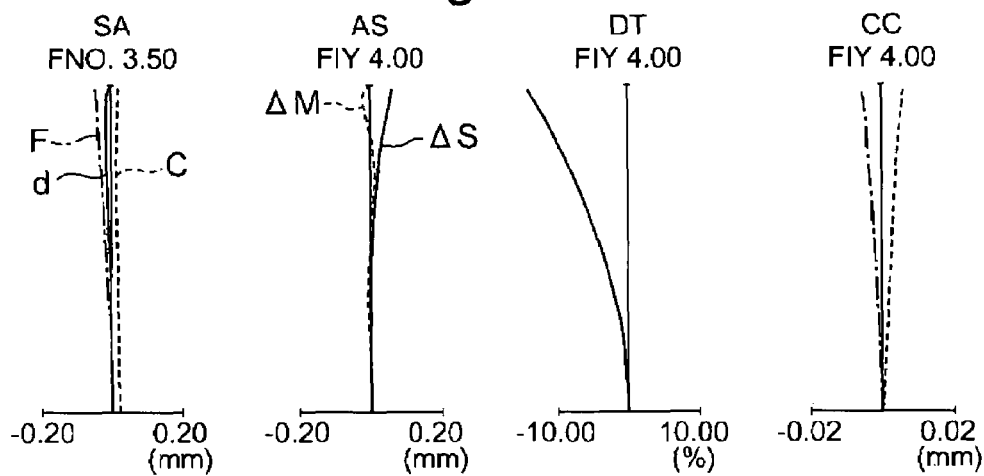
FIGS. 14A to 14C are aberration diagrams when focused on the infinite object in Example 5.
Figure 14B:
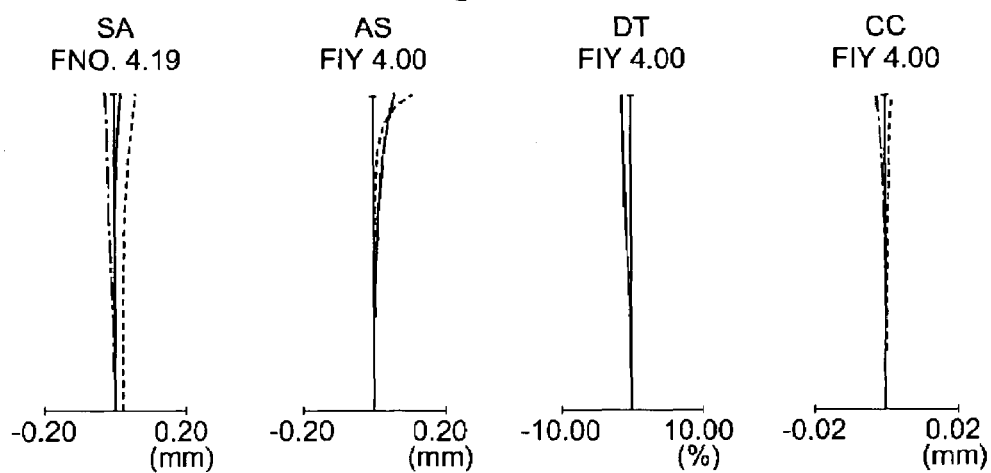
Figure 14C:
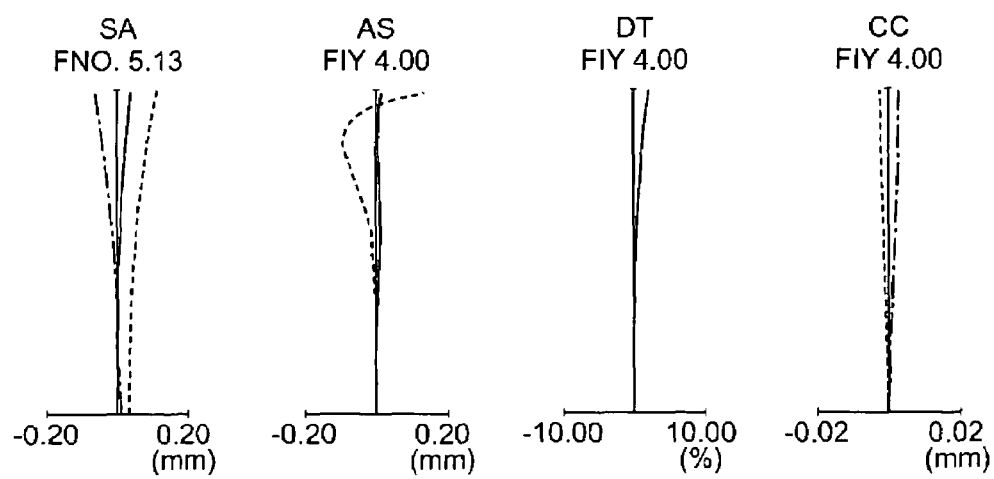
Figure 15A:
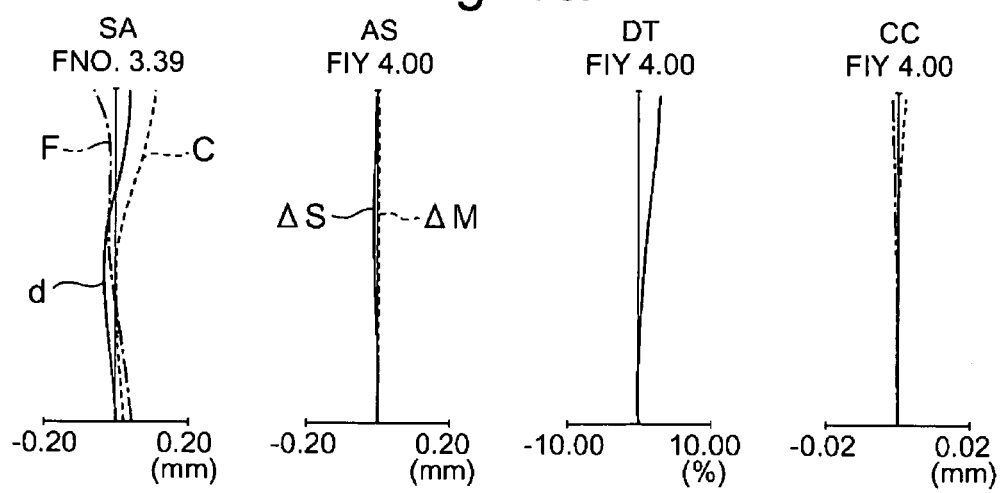
FIGS. 15A to 15C are aberration diagrams when focused on the infinite object in Example 6.
Figure 15B:
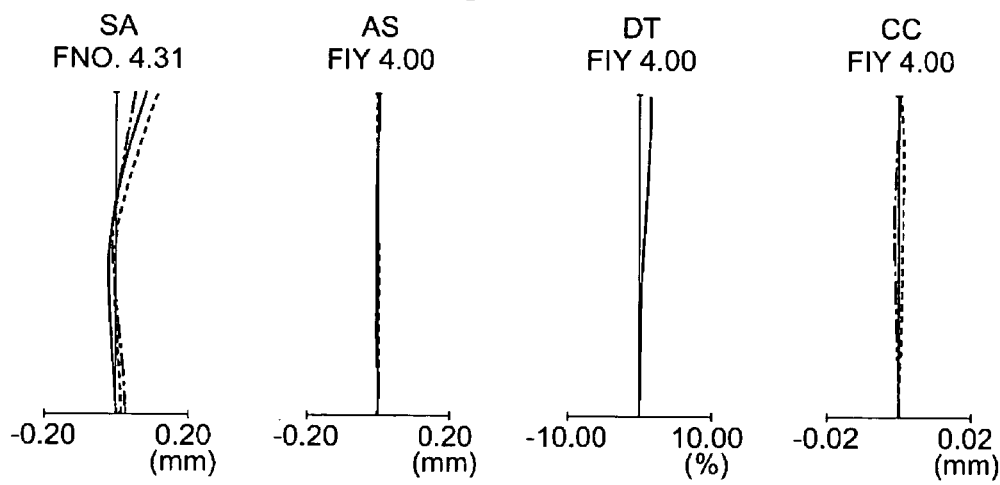
Figure 15C:
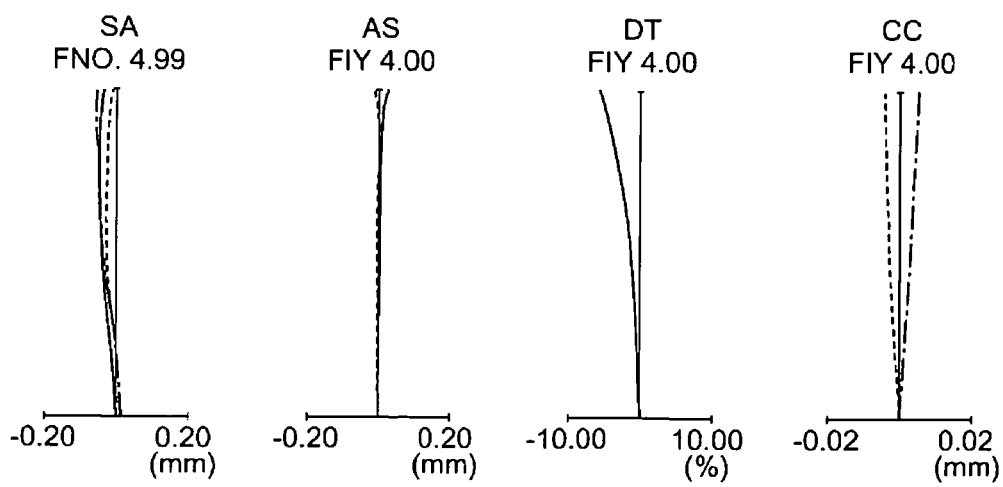
Figure 16A:
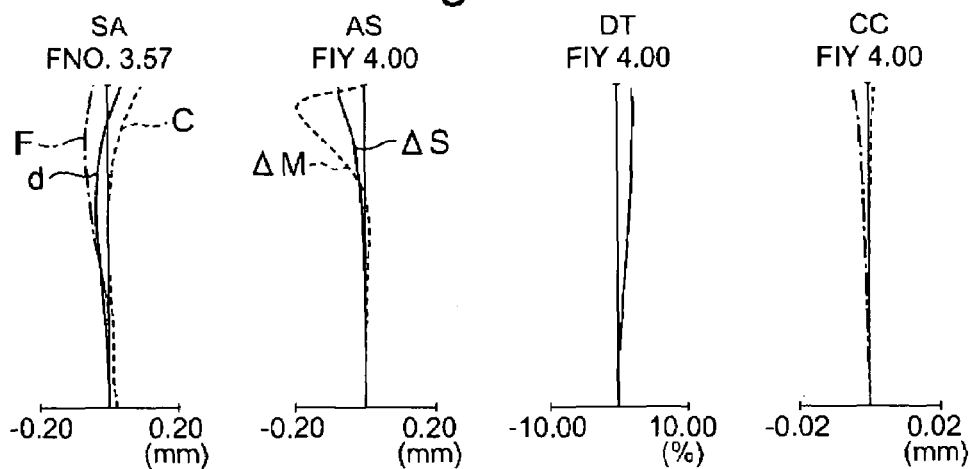
FIGS. 16A to 16C are aberration diagrams when focused on the infinite object in Example 7.
Figure 16B:
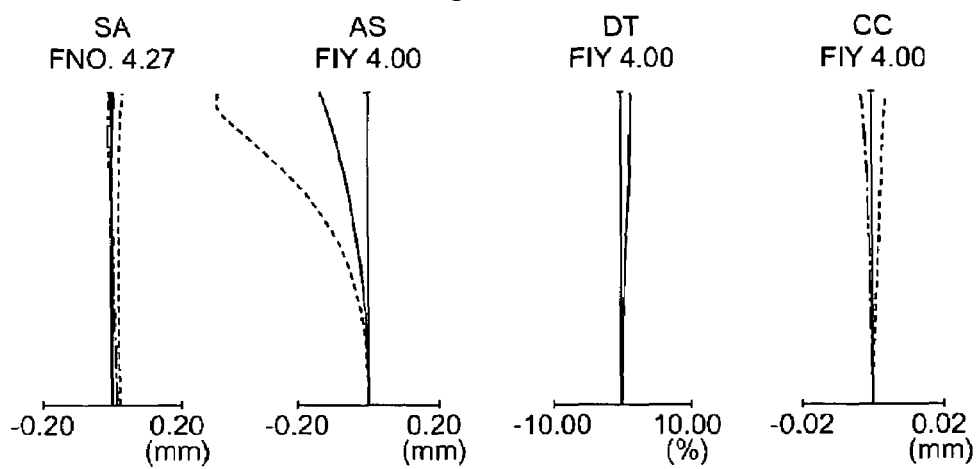
Figure 16C:
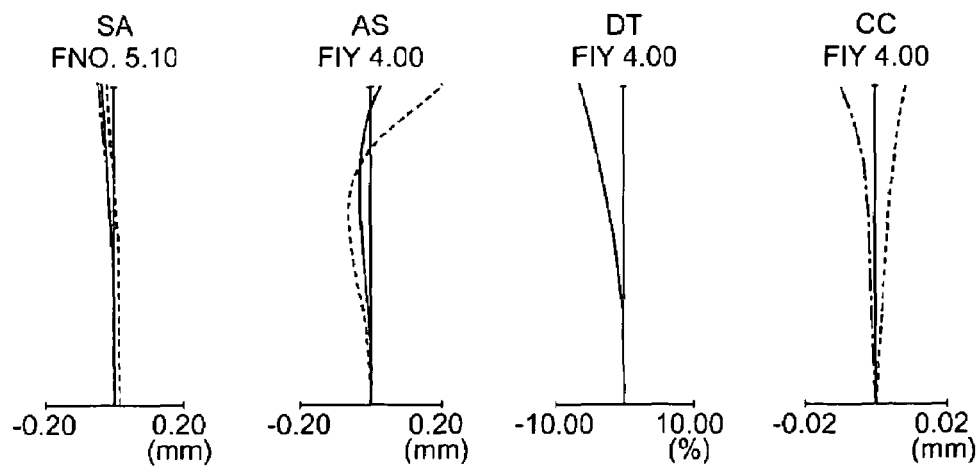

FIGS. 14A to 14C, 15A to 15C and 16A to 16C show aberration diagrams of Examples 5 to 7 when focused on an infinite object. In these aberration diagrams, FIGS. 14A, 15A and 16A show a spherical aberration SA, an astigmatism AS, a distortion DT and a chromatic aberration CC of magnification in the wide-angle end. FIGS. 4B, 15B and 16B show the above aberrations in the intermediate state. FIGS. 14C, 15C and 16C show the above aberrations in the telephoto end. It is to be noted that in drawings, "FIY" denotes the image height.

Next, values of the conditions (1B) to (17B) of the above examples are shown in Table 17, and values of parameters concerning the conditions are shown in Table 18, respectively.

TABLE 17

| Condition | Example 5 | Example 6 | Example 7 |
|---|---|---|---|
| (1B) | 2.713 | 2.800 | 2.716 |
| (2B) | 1.577 | 1.615 | 1.746 |
| (3B) | 0.883 | 0.755 | 1.105 |
| (4B) | -0.125 | -0.025 | 0.056 |
| (5B) | 1.563 | 1.605 | 1.709 |
| (6B) | 1.635 | 1.703 | 1.711 |
| (7B) | 4.436 | 4.766 | 4.646 |
| (8B) | 2.579 | 2.750 | 2.987 |
| (9B) | -0.076 | -0.014 | 0.033 |

TABLE 17-continued

| Condition | Example 5 | Example 6 | Example 7 |
|---|---|---|---|
| (10B) | 2.555 | 2.733 | 2.924 |
| (11B) | 2.593 | 2.704 | 2.800 |
| (12B) | 0.536 | 0.605 | 1.154 |
| (13B) | 0.404 | 0.409 | 0.308 |
| (14B) | 1.140 | 1.144 | 1.100 |
| (15B) | 7.763 | 6.546 | 12.498 |
| (16B) | 3.904 | 2.788 | 2.944 |
| (17B) | 2.631 | 2.801 | 2.998 |

TABLE 18

| Parameter | Example 5 | Example 6 | Example 7 |
|---|---|---|---|
| $f_w$ | 6.540 | 6.810 | 6.843 |
| $f_{1G}$ | 17.746 | 19.065 | 18.586 |
| $f_{2G}$ | -10.316 | -11.001 | -11.948 |
| $f_{3G}$ | 10.523 | 11.205 | 11.992 |
| $f_{4G}$ | -31.051 | -26.185 | -49.994 |
| $f_{5G}$ | 15.614 | 11.152 | 11.775 |
| $f_{L1}$ | -10.222 | -10.933 | -11.695 |
| $f_{L2}$ | 10.372 | 10.818 | 11.199 |
| $D_{2GS}$ | 8.490 | 8.450 | 6.550 |
| $D_{S3G}$ | 4.550 | 5.110 | 7.560 |
| $D_{3G4G}$ | 3.430 | 3.460 | 2.020 |
| $R_1$ | -52.394 | -277.717 | 122.393 |
| $R_{3GE}$ | 4.558 | 4.574 | 4.400 |
| ih | 4.000 | 4.000 | 4.000 |
| $m_{2GZ}$ | 1.785 | 1.861 | 1.569 |
| $m_{3GZ}$ | 1.576 | 1.404 | 1.735 |

In addition, the above optical path bending type zoom lens system can be used in an image taking apparatus in which an object image is formed by an image forming optical system and received by an image sensor such as a CCD image sensor or a CMOS image sensor to taking an object image, especially in a digital camera or a video camera, or an information processing device such as a personal computer, a telephone, or especially a cellular phone. Embodiments will be described hereinafter in which the above optical path bending type zoom lens is used in the digital camera.

Figure 17:
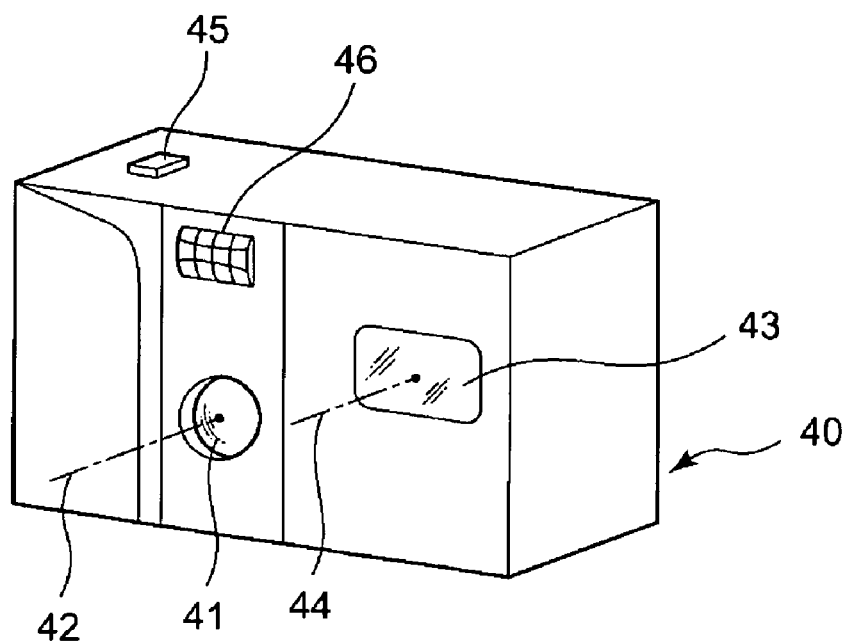
FIG. 17 is a front perspective view showing an appearance of a digital camera in which the optical path bending type zoom lens system of the present invention is incorporated.
Figure 18:
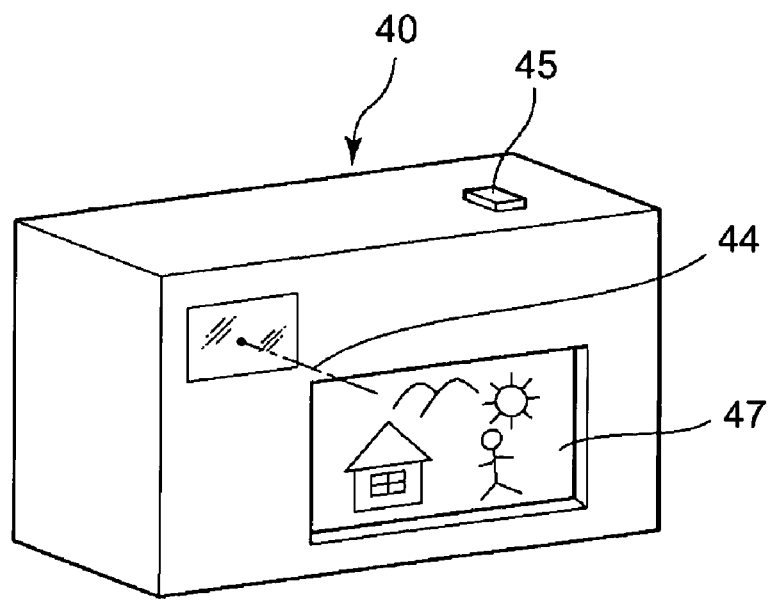
FIG. 18 is a rear perspective view of the digital camera of FIG. 17.
Figure 19:
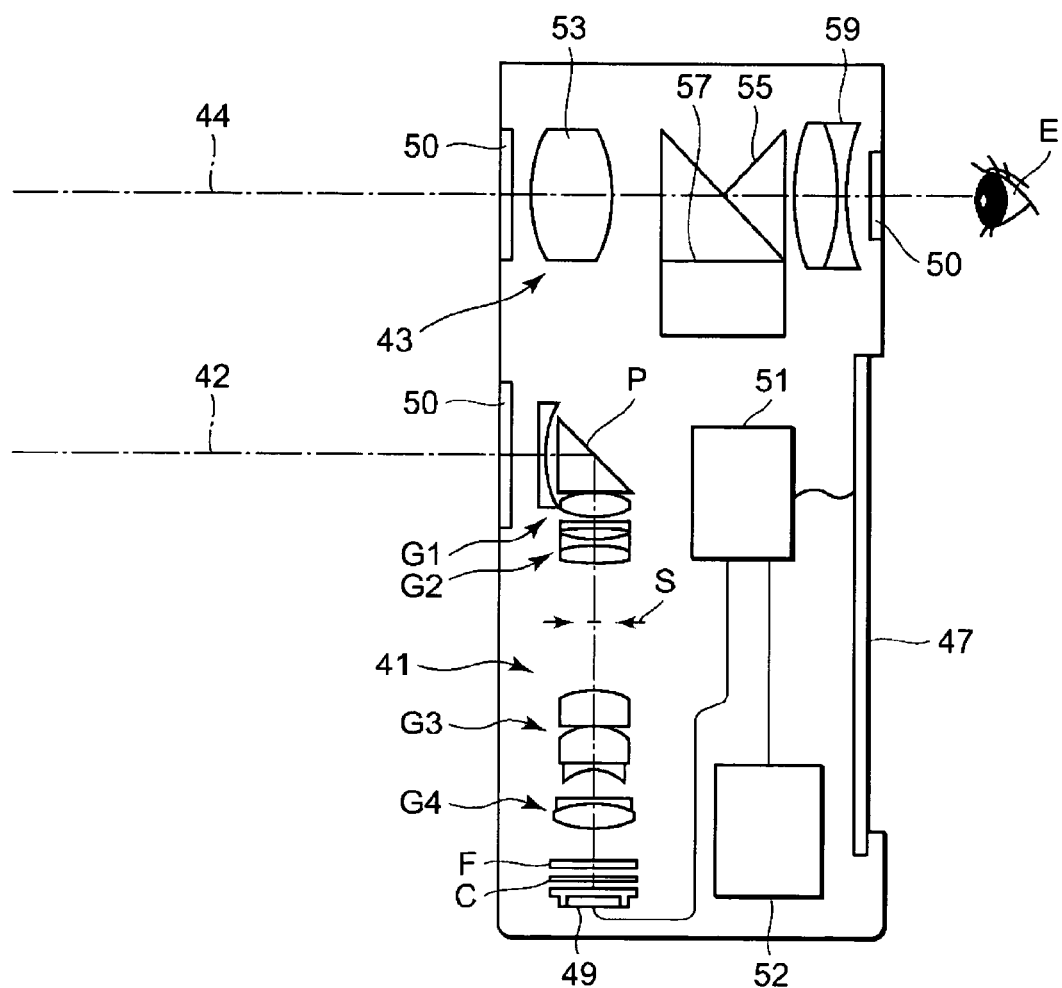
FIG. 19 is a sectional view of the digital camera of FIG. 17.

FIGS. 17 to 19 are conceptual diagrams showing a constitution in which the optical path bending type zoom lens is incorporated as a image forming optical system 41 of a digital camera. FIG. 17 is a front perspective view showing an appearance of a digital camera 40, FIG. 18 is a rear view of the digital camera, and FIG. 19 is a sectional view showing a constitution of the digital camera 40. In this example, the digital camera 40 includes: the image forming optical system 41 having an image taking optical path 42; a finder optical system 43 having a finder optical path 44; a shutter release button 45; a flash lamp 46; a liquid crystal display monitor 47 and the like. When the shutter release button 45 disposed in the upper portion of the camera 40 is pressed, the object image is taken through the image forming optical system 41 in conjunction with the pressing of the button. In this embodiment, the optical path bending type zoom optical system of Example 1 is used as shown in FIG. 19. That is, the image forming optical system is provided with the first lens unit G1 including the optical path bending prism P, the second lens unit G2, the aperture stop S, the third lens unit G3 and the fourth lens unit G4 The object image formed by the image forming optical system 41 is formed on the light receiving surface of the CCD image sensor 49 via an optical low pass filter F coated with an IR cut coating. The object image received by the CCD image sensor 49 is displayed as an electronic image in the liquid crystal display monitor 47 disposed in a rear surface of the camera via processing means 51. This processing means 51 is connected to recording means 52, and the photographed electronic image can be recorded. It is to be noted that this recording means 52 may be disposed separately from the processing means 51, or may be constituted so that the image is electronically recorded into and reproduced from a floppy disc, a memory card, a magneto-optical disc or the like. It is to be noted that the camera may be constituted as a silver salt camera in which a silver salt film is disposed instead of the CCD image sensor 49.

Furthermore, the objective optical system 53 of the finder is disposed along the finder optical path 44. The object image formed by the objective optical system 53 is formed on the view field frame 57 of the Porro-prism 55 which is an image erecting member. Behind the Porro-prism 55, there is disposed an eyepiece optical system 59 which guides an erected image into an observer's eyeball E. It is to be noted that cover members 50 may be disposed on an incidence side of the photographing optical system 41 and the objective optical system 53 for the finder and an exit side of the eyepiece optical system 59, respectively.

In the digital camera 40 constituted in this manner, the image forming optical system 41 is a small-sized and thin zoom lens which has a large angle of field, a high zooming ratio, a satisfactorily corrected aberrations and a large aperture. A filter or the like can be disposed in the image forming optical system. Therefore, it is possible to realize miniaturization, improvement of performance and reduction of costs.

It is to be noted that in the example of FIG. 19, a parallel flat plate is disposed as the cover member 50, but a lens having an optical power may be used.

The invention being thus described, it will be obvious that the same may be varied in many ways. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. A zoom lens system comprising, in order from an object side:
   a first lens unit having a positive refractive power;
   a second lens unit having a negative refractive power;
   a third lens unit having a positive refractive power; and
   a fourth lens unit having a positive refractive power,
   the zoom lens system having four lens units in total,
   during zooming from a wide-angle end toward a telephoto end,
      the first lens unit being fixed,
      at least the second lens unit and the third lens unit being moved, and
      a space between the third lens unit and the fourth lens unit being changed,
   the second lens unit being positioned closer to an image-surface side in the telephoto end than in the wide-angle end,
   the third lens unit being positioned closer to the object side in the telephoto end than in the wide-angle end,
   the first lens unit comprising a reflective optical element which reflects an optical path,
   the zoom lens system satisfying the following condition:

$$0.5 < |f_{1G}/f_w| < 3.5 \tag{1A}$$

wherein $f_{1G}$ denotes a focal length of the first lens unit, and $f_w$ denotes a focal length of the zoom lens system in the wide-angle end.

2. The zoom lens system according to claim 1, further satisfying the following condition:

$$0.5 < |f_{2G}/f_w| < 1.8 \tag{2A}$$

wherein $f_{2G}$ is a focal length of the second lens unit.

3. The zoom lens system according to claim 1, further satisfying the following condition:

$$0.7 < m_{2GZ}/m_{3GZ} < 1.2 \tag{3A}$$

wherein $m_{2GZ}$ denotes a ratio of a magnification of the second lens unit in the telephoto end to that in the wide-angle end when the zoom lens system is focused on an infinite object, and
$m_{3GZ}$ denotes a ratio of a magnification of the third lens unit in the telephoto end to that in the wide-angle end when the zoom lens system is focused on an infinite object.

4. The zoom lens system according to claim 1, further satisfying the following condition:

$$-0.2 < f_w/R_1 < 0.2 \tag{4A}$$

wherein $R_1$ denotes a paraxial radius of curvature of an object-side surface of a lens closest to the object side in the first lens units.

5. The zoom lens system according to claim 1, wherein the first lens unit consists of, in order from the object side,
   a negative meniscus lens directing a convex surface on the object side,
   the reflective optical element which reflects the optical path, and
   a positive sub-unit.

6. The zoom lens system according to claim 1, wherein the first lens unit consists of, in order from the object side,
   a negative sub-unit,
   the reflective optical element which reflects the optical path, and
   a positive sub-unit, and
   the negative sub-unit satisfies the following condition:

$$0.5 < |f_{L1}/f_w| < 2.5 \tag{5A}$$

wherein $f_{L1}$ denotes a focal length of the negative sub-unit of the first lens unit.

7. The zoom lens system according to claim 1, wherein the fourth lens unit is moved toward an object to thereby focus on an object at a short distance.

8. An image taking apparatus comprising:
   a zoom lens system; and
   an image sensor which is disposed on an image side of the zoom lens system, which has a light receiving surface and which converts an optical image formed by the zoom lens system into an electric signal,
   the zoom lens system being the zoom lens system according to claim 1 and satisfying the following condition formula:

$$1.6 < f_w/ih < 1.9 \tag{6A}$$

wherein ih denotes a maximum image height in an effective image taking region of the light receiving surface, and
   the effective image taking region is a region for obtaining image information for use in printing or displaying the optical image, the region being disposed on the image sensor which receives the optical image.

9. An image taking apparatus comprises:

a zoom lens system; and an image sensor which is disposed on an image side of the zoom lens system, which has a light receiving surface and which converts an optical image formed by the zoom lens system into an electric signal, the zoom lens system comprising, in order from an object side:

a first lens unit having a positive refractive power;

a second lens unit having a negative refractive power;

a third lens unit having a positive refractive power; and a fourth lens unit having a positive refractive power, the zoom lens system having four lens units in total, during zooming from a wide-angle end toward a telephoto end, the first lens unit being fixed to an image surface on the light receiving surface, at least the second lens unit and the third lens unit being moved, and a space between the third lens unit and the fourth lens unit being changed, the second lens unit being positioned closer to an image-surface side in the telephoto end than in the wide-angle end, the third lens unit being positioned closer to the object side in the telephoto end than in the wide-angle end, the first lens unit comprising a reflective optical element which reflects an optical path, the apparatus satisfying the following conditions:

$$1.6 < f_w/ih < 1.9 \quad (6A); \text{ and}$$

$$0.85 < f_{1G}/ih < 6.0 \quad (7A),$$

wherein $f_{1G}$ denotes a focal length of the first lens unit, $f_w$ denotes a focal length of the zoom lens system in the wide-angle end, ih denotes a maximum image height in an effective image taking region of the light receiving surface, and the effective image taking region is a region for obtaining image information for use in printing or displaying the optical image, the region being disposed on the image sensor which receives the optical image.

10. The image taking apparatus according to claim 9, further satisfying the following condition:

$$0.85 < |f_{2G}/ih| < 3.1 \quad (8A),$$

wherein $f_{2G}$ denotes a focal length of the second lens unit.

11. The image taking apparatus according to claim 9, further satisfying the following condition:

$$0.7 < m_{2GZ}/m_{3GZ} < 1.2 \quad (3A),$$

wherein $m_{2GZ}$ denotes a ratio of a magnification of the second lens unit in the telephoto end to that in the wide-angle end when the zoom lens system is focused on an infinite object, and $m_{3GZ}$ denotes a ratio of a magnification of the third lens unit in the telephoto end to that in the wide-angle end when the zoom lens system is focused on an infinite object.

12. The image taking apparatus according to claim 9, further satisfying the following condition:

$$-0.118 < ih/R_1 < 0.118 \quad (9A),$$

wherein $R_1$ denotes a paraxial radius of curvature of an object-side surface of a lens closest to the object side in the first lens unit.

13. The image taking apparatus according to claim 9, wherein the first lens unit consists of, in order from the object side, a negative meniscus lens directing a convex surface on the object side, the reflective optical element which reflects the optical path, and a positive sub-unit.

14. The image taking apparatus according to claim 9, wherein the first lens unit consists of, in order from the object side, a negative sub-unit, the reflective optical element which reflects the optical path, and a positive sub-unit, and the negative sub-unit satisfies the following condition:

$$0.85 < |f_{L1}/ih| < 4.25 \quad (10A),$$

wherein $f_{L1}$ denotes a focal length of the negative sub-unit of the first lens unit.

15. The image taking apparatus according to claim 9, wherein the fourth lens unit is moved toward an object to thereby focus on an object at a short distance.

16. The image taking apparatus according to claim 14, wherein the positive sub-unit of the first lens unit satisfies the following condition:

$$1.5 < f_{L2}/ih < 4.0 \quad (11A),$$

wherein $f_{L2}$ denotes a focal length of the positive sub-unit of the first lens unit.

17. The image taking apparatus according to claim 9, further comprising:

an aperture stop disposed between the second lens unit and the third lens unit.

18. The image taking apparatus according to claim 17, wherein a position of the aperture stop in the wide-angle end satisfies the following condition:

$$0.5 < D_{2GS}/D_{S3G} < 1.0 \quad (12A),$$

wherein $D_{2GS}$ denotes an axial length from the second lens unit to the aperture stop in the wide-angle end, and $D_{S3G}$ denotes an axial length from the aperture stop to the third lens unit in the wide-angle end.

19. The image taking apparatus according to claim 12, further comprising:

an aperture stop disposed between the second lens unit and the third lens unit, a surface closest to the image side in the third lens unit being a concave surface, and the following condition being satisfied:

$$0.5 < D_{2GS}/D_{S3G} < 1.0 \quad (12A); \text{ and}$$

$$0.5 < R_{3GE}/ih < 2.5 \quad (13A),$$

wherein $D_{2GS}$ denotes an axial length from the second lens unit to the aperture stop in the wide-angle end, $D_{S3G}$ denotes an axial length from the aperture stop to the third lens unit in the wide-angle end, and $R_{3GE}$ denotes a paraxial radius of curvature of the concave surface closest to the image side in the third lens unit.

20. The image taking apparatus according to claim 9, wherein the fourth lens unit satisfies the following condition:

$$3.3 < f_{4G}/ih < 6.6 \quad (14A),$$

wherein $f_{4G}$ denotes a focal length of the fourth lens unit.

21. An image taking apparatus comprises:

a zoom lens system; and an image sensor which is disposed on an image side of the zoom lens system, which has a light receiving surface and which converts an optical image formed by the zoom lens system into an electric signal, the zoom lens system comprising, in order from an object side:

a first lens unit having a positive refractive power;

a second lens unit having a negative refractive power;

a third lens unit having a positive refractive power; and a fourth lens unit having a positive refractive power, the zoom lens system having four lens units in total, during zooming from a wide-angle end toward a telephoto end, the first lens unit being fixed, at least the second lens unit and the third lens unit being moved, and a space between the third lens unit and the fourth lens unit being changed, the second lens unit being positioned closer to an image-surface side in the telephoto end than in the wide-angle end, the third lens unit being positioned closer to the object side in the telephoto end than in the wide-angle end, the first lens unit comprising a reflective optical element which reflects an optical path, the apparatus satisfying the following conditions:

$$1.6 < f_w/ih < 1.9 \quad (6A);$$

$$0.85 < |f_{2G}/ih| < 3.1 \quad (8A);$$

$$1.0 < f_{3G}/ih < 3.7 \quad (15A); \text{ and}$$

$$0.7 < m_{2GZ}/m_{3GZ} < 1.2 \quad (3A),$$

wherein $f_w$ denotes a focal length of the zoom lens system in the wide-angle end, $f_{2G}$ denotes a focal length of the second lens unit, $f_{3G}$ denotes a focal length of the third lens unit, ih denotes a maximum image height in an effective image taking region of the light receiving surface, $m_{2GZ}$ denotes a ratio of a magnification of the second lens unit in the telephoto end to that in the wide-angle end when the zoom lens system is focused on an infinite object, and $m_{3GZ}$ denotes a ratio of a magnification of the third lens unit in the telephoto end to that in the wide-angle end when the zoom lens system is focused on the infinite object, and the effective image taking region is a region for obtaining image information for use in printing or displaying the optical image, the region being disposed on the image sensor which receives the optical image.

22. The image taking apparatus according to claim 21, wherein the second lens unit consists of, in order from the object side, a negative single lens having a smaller absolute value of a paraxial radius of curvature in an image-side surface than in an object-side surface, and a cemented lens of a double-concave negative lens and a double-convex positive lens, the third lens unit consists of, in order from the object side, a plurality of positive lenses, and one or two negative lenses, the positive lens and the negative lens disposed adjacent to each other being cemented to constitute a cemented lens, and the fourth lens unit includes not more than two lenses.

23. The image taking apparatus according to claim 21, further satisfying the following condition:

$$0.85 < f_{1G}/ih < 6.0 \quad (7A),$$

wherein $f_{1G}$ denotes a focal length of the first lens unit.

24. The image taking apparatus according to claim 21, further satisfying the following condition:

$$-0.118 < ih/R_1 < 0.118 \quad (9A),$$

wherein $R_1$ denotes a paraxial radius of curvature of an object-side surface of a lens closest to the object side in the first lens unit.

25. The image taking apparatus according to claim 21, wherein the first lens unit consists of, in order from the object side, a negative meniscus lens directing a convex surface on the object side, the reflective optical element for bending the optical path, and a positive sub-unit.

26. The image taking apparatus according to claim 21, wherein the first lens unit consists of, in order from the object side, a negative sub-unit, the reflective optical element for bending the optical path, and a positive sub-unit, and the negative sub-unit satisfies the following condition:

$$0.85 < |f_{L1}/ih| < 4.25 \quad (10A),$$

wherein $f_{L1}$ denotes a focal length of the negative sub-unit of the first lens unit.

27. The image taking apparatus according to claim 26, wherein the positive sub-unit of the first lens unit satisfies the following condition:

$$1.5 < f_{L2}/ih < 4.0 \quad (11A),$$

wherein $f_{L2}$ denotes a focal length of the positive sub-unit of the first lens unit.

28. The image taking apparatus according to claim 21, further comprising:

an aperture stop disposed between the second lens unit and the third lens unit.

29. The image taking apparatus according to claim 28, wherein a position of the aperture stop in the wide-angle end satisfies the following condition:

$$0.5 < D_{2GS}/D_{S3G} < 1.0 \quad (12A),$$

wherein $D_{2GS}$ denotes an axial length from the second lens unit to the aperture stop in the wide-angle end, and $D_{S3G}$ denotes an axial length from the aperture stop to the third lens unit in the wide-angle end.

30. The image taking apparatus according to claim 24, further comprising:

an aperture stop disposed between the second lens unit and the third lens unit, a surface closest to the image side in the third lens unit being a concave surface,
the following conditions being satisfied:

$$0.5 < D_{2GS}/D_{S3G} < 1.0 \quad (12A); \text{ and}$$

$$0.5 < R_{3GE}/ih < 2.5 \quad (13A),$$

wherein $D_{2GS}$ denotes an axial length from the second lens unit to the aperture stop in the wide-angle end, $D_{S3G}$ denotes an axial length from the aperture stop to the third lens unit in the wide-angle end, and $R_{3GE}$ denotes a paraxial radius of curvature of the concave surface closest to the image side in the third lens unit.

31. The image taking apparatus according to claim 21, wherein the fourth lens unit satisfies the following condition:

$$3.3 < f_{4G}/ih < 6.6 \quad (14A),$$

wherein $f_{4G}$ denotes a focal length of the fourth lens unit.

\* \* \* \* \*